United States Patent
Alanqar et al.

(10) Patent No.: US 11,774,122 B2
(45) Date of Patent: Oct. 3, 2023

(54) BUILDING CONTROL SYSTEM WITH ADAPTIVE ONLINE SYSTEM IDENTIFICATION

(71) Applicant: Johnson Controls Technology Company, Auburn Hills, MI (US)

(72) Inventors: Anas W. I. Alanqar, Milwaukee, WI (US); Michael J. Wenzel, Grafton, WI (US); Fang Du, Milwaukee, WI (US); Mohammad N. Elbsat, Milwaukee, WI (US)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 588 days.

(21) Appl. No.: 16/738,878

(22) Filed: Jan. 9, 2020

(65) Prior Publication Data

US 2021/0018198 A1    Jan. 21, 2021

Related U.S. Application Data

(63) Continuation-in-part of application No. 16/513,054, filed on Jul. 16, 2019.

(51) Int. Cl.
*F24F 11/30* (2018.01)
*G05B 13/04* (2006.01)
(Continued)

(52) U.S. Cl.
CPC .............. *F24F 11/30* (2018.01); *F24F 11/64* (2018.01); *F24F 11/65* (2018.01);
(Continued)

(58) Field of Classification Search
CPC ...................................................... F24F 11/30
See application file for complete search history.

(56) References Cited

U.S. PATENT DOCUMENTS 9,235,657 B1 *  1/2016  Wenzel .................. G05B 15/02
9,429,923 B2    8/2016  Ward et al.
(Continued)

FOREIGN PATENT DOCUMENTS

CA      2957726 A1     3/2016
CA      3043996 A1     2/2018
(Continued)

OTHER PUBLICATIONS

U.S. Appl. No. 16/040,698, filed Jul. 20, 2018, Przybylski et al.
(Continued)

*Primary Examiner* — Nathan L Laughlin
(74) *Attorney, Agent, or Firm* — Foley & Lardner LLP

(57) ABSTRACT

A controller for equipment that operates to affect a variable state or condition of a building including one or more processors and non-transitory computer-readable media storing instructions that, when executed by the processors, cause the processors to perform operations. The operations include generating a new predictive model using training data associated with one or more durations selected from a time period and selected to satisfy a set of criteria. The predictive model models system dynamics of the building during the time period. The operations include storing the new predictive model in a database including predictive models that model the system dynamics of the building and include comparing performance of the new predictive model and the predictive models stored by the database to select a particular predictive model for controlling the equipment. The operations include using the particular predictive model to generate and provide control signals to the equipment.

20 Claims, 24 Drawing Sheets

(51) Int. Cl.
*G05B 13/02* (2006.01)
*F24F 11/64* (2018.01)
*F24F 11/65* (2018.01)
*F24F 140/50* (2018.01)
*F24F 110/10* (2018.01)
*F24F 130/10* (2018.01)
*F24F 140/60* (2018.01)
*F24F 11/62* (2018.01)

(52) U.S. Cl.
CPC ....... *G05B 13/0265* (2013.01); *G05B 13/048* (2013.01); *F24F 11/62* (2018.01); *F24F 2110/10* (2018.01); *F24F 2130/10* (2018.01); *F24F 2140/50* (2018.01); *F24F 2140/60* (2018.01)

(56) References Cited

U.S. PATENT DOCUMENTS

| | | |
|---|---|---|
| 9,447,985 B2 | 9/2016 | Johnson |
| 10,088,814 B2 | 10/2018 | Wenzel et al. |
| 10,871,756 B2 | 12/2020 | Johnson et al. |
| 10,908,578 B2 | 2/2021 | Johnson et al. |
| 10,921,768 B2 | 2/2021 | Johnson et al. |
| 11,156,978 B2 | 10/2021 | Johnson et al. |
| 2003/0055798 A1 | 3/2003 | Hittle et al. |
| 2010/0114383 A1* | 5/2010 | Rosea ............ H04L 67/12 700/299 |
| 2012/0065783 A1* | 3/2012 | Fadell ............ G05B 13/048 703/7 |
| 2015/0316907 A1 | 11/2015 | Elbsat et al. |
| 2016/0061693 A1 | 3/2016 | Salsbury et al. |
| 2016/0195866 A1* | 7/2016 | Turney ............ G05B 23/02 700/291 |
| 2017/0235857 A1 | 8/2017 | Haye |
| 2018/0180314 A1* | 6/2018 | Brisette ............ F24F 11/62 |
| 2019/0025774 A1 | 1/2019 | Wenzel et al. |
| 2019/0228327 A1 | 7/2019 | Horesh et al. |
| 2019/0234638 A1 | 8/2019 | Song et al. |
| 2019/0257544 A1 | 8/2019 | Alanqar et al. |
| 2019/0316802 A1 | 10/2019 | Alanqar et al. |
| 2020/0006946 A1 | 1/2020 | Fife et al. |
| 2020/0026249 A1 | 1/2020 | Przybylski et al. |
| 2020/0034665 A1 | 1/2020 | Ghanta et al. |
| 2020/0218991 A1 | 7/2020 | Alanqar et al. |
| 2020/0334574 A1* | 10/2020 | Ishida ............ G06F 11/3476 |

FOREIGN PATENT DOCUMENTS

| | | |
|---|---|---|
| EP | 1 156 286 A2 | 11/2001 |
| EP | 3 186 687 A4 | 7/2017 |
| EP | 3 497 377 A1 | 6/2019 |
| WO | WO-2012/161804 A1 | 11/2012 |
| WO | WO-2013/130956 A1 | 9/2013 |

OTHER PUBLICATIONS

U.S. Appl. No. 16/240,028, filed Jan. 4, 2019, Alanqar et al.
U.S. Appl. No. 16/447,724, filed Jun. 20, 2019, Alanqar et al.
U.S. Appl. No. 16/513,054, filed Jul. 16, 2019, Ellis et al.
U.S. Appl. No. 16/590,783, filed Oct. 2, 2019, Alanqar et al.
Batterman, Stuart. Review and Extension of CO2-Based Methods to Determine Ventilation Rates with Application to School Classrooms. International Journal of Environmental Research and Public Health. Feb. 4, 2017. 22 Pages.
Chen, Xiao; Wang, Qian; Srebric, Jelena. Occupant Feedback Eased Model Predictive Control for Thermal Comfort and Energy Optimization: A Chamber Experimental Evaluation. Applied Energy 164. 2016, pp. 341-351.
Kang et al., Novel Modeling and Control Strategies for a HVAC System Including Carbon Dioxide Control. Jun. 2, 2014. 19 Pages.
Lampinen, Markku J. Thermodynamics of Humid Air. Sep. 2015. 39 Pages.
Ljung, L. (1999). System Identification: Theory for the User, 2nd ed. (Prentice Hall PTR, Upper Saddle River).
Luo, Xiaoyan. Maximizing Thermal Comfort and International Design. Loughborough University. Jan. 18, 2019. 4 Pages.
Sama Aghniaey et al., The Assumption of Equidistance in the Seven-Point Thermal Sensation Scale and a Comparison between Categorical and Continuous Metrics. University of Georgia College of Engineering, Jan. 18, 2019. 4 Pages.
Sudhakaran, Saurabh; Shaurette Mark. Temperature, Relative Humidity, and CarbonDioxide Modulation in a Near-Zero Energy Efficient Retrofit House. Purdue University. 2016, 11 Pages.
Weekly, Kevin et al., Modeling and Estimation of the Humans' Effect on the CO2 Dynamics Inside a Conference Room. IEEE Transactions on Control Systems Technology, vol. 23, No. 5, Sep. 2015, 12 pages.
Coolinglogic, "CoolingLogic: Up early, saving billions." URL: http://coolinglogic.com/documents/MarketingFlyer_FINAL_HiRes8.5x11.pdf, retrieved from internet Oct. 27, 2022 (1 page).
Incomplete File of Communication with Various Companies, etc. in 2016-2021, URL: http://coolinglogic.com/documents/22072101_Letters_and_Signature_Receipts.pdf, published, as one document, on: Jul. 21, 2022 (211 pages).
Johnson Heating and Cooling L.L.C., "Divine Grace Building Automation (Images)," URL: http://cooljohnson.com/Building-Automation-Systems-Michigan/Oakland-County-Michigan/Building-Automation-Images.html, retrieved from internet Oct. 27, 2022 (8 pages).
Johnson Heating and Cooling L.L.C., "Divine Grace Building Automation," URL: http://cooljohnson.com/Building-Automation-Systems-Michigan/Oakland-County-Michigan/Building-Automation-Divine-Grace.html, retrieved from internet Oct. 27, 2022 (3 pages).
Johnson Heating and Cooling L.L.C., "Excel Rehabilitation Building Automation," URL: http://cooljohnson.com/Building-Automation-Systems-Michigan/Waterford-Michigan/Building-Automation-System--Excel.html, retrieved from internet Oct. 27, 2022 (2 pages).
Johnson Heating and Cooling L.L.C., "Intertek Testing Services Building Automation," URL: http://cooljohnson.com/Building-Automation-Systems-Michigan/Plymouth-Michigan/Building-Automation-System-Plymouth-Michigan.html, retrieved from internet Oct. 27, 2022 (8 pages).
Johnson Heating and Cooling L.L.C., "JLA Medical Building Building Automation," URL: http://cooljohnson.com/Building-Automation-Systems-Michigan/Waterford-Michigan/Building-Automation-System--JLA.html, retrieved from internet Oct. 27, 2022 (3 pages).
Johnson Heating and Cooling L.L.C., "Mosaic Christian Building Automation (Images)," URL: http://cooljohnson.com/Building-Automation-Systems-Michigan/Detroit/Building-Automation-Images.html, retrieved from internet Oct. 27, 2022 (12 pages).
Johnson Heating and Cooling L.L.C., "Mosaic Christian Building Automation," URL: http://cooljohnson.com/Building-Automation-Systems-Michigan/Detroit/Mosaic-Christian.html, retrieved from internet Oct. 27, 2022 (5 pages).
Johnson Heating and Cooling L.L.C., "Shepherd's Gate Lutheran Church Building Automation," URL: http://cooljohnson.com/Building-Automation-Systems-Michigan/Shelby-Township-Michigan/Building-Automation-Systems-SG.html, retrieved from internet Oct. 27, 2022 (3 pages).
Johnson Heating and Cooling L.L.C., "St. Clair County Residence Building Automation," URL: http://cooljohnson.com/Building-Automation-Systems-Michigan/St-Clair-Michigan/Building-Automation-System-St-Clair-Michigan.html, retrieved from internet Oct. 27, 2022 (4 pages).
Johnson Heating and Cooling L.L.C., "St. Joseph Mercy Oakland U. C. Building Automation," URL: http://cooljohnson.com/Building-Automation-Systems-Michigan/Waterford-Michigan/Building-Automation-Systems-SJMO.html, retrieved from internet Oct. 27, 2022 (2 pages).
Johnson Heating and Cooling L.L.C., "Waterford Internal Medicine Building Automation," URL: http://cooljohnson.com/Building-

(56) References Cited

OTHER PUBLICATIONS

Automation-Systems-Michigan/Waterford-Michigan/Building-Automation-Systems-WIM.html, retrieved from internet Oct. 27, 2022 (3 pages).
Johnson Heating and Cooling, LLC, "Building Automation Clawson Michigan 2.0," URL: http://cooljohnson.com/Building-Automation-Systems-Michigan/Clawson-Michigan/Building-Automation-Clawson-Manor-2.html, retrieved from the internet Oct. 27, 2022 (6 pages).
Johnson Heating and Cooling, LLC, "Building Automation Images Clawson Michigan 2.0," URL: http://cooljohnson.com/Building-Automation-Systems-Michigan/Clawson-Michigan/Building-Automation-Clawson-Manor-2-Images.html, retrieved from the internet Oct. 27, 2022 (14 pages).
Johnson Heating and Cooling, LLC, "Building Automation System Clawson Michigan Clawson Manor," URL: http://cooljohnson.com/Building-Automation-Systems-Michigan/Clawson-Michigan/Building-Automation-System-Clawson-Manor.html; retrieved from the internet Oct. 27, 2022 (3 pages).
Johnson Heating and Cooling, LLC, "Building Automation System in Michigan Images," URL: http://cooljohnson.com/Building-Automation-Systems-Michigan/Macomb-County-Michigan/Building-Automation-Images.html; retrieved from the internet Oct. 27, 2022 (13 pages).
Johnson Heating and Cooling, LLC, "Building Automation System in Michigan," URL: http://cooljohnson.com/Building-Automation-Systems-Michigan/Macomb-County-Michigan/Building-Automation-Confidential-Customer.html; retrieved from the internet, Oct. 27, 2022 (4 pages).
Johnson Solid State LLC, "Building Automation Equipment," URL: http://cooljohnson.com/Video/Building_Automation/Confidential_Customer_BLD_2/Building_Automation_Equipment.mp4, retrieved from internet Oct. 27, 2022 (35 pages).
Johnson Solid State LLC, "Building Automation Gui," URL: http://cooljohnson.com/Video/Building_Automation/Confidential_Customer_BLD_2/Building_Automation_GUI.mp4, retrieved from internet Oct. 27, 2022 (24 pages).
Johnson Solid State LLC, "Cooling Logic Overview," URL: http://coolinglogic.com/documents/CoolingLogic_Overview_High_Quality.mp4, retrieved from internet Oct. 27, 2022 (16 pages).
Johnson Solid State LLC, "So what is CoolingLogic™?" URL: http://coolinglogic.com/Coolinglogic-How-it-Works.html, retrieved from the internet Oct. 27, 2022 (3 pages).
Johnson, David, "A Method to Increase HVAC System Efficiency And Decrease Energy Consumption," White Paper: Johnson Solid State, LLC, URL: http://coolinglogic.com/documents/16102106_White_Paper_High_Resolution_Protected.pdf, Sep. 24, 2016 (51 pages).
Johnson, David, "CoolingLogic™: Mosaic Christian Church A Case Study," Report: Johnson Solid State, LLC, URL: http://coolinglogic.com/documents/19020301_Mosaic_Christian_Coolinglogic_Case_Study.pdf, Feb. 2, 2019 (140 pages).
Johnson, David, "Excel Rehabilitation Building Automation: Building Automation System User Manual," URL: http://cooljohnson.com/Building-Automation-Systems-Michigan/Waterford-Michigan/Building-Automation-System-Excel-Manual.html, 2012 (10 pages).
Johnson, David, "Temperature Control System and Methods for Operating Same," Pre-Publication printout of U.S. Appl. No. 15/231,943, filed Aug. 9, 2016, URL: http://coolinglogic.com/documents/16080901_CIP_As_Filed.pdf (99 pages).
Johnson, David., "CoolingLogic™: Changing the Way You Cool," Report: Johnson Solid State, LLC, URL: http://coolinglogic.com/documents/18111303_Changing_the_way_you_Cool.pdf, Nov. 7, 2018 (12 pages).
Afram et al., "Theory and Application of HVAC Control Systems—A review of Model Predictive Control (MPC)," Building and Environment, Feb. 2014, vol. 72 (pp. 343-355).
Ahn et al., "Optimal Control Development for Chilled Water Plants Using a Quadratic Representation," Energy and Buildings, Apr. 2001, vol. 33, No. 4 (pp. 371-378).

Burer et al., "Non-convex Mixed-Integer Nonlinear Programming: A Survey," Surveys in Operations Research and Management Science, Jul. 2012, vol. 17, No. 2 (pp. 97-106).
Cantoni, A., "Optimal Curve Fitting with Piecewise Linear Functions," IEEE Transactions on Computers, Jan. 1971, vol. 20, No. (pp. 59-67).
Corbin et al., "A Model Predictive Control Optimization Environment for Real-Time Commercial Building Application," Journal of Building Performance Simulation, 2013, (Published online: Jan. 11, 2012) vol. 6, No. 3 (pp. 159-174).
Drgona et al., "All you Need to Know about Model Predictive Control for Buildings," Annual Reviews in Control, 2020, vol. 50 (pp. 190-232).
EPO Notice of Opposition to a European Patent issued in Appl. Ser. No. EP 16165681.4 dated May 2, 2023 (48 pages).
EPO Notice of Opposition to a European Patent issued in Appl. Ser. No. EP 16165681.4 dated May 2, 2023 (51 pages).
EPO Notice of Opposition to a European Patent with Consolidated List issued in EP Appl. Ser. No. 16165681.4 dated May 2, 2023 (4 pages).
EPO Search Opinion EP Appl. Ser. No. EP 22177772.5 dated Sep. 26, 2022 (6 pages).
European Office Action on EP Appl. No. 16165681.4 dated Apr. 6, 2021 (7 pages).
Extended European Search Report on EP Appl. Ser. No. 22177772.5 dated Sep. 26, 2022 (11 pages).
Extended European Search Reporton EP Appl. Ser. No. 16165681.4 dated Oct. 20, 2016 (5 pages).
Hackner, J.R., "HVAC system dynamics and energy use in existing buildings," Doctoral Dissertation, University of Madison, Wisconsin, 1984 (174 pages).
Haves et al., "Model Predictive Control of HVAC Systems: Implementation and Testing at the University of California, Merced," Technical Report, U.S. Department of Energy Office of Scientific and Technical Information, Jun. 29, 2010 (140 pages).
Huang et al., "A New Model Predictive Control Scheme for Energy and Cost Savings in Commercial Buildings: An Airport Terminal Building Case Study," Building and Environment, Jul. 2015, vol. 89 (pp. 203-216).
Kelman et al., "Analysis of Local Optima in Predictive Control for Energy Efficient Buildings," Journal of Building Performance Simulation, Apr. 16, 2012, vol. 6, No. 3 (pp. 236-255).
Koehler et al., "Building Temperature Distributed Control via Explicit MPC and 'Trim and Respond' Methods," European Control Conference (ECC), Jul. 17-19, 2013, Zurich, Switzerland (pp. 4334-4339).
Kwadzogah et al., "Model Predictive Control for HVAC Systems—A Review," 2013 IEEE International Conference on Automation Science and Engineering, Model Predictive Control for HVAC Systems—A Review, 2013 IEEE International Conference on Automation Science and Engineering (CASE), Madison, WI, United States, Aug. 17-20, 2013 (pp. 442-447).
Mckenna et al., "A TRNSYS model of a building HVAC system with GSHP and PCM thermal energy storage—component modelling and validation," Proceedings of BS2013: 13th Conference of International Building Performance Simulation Association, Chambéry, France, Aug. 26-28, 2013 (pp. 3336-3343).
Mossolly et al., "Optimal Control Strategy for a Multizone Air Conditioning System Using a Genetic Algorithm," Energy, Jan. 2009, vol. 34, No. 1 (pp. 58-66).
Nassif et al., "Optimization of HVAC Control System Strategy Using Two-Objective genetic Algorithm," International Journal of HVA C&R Research, vol. 11, No. 3 (pp. 459-486).
Sourbon et al., "Dynamic Thermal Behaviour of Buildings with Concrete Core Activation," Dissertation, Arenberg Doctoral School of Science, Engineering & Technology, Katholieke Universiteit Leuven—Faculty of Engineering Celestijnenlaan: 300A box 2421, B-3001 Heverlee (Belgium) Sep. 2012 (416 pages).
Stluka et al., "Energy Management for Buildings and Microgrids," 2011 50th IEEE Conference on Decision and Control and European Control Conference (CDCECC) Orlando, FL, USA, Dec. 12-15, 2011 (pp. 5150-5157).

(56) References Cited

OTHER PUBLICATIONS

Strurznegger, D., "Model Predictive Building Climate Control, Steps Towards Practice," Doctoral Thesis, Automatic Control Laboratory, Zurich, Switzerland, 2014 (176 pages).

Sun et al., Optimal Control of Building HVAC&R Systems Using Complete Simulation-Based Sequential Quadratic Programming (CSB-SQP), Building and Environment, May 2005, vol. 40, No. 5 (pp. 657-669).

Third Party Observation Reporton EP Appl. No. 16165681.4 dated Jan. 15, 2020 (8 pages).

Third Party Observation Report on EP Appl. No. 16165681.4 dated Oct. 5, 2018 (6 pages).

Verhelst et al., "Study of the Optimal Control Problem Formulation for Modulating Air-to-Water Heat Pumps Connected to a Residential Floor Heating System," Energy and Buildings, Feb. 2012, vol. 45 (pp. 43-53).

Verhelst, C., "Model Predictive Control of Ground Coupled Heat Pump Systems in Office Buildings," Dissertation, Arenberg Doctoral School of Science, Engineering & Technology, Katholieke Universiteit Leuven—Faculty of Engineering Celestijnenlaan : 300A box 2421, B-3001 Heverlee (Belgium) Apr. 20, 2012 (316 pages).

Wang et al., "Model-Based Optimal Control of VAV Air-Conditioning System Using Genetic Algorithm," Building and Environment, Aug. 2000, vol. 35, No. 6 (pp. 471-487).

Wang et al., "Supervisory and Optimal Control of Building HVAC Systems: A Review," HVAC&R Research, Jan. 2008, vol. 14, No. 1 (pp. 3-32).

Xi et al., "Support Vector Regression Model Predictive Control on a HVAC Plant," Control Engineering Practice, Aug. 2007, vol. 15, No. 8 (pp. 897-908).

Yao et al., "Global Optimization of a Central Air-Conditioning System Using Decomposition-Coordination Method," Energy and Buildings, May 2010, vol. 42, No. 5 (pp. 570-583).

Zacekova et al., "Building modeling and control using multi-step ahead error minimization," 2012 20th Mediterranean Conference on Control & Automation (MED); Barcelona, Spain, Jul. 3-6, 2012 (6 pages).

\* cited by examiner

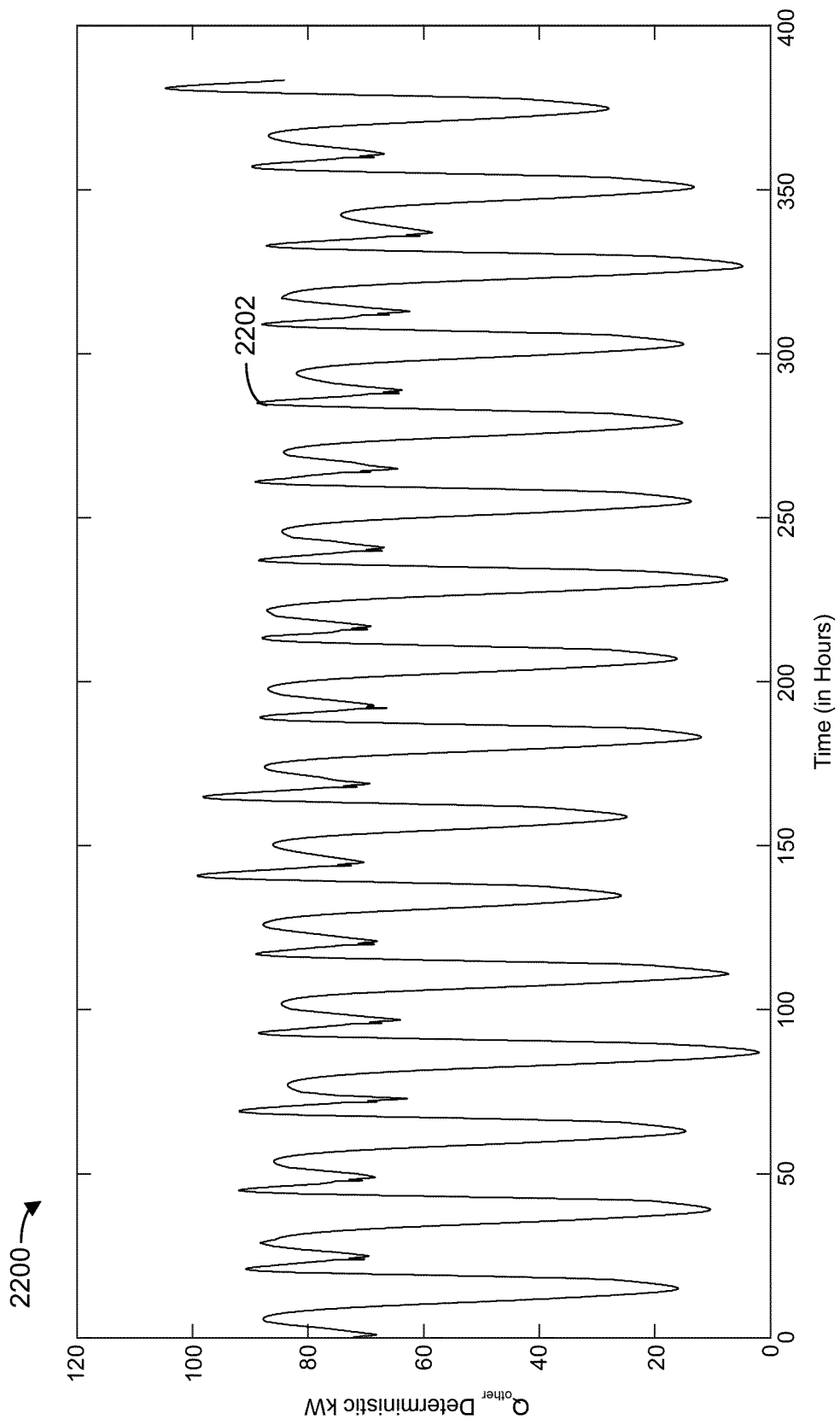

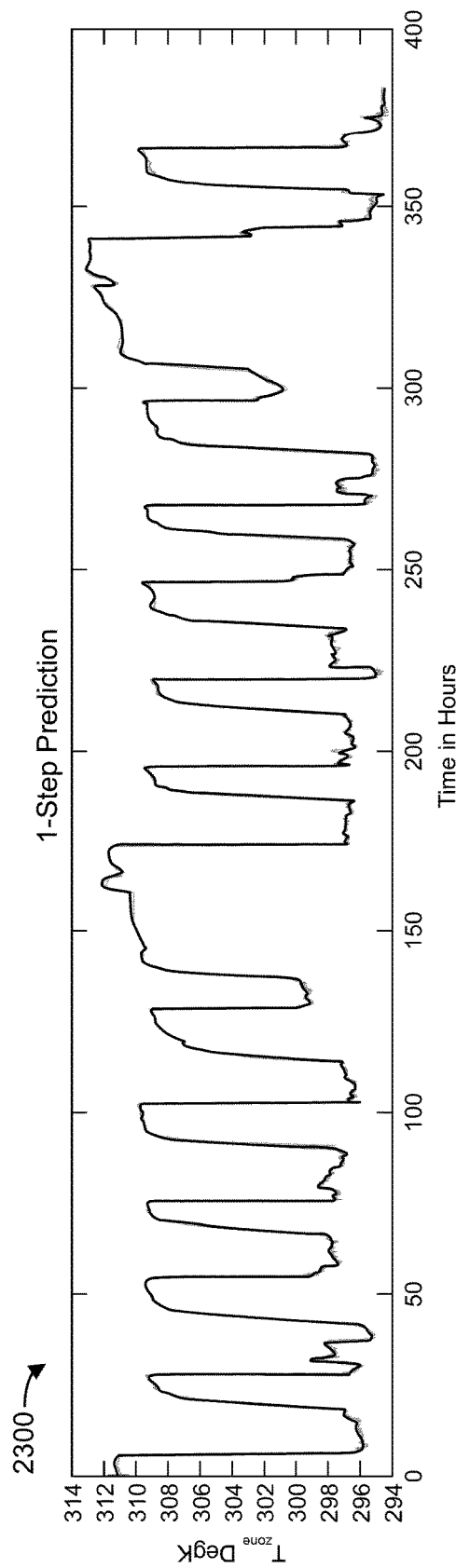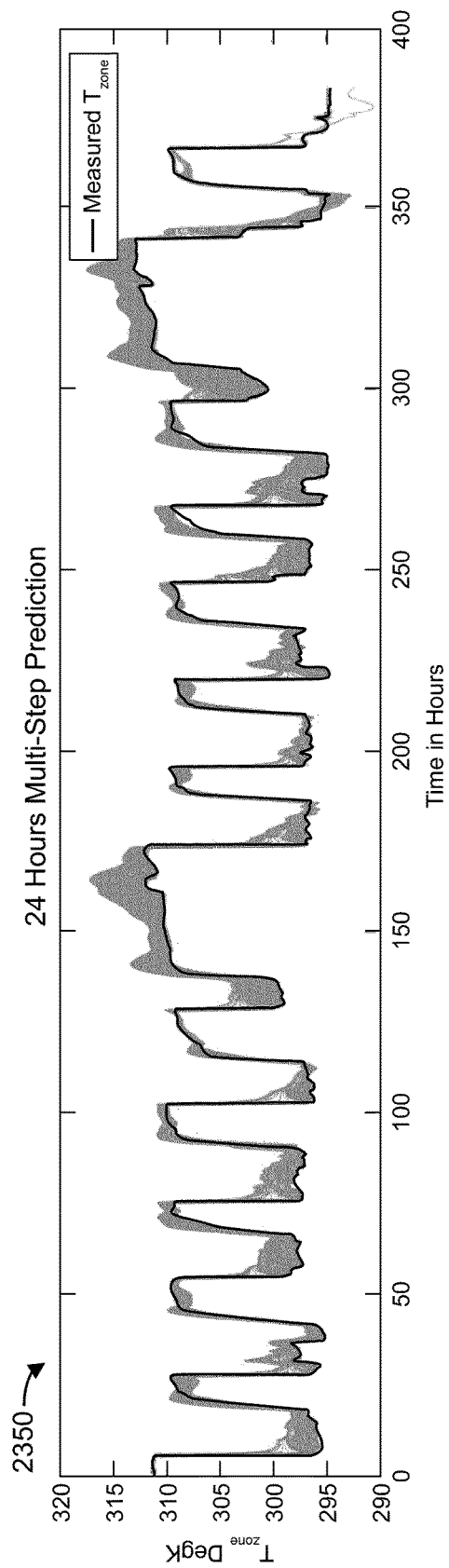
FIG. 23A
FIG. 23B

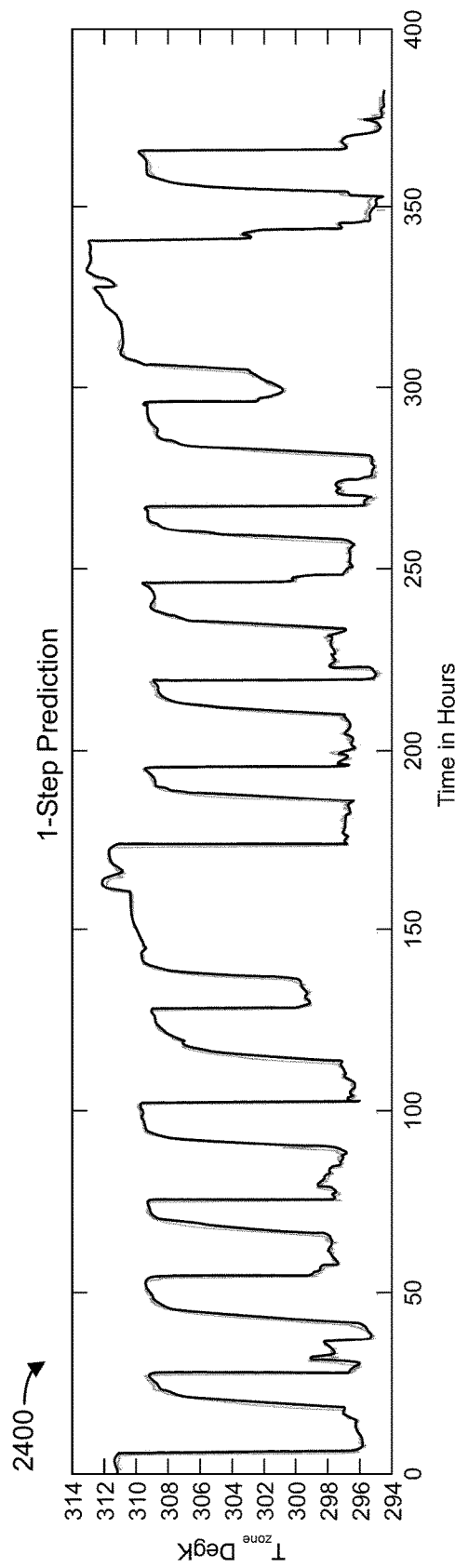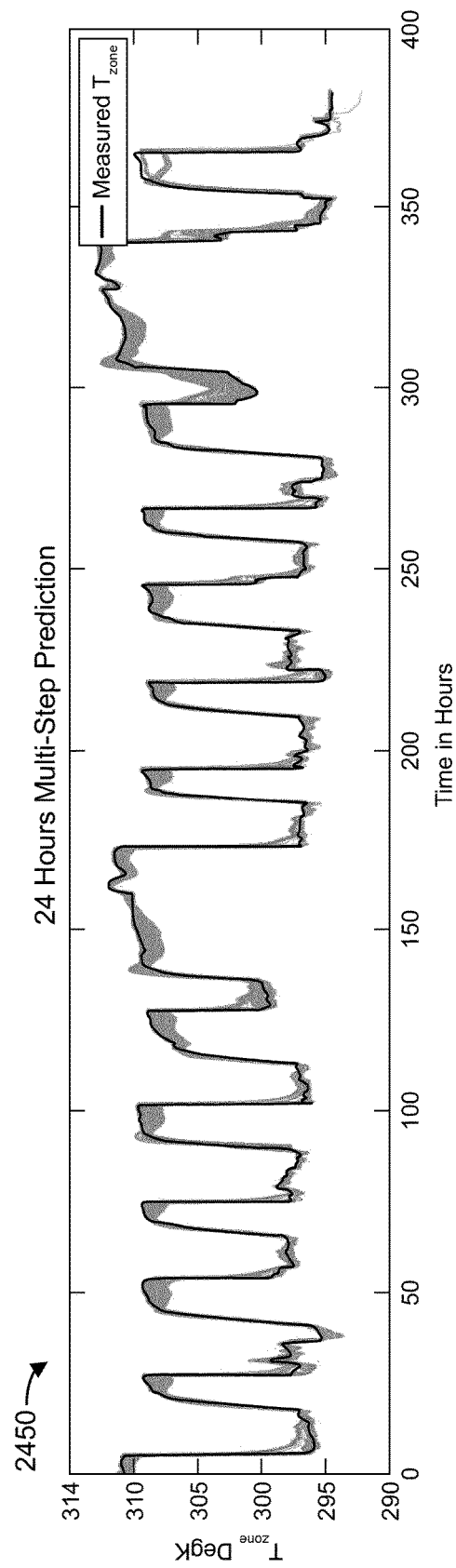

BUILDING CONTROL SYSTEM WITH ADAPTIVE ONLINE SYSTEM IDENTIFICATION

CROSS-REFERENCE TO RELATED PATENT APPLICATION

This application is a continuation-in-part of U.S. patent application Ser. No. 16/513,054 filed Jul. 16, 2019, the entire contents of which is incorporated herein by reference.

BACKGROUND

The present disclosure relates generally to control systems for a building. The present disclose relates more particularly to system identification for controlling building equipment.

System identification refers to the determination of a model describes a system. For example, system identification may be used to identify a system describing environmental conditions. Because the physical phenomena that govern such systems are often complex, nonlinear, and poorly understood, system identification requires the determination of model parameters based on measured and recorded data from the real system in order to generate an accurate predictive model.

SUMMARY

One implementation of the present disclosure is a controller for equipment that operates to affect a variable state or condition of a building, according to some embodiments. The controller includes one or more processors. The controller includes one or more non-transitory computer-readable media storing instructions that, when executed by the one or more processors, cause the one or more processors to perform operations. The operations include generating a new predictive model using training data associated with system dynamics of the building and one or more durations selected from a time period. The new predictive model models the system dynamics of the building during. The one or more durations are selected to satisfy a set of criteria. The operations include storing the new predictive model in a database including predictive models that model the system dynamics of the building. The operations include comparing performance of the new predictive model and the predictive models stored by the database to select a particular predictive model for controlling the equipment. The operations include using the particular predictive model to generate and provide control signals to the equipment.

In some embodiments, comparing the performance of the new predictive model and the predictive models stored by the database includes determining a quality of predictions for predictions of the new predictive model and of the predictive models stored by the database relative to a data set associated with a second time period. Comparing the performance of the new predictive model and the predictive models stored by the database includes identifying a least accurate predictive model and a most accurate predictive model based on the quality of predictions for the predictions of the new predictive model and of the predictive models stored by the database. Comparing the performance of the new predictive model and the predictive models stored by the database includes determining whether the database has reached a maximum model storage capacity. Comparing the performance of the new predictive model and the predictive models stored by the database includes deleting the least accurate predictive model from the database in response to determining the database has reached the maximum model storage capacity.

In some embodiments, the set of criteria includes at least one of a first criteria requiring that a correlation between a temperature of the building and a temperature setpoint is greater than a first threshold, a second criteria requiring that a number of setpoint changes during a duration is greater than a second threshold, or a third criteria requiring that an amount of time that the equipment is in operation during the duration is greater than a third threshold.

In some embodiments, using the particular predictive model to generate and provide the control signals to the equipment includes determining whether a quality of predictions calculated from predictions of the particular predictive model satisfies a quality of predictions threshold. Using the particular predictive model to generate and provide the control signals to the equipment includes, in response to a determination that the quality of predictions satisfies the quality of predictions threshold, using the particular predictive model to generate and provide the control signals to the equipment.

In some embodiments, the operations include executing a system identification process to generate another new predictive model in response to a determination that a quality of predictions calculated from predictions of the particular predictive model does not satisfy a quality of predictions threshold.

In some embodiments, the operations include, in response to determining an amount of setpoints changes in the training data is below a threshold amount, executing one or more setpoint changes on the equipment to generate new training data for the system identification process.

In some embodiments, the operations include performing an experiment including sending setpoints to the equipment to generate the training data. The training data describes one or more system characteristics that characterize the system dynamics of the building.

Another implementation of the present disclosure is a method for operating heating, ventilation, or air conditioning (HVAC) equipment, according to some embodiments. The method includes obtaining a first predictive model that models system dynamics of a building. The first predictive model includes heat disturbance parameters. The method includes training a second predictive model that predicts heat disturbances affecting the building. The method includes updating the heat disturbance parameters of the first predictive model based on the second predictive model. The method includes controlling the HVAC equipment using the first predictive model with the updated heat disturbance parameters and using the second predictive model.

In some embodiments, the method includes training the first predictive model based on calculated heat disturbance values and weather data.

In some embodiments, the method includes performing a system identification process including identifying additional system parameters of the first predictive model in response to a determination that a quality of predictions calculated from predictions of the first predictive model does not satisfy a quality of predictions threshold.

In some embodiments, identifying the heat disturbance parameters includes maintaining a constant value of one or more system parameters during identification of the heat disturbance parameters. The system dynamics include system thermal dynamics. The heat disturbance parameters include parameters of a stochastic heat disturbance prediction model and parameters of a Kalman gain.

In some embodiments, the method includes selecting a most accurate predictive model of one or more available predictive models including the first predictive model. The method includes operating the HVAC equipment using the most accurate predictive model in response to a determination that a quality of predictions calculated from predictions of the most accurate predictive model satisfies a quality of predictions threshold.

Another implementation of the present disclosure is a method for operating heating, ventilation, or air conditioning (HVAC) equipment, according to some embodiments. The method includes obtaining a predictive model including a first set of parameters and a second set of parameters. The method includes performing a first update by updating the first set of parameters. The method includes, in response to updating the first set of parameters, determining whether a quality of predictions calculated from predictions of the predictive model satisfies a quality of predictions threshold. The method includes, in response to a determination that the quality of predictions does not satisfy the quality of predictions threshold, performing a second update by updating the first set of parameters and the second set of parameters. The method includes controlling the HVAC equipment using the updated predictive model.

In some embodiments, the method includes performing a system identification process to generate values for one or more parameters of the predictive model based on training data associated with the system dynamics of a building.

In some embodiments, the first set of parameters includes heat disturbance parameters describing heat disturbances affecting a building. The second set of parameters includes system parameters describing thermal dynamics of the building.

In some embodiments, controlling the HVAC equipment using the updated predictive model includes using the predictive model that results from updating only the first set of parameters in response to a determination that the quality of predictions calculated from the predictions of the predictive model satisfies the quality of predictions threshold.

In some embodiments, the method includes, in response to updating the first set of parameters and the second set of parameters, determining whether a new quality of predictions calculated from new predictions of the predictive model satisfies the quality of predictions threshold. The method includes, in response to a determination that the new quality of predictions does not satisfy the quality of predictions threshold, executing a data selection process to select data including HVAC excitations from existing system data. The method includes identifying a new predictive model based on the data including the HVAC excitations.

In some embodiments, the method includes, in response to updating the first set of parameters and the second set of parameters, determining whether a new quality of predictions calculated from new predictions of the predictive model satisfies the quality of predictions threshold. The method includes, in response to a determination that the new quality of predictions does not satisfy the quality of predictions threshold, performing a system identification experiment to generate new system data describing system dynamics. The method includes identifying a new predictive model based on the new system data.

In some embodiments, the method includes selecting one or more durations in the new system data that satisfy a set of criteria. The method includes identifying the new predictive model based on data included in the one or more durations.

In some embodiments, obtaining the predictive model includes evaluating a quality of predictions of predictions of predictive models stored by a database. Obtaining the predictive model includes selecting one of the predictive models stored by the database with predictions associated with a highest quality of predictions as the predictive model.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

BRIEF DESCRIPTION OF THE FIGURES

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

FIG. 22 is a graph illustrating predictions of a deterministic portion of heat disturbance based on a deterministic heat disturbance prediction model obtained based on the values of FIG. 21, according to some embodiments.

FIG. 23A is a graph illustrating one-step predictions of a predictive model identified by light online SI in the example experiment of FIG. 17, according to some embodiments.

FIG. 23B is a graph illustrating multi-step predictions of the predictive model identified by light online SI in the example experiment of FIG. 17, according to some embodiments.

FIG. 24A is a graph illustrating one-step predictions of a predictive model identified by intensive online SI in the example experiment of FIG. 17, according to some embodiments.

FIG. 24B is a graph illustrating multi-step predictions of the predictive model identified by intensive online SI in the example experiment of FIG. 17, according to some embodiments.

DETAILED DESCRIPTION OF THE FIGURES

Overview

Figure 1:
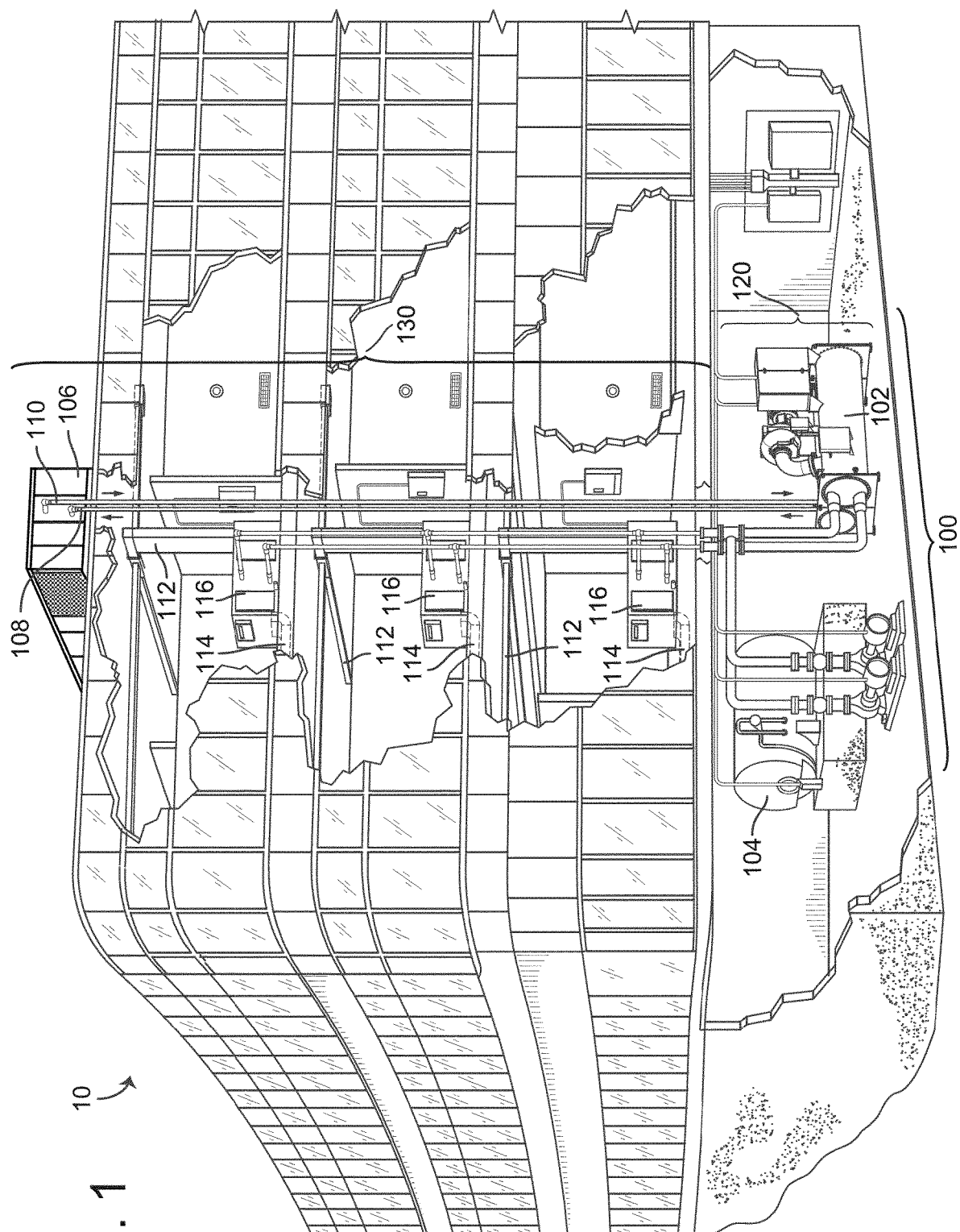
FIG. 1 is a drawing of a building equipped with a HVAC system, according to some embodiments.

Referring generally to the FIGURES, systems and methods for performing adaptive online system identification (SI) are shown, according to some embodiments. Generating accurate predictive models through system identification can be critical for various control methods for building equipment such as model predictive control (MPC). Without an accurate predictive model, said control methods may generate control decisions that do not maintain occupant comfort and/or optimize (e.g., reduce) costs. Performing system identification can identify a predictive model that captures crucial system dynamics (e.g., thermal dynamics) and produces accurate multi-step predictions of system evolution into the future. However, accuracy of the predictive model may decrease with time due to various factors such as, for example, changes in disturbances or changes in physical properties of the system. As full system identification processes can be computationally expensive, adaptive online SI is proposed to improve accuracy of the predictive model without necessitating a full SI process be performed to generate a new predictive model if accuracy of the predictive model drifts from preferred values.

Modeling system dynamics (e.g., building energy dynamics, heating, ventilation, or air conditioning (HVAC) dynamics, etc.) through system identification can include steps of identifying a deterministic heat disturbance model, identifying system dynamics and a scale factor of deterministic heat disturbance, and identifying a Kalman gain and a stochastic heat disturbance prediction model. By performing said steps, a predictive model can be generated to model various system dynamics. Advantageously, modeling of the system dynamics need not be limited to building thermal models. The above steps (or some portion of them) can be applied to model other dynamics in buildings such as, for example, relative humidity, particulate matter 2.5 (PM2.5), carbon dioxide, etc. However, system identification alone may be performed in batch form such that each step is completely remodeled using only new data gathered during a system identification experiment. This may result in old data that is rich in content and/or previous predictive models being ignored and not utilized.

To improve upon system identification, adaptive SI utilizes old models and/or old data coupled with new data collected online to generate new and more accurate predictive models. In particular, adaptive SI can include two adaptive SI frameworks including light online SI and intensive online SI. Light online SI can be utilized to adjust a predictive model to account for changes in heat disturbances on frequent basis. Heat disturbances may change frequently due to changes in solar effects, occupant dynamics, and other factors that change regularly. As physical properties of buildings may not change frequently, light online SI can keep models some system dynamical models constant and only remodel a Kalman gain and heat disturbance models to improve accuracy of the predictive model. In this way, light online SI can be performed regularly to keep the predictive model accurate without unnecessary processing requirements for full SI.

Intensive online SI can be performed if light online SI fails to generate new/updated predictive models with acceptable multi-step prediction accuracy needed for MWC and/or other applications. If light online SI fails to generate acceptable predictive models, this may indicate that physical properties of the system have changed. As such, intensive online SI can further re-identify system dynamics to capture changes in the physical properties. Advantageously, as intensive online SI may be more computationally expensive than light online SI, intensive online SI may only need to be performed occasionally (e.g., seasonally, quarterly, etc.) as compared to light online SI which can be performed more frequently (e.g., daily, weekly, monthly, etc.). These and other features of adaptive online system identification are described in greater detail below.

Building HVAC Systems

Referring to FIG. 1, a perspective view of a building 10 is shown. Building 10 is served by a building management system (BMS). A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

The BMS that serves building 10 includes a HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10.

HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 may place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 may transfer heat between the airflow and the working fluid to provide heating or cooling for the airflow. For example, AHU 106 can include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve setpoint conditions for the building zone.

HVAC system 100 thereby provides heating and cooling to the building 10. The building 10 also includes other sources of heat transfer that the indoor air temperature in the building 10. The building mass (e.g., walls, floors, furniture) influences the indoor air temperature in building 10 by storing or transferring heat (e.g., if the indoor air temperature is less than the temperature of the building mass, heat transfers from the building mass to the indoor air). People, electronic devices, other appliances, etc. ("heat load") also contribute heat to the building 10 through body heat, electrical resistance, etc. Additionally, the outside air temperature impacts the temperature in the building 10 by providing heat to or drawing heat from the building 10.

HVAC System and Model

Figure 2:
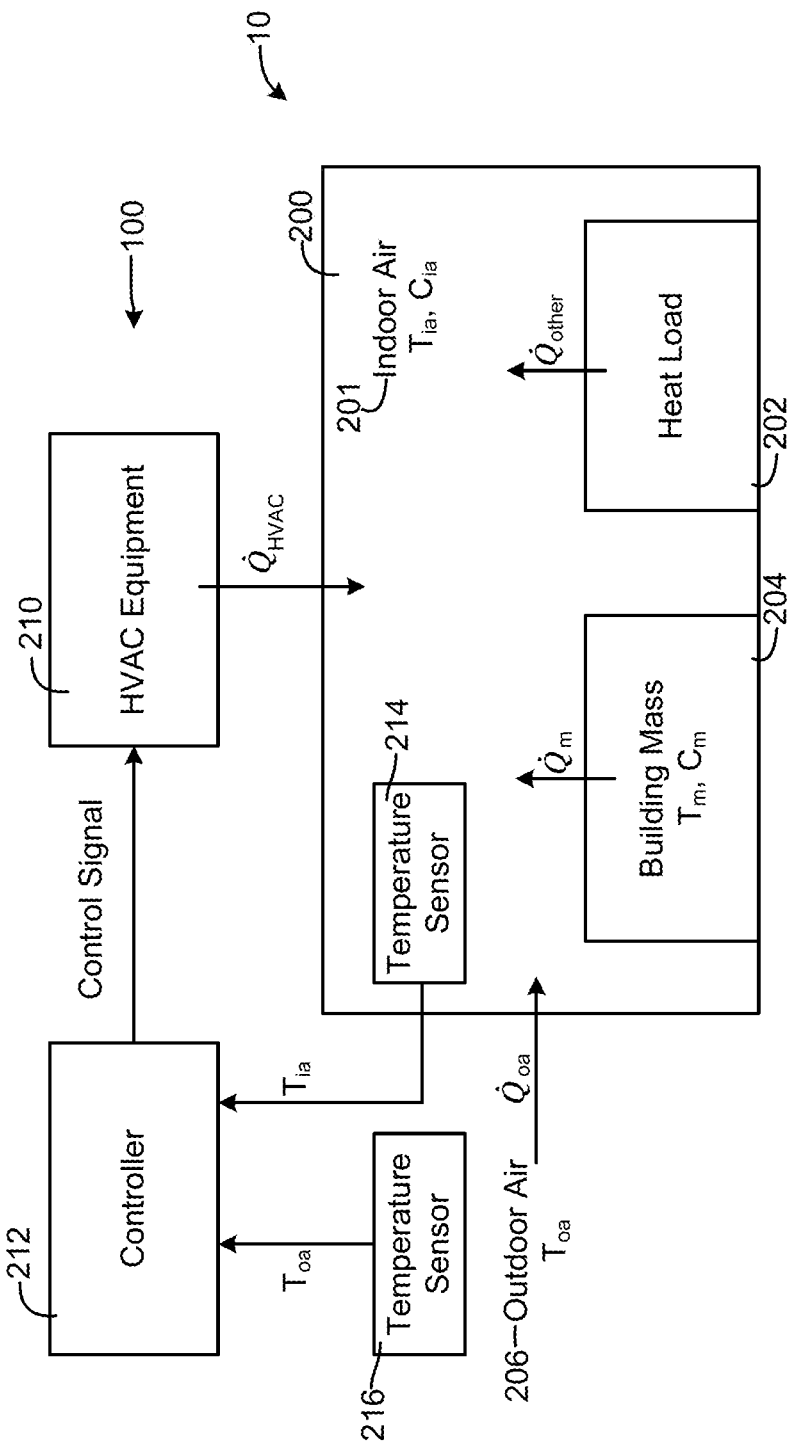
FIG. 2 is a block diagram of the building and HVAC system of FIG. 1, according to some embodiments.

Referring now to FIG. 2, a block diagram of the HVAC system 100 with building 10 is shown, according to an exemplary embodiment. More particularly, FIG. 2 illustrates the variety of heat transfers that affect the indoor air temperature $T_{ia}$ of the indoor air 201 in zone 200 of building 10. Zone 200 is a room, floor, area, etc. of building 10. In general, the primary goal of the HVAC system 100 is to maintain the indoor air temperature $T_{ia}$ in the zone 200 at or around a desired temperature to facilitate the comfort of occupants of the zone 200 or to meet other needs of the zone 200.

As shown in FIG. 2, the indoor air temperature $T_{ia}$ of the zone 200 has a thermal capacitance Ca. The indoor air temperature $T_{ia}$ is affected by a variety of heat transfers $\dot{Q}$ into the zone 200, as described in detail below. It should be understood that although all heat transfers $\dot{Q}$ are shown in FIG. 2 as directed into the zone 200, the value of one or more of the heat transfers $\dot{Q}$ may be negative, such that heat flows out of the zone 200.

The heat load 202 contributes other heat transfer $\dot{Q}_{other}$ to the zone 200. The heat load 202 includes the heat added to the zone by occupants (e.g., people, animals) that give off body heat in the zone 200. The heat load 202 also includes computers, lighting, and other electronic devices in the zone 200 that generate heat through electrical resistance, as well as solar irradiance.

The building mass 204 contributes building mass heat transfer $\dot{Q}_m$ to the zone 200. The building mass 204 includes the physical structures in the building, such as walls, floors, ceilings, furniture, etc., all of which can absorb or give off heat. The building mass 204 has a temperature $T_m$ and a lumped mass thermal capacitance $C_m$. The resistance of the building mass 204 to exchange heat with the indoor air 201 (e.g., due to insulation, thickness/layers of materials, etc.) may be characterized as mass thermal resistance $R_{mi}$.

The outdoor air 206 contributes outside air heat transfer $\dot{Q}_{oa}$ to the zone 200. The outdoor air 206 is the air outside of the building 10 with outdoor air temperature $T_{oa}$. The outdoor air temperature $T_{oa}$ fluctuates with the weather and climate. Barriers between the outdoor air 206 and the indoor air 201 (e.g., walls, closed windows, insulation) create an outdoor-indoor thermal resistance $R_{oi}$ to heat exchange between the outdoor air 206 and the indoor air 201.

The HVAC system 100 also contributes heat to the zone 200, denoted as $\dot{Q}_{HVAC}$. The HVAC system 100 includes HVAC equipment 210, controller 212, an indoor air temperature sensor 214 and an outdoor air temperature sensor 216. The HVAC equipment 210 may include the waterside system 120 and airside system 130 of FIG. 1, or other suitable equipment for controllably supplying heating and/or cooling to the zone 200. In general, HVAC equipment 210 is controlled by a controller 212 to provide heating (e.g., positive value of $\dot{Q}_{HVAC}$) or cooling (e.g., a negative value of $\dot{Q}_{HVAC}$) to the zone 200.

The indoor air temperature sensor 214 is located in the zone 200, measures the indoor air temperature $T_{ia}$, and provides the measurement of $T_{ia}$ to the controller 212. The outdoor air temperature sensor 216 is located outside of the building 10, measures the outdoor air temperature $T_{oa}$, and provides the measurement of $T_{oa}$ to the controller 212.

The controller 212 receives the temperature measurements $T_{oa}$ and $T_{ia}$, generates a control signal for the HVAC equipment 210, and transmits the control signal to the HVAC equipment 210. The operation of the controller 212 is discussed in detail below. In general, the controller 212 considers the effects of the heat load 202, building mass 204, and outdoor air 206 on the indoor air 201 in controlling the HVAC equipment 210 to provide a suitable level of $\dot{Q}_{HVAC}$. A model of this system for use by the controller 212 is described with reference to FIG. 3.

In the embodiments described herein, the control signal provide to the HVAC equipment 210 by the controller 110 indicates a temperature setpoint $T_{sp}$ for the zone 200. To determine the temperature setpoint $T_{sp}$, the controller 212 assumes that the relationship between the indoor air temperature $T_{ia}$ and the temperature setpoint $T_{sp}$ follows a proportional-integral control law with saturation, represented as:

$$\dot{Q}_{HVAC,j} = K_{p,j}\varepsilon_{sp} + K_{I,j}\int_0^t \varepsilon_{sp}(s)ds \quad \text{(Eq.A)}$$

$$\varepsilon_{sp} = T_{sp,j} - T_{ia} \quad \text{(Eq.B)}$$

where $j \in \{clg, hlg\}$ is the index that is used to denote either heating or cooling mode. Different parameters $K_{p,j}$ and $K_{I,j}$ are needed for the heating and cooling mode. Moreover, the heating and cooling load is constrained to the following set: $Q_{HVAC,j} \in [0, \dot{Q}_{clg,max}]$ for cooling mode (j=clg) and $\dot{Q}_{HVAC,j} \in [-\dot{Q}_{htg,max}, 0]$ for heating mode (j=htg). As discussed in detail below with reference to FIG. 4, the controller 212 uses this model in generating a control signal for the HVAC equipment 210.

Figure 3:
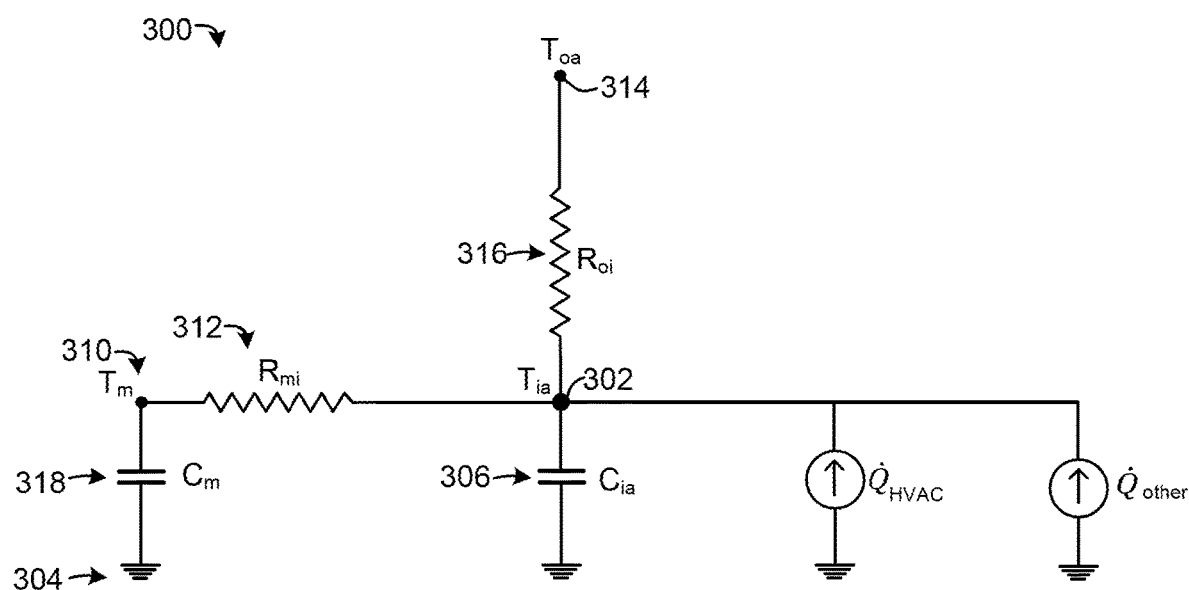
FIG. 3 is a circuit-style diagram of a model of the building and HVAC system of FIG. 1, according to some embodiments.

Referring now to FIG. 3, a circuit-style diagram 300 corresponding to the zone 200 and the various heat transfers $\dot{Q}$ of FIG. 2 is shown, according to an exemplary embodiment. In general, the diagram 300 models the zone 200 as a two thermal resistance, two thermal capacitance, control-oriented thermal mass system. This model can be characterized by the following system of linear differential equations, described with reference to FIG. 3 below:

$$C_{ia}\dot{T}_{ia} = \frac{1}{R_{mi}}(T_m - T_{ia}) + \frac{1}{R_{oi}}(T_{oa} - T_{ia}) - \dot{Q}_{HVAC} + \dot{Q}_{other} \quad \text{(Eq.C)}$$

$$C_m\dot{T}_m = \frac{1}{R_{mi}}(T_{ia} - T_m) \quad \text{(Eq.D)}$$

where the first line (Eq. C) focuses on the indoor air temperature $T_{ia}$, and each term in Eq. C corresponds to a branch of diagram 300 as explained below:

Indoor air node 302 corresponds to the indoor air temperature $T_{ia}$. From indoor air node 302, the model branches in several directions, including down to a ground 304 via a capacitor 306 with a capacitance $C_{ia}$. The capacitor 306 models the ability of the indoor air to absorb or release heat and is associated with the rate of change of the indoor heat transfer $\dot{T}_{ia}$. Accordingly, the capacitor 306 enters Eq. C on the left side of the equation as $C_{ia}\dot{T}_{ia}$.

From indoor air node 302, the diagram 300 also branches left to building mass node 310, which corresponds to the thermal mass temperature $T_m$. A resistor 312 with mass thermal resistance $R_{mi}$ separates the indoor air node 302 and the building mass node 310, modeling the heat transfer $\dot{Q}_m$ from the building mass 204 to the indoor air 201 as $$\frac{1}{R_{mi}}(T_m - T_{ia}).$$

This term is included on the right side of Eq. C above as contributing to the rate of change of the indoor air temperature $\dot{T}_{ia}$.

The diagram 300 also branches up from indoor air node 302 to outdoor air node 314. A resistor 316 with outdoor-indoor thermal resistance $R_{oi}$ separates the indoor air node 302 and the outdoor air node 314, modeling the flow heat from the outdoor air 206 to the indoor air 201 as $$\frac{1}{R_{oi}}(T_{oa} - T_{ia}).$$

This term is also included on the right side of Eq. C above as contributing to the rate of change of the indoor air temperature $\dot{T}_{ia}$.

Also from indoor air node 302, the diagram 300 branches right to two $\dot{Q}$ sources, namely $\dot{Q}_{HVAC}$ and $\dot{Q}_{other}$. As mentioned above, $\dot{Q}_{other}$ corresponds to heat load 202 and to a variety of sources of energy that contribute to the changes in the indoor air temperature $T_{ia}$. $\dot{Q}_{other}$ is not measured or controlled by the HVAC system 100, yet contributes to the rate of change of the indoor air temperature $\dot{T}_{ia}$. $\dot{Q}_{HVAC}$ is generated and controlled by the HVAC system 100 to manage the indoor air temperature $T_{ia}$. Accordingly, $\dot{Q}_{HVAC}$ and $\dot{Q}_{other}$ are included on the right side of Eq. C above.

The second nonlinear differential equation (Eq. D) above focuses on the rate of change $\dot{T}_m$ in the building mass temperature T. The capacity of the building mass to receive or give off heat is modelled by capacitor 318. Capacitor 318 has lumped mass thermal capacitance $C_m$ and is positioned between a ground 304 and the building mass node 310 and regulates the rate of change in the building mass temperature $T_m$. Accordingly, the capacitance $C_m$ is included on left side of Eq. D. Also branching from the building mass node 310 is resistor 312 leading to indoor air node 302. As mentioned above, this branch accounts for heat transfer $\dot{Q}_m$ between the building mass 204 and the indoor air 201. Accordingly, the term $$\frac{1}{R_{mi}}(T_{ia} - T_m)$$

is included on the right side of Eq. D.

As described in detail below, the model represented by diagram 300 is used by the controller 212 in generating a control signal for the HVAC equipment 210. More particularly, the controller 212 uses a state-space representation of the model shown in diagram 300. The state-space representation used by the controller 212 can be derived by incorporating Eq. A and B with Eq. C and D, and writing the resulting system of equations as a linear system of differential equations to get:

$$\begin{bmatrix} \dot{T}_{ia} \\ \dot{T}_m \\ \dot{I} \end{bmatrix} = \begin{bmatrix} \frac{1}{C_{ia}}\left(K_{p,j} - \frac{1}{R_{mi}} - \frac{1}{R_{oi}}\right) & \frac{1}{C_{ia}R_{mi}} & \frac{K_{I,j}}{C_{ia}} \\ \frac{1}{C_m R_{mi}} & -\frac{1}{C_m R_{mi}} & 0 \\ -1 & 0 & 0 \end{bmatrix} \begin{bmatrix} T_{ia} \\ T_m \\ I \end{bmatrix} + \quad \text{(Eq. E)}$$

$$\begin{bmatrix} -\frac{K_{p,j}}{C_{ia}} & \frac{1}{C_{ia}R_{oi}} \\ 0 & 0 \\ 1 & 0 \end{bmatrix} \begin{bmatrix} T_{spj} \\ T_{oa} \end{bmatrix} + \begin{bmatrix} \frac{1}{C_{ia}} \\ 0 \\ 0 \end{bmatrix} \dot{Q}_{other};$$

$$\begin{bmatrix} T_{ia} \\ \dot{Q}_{HVAC,j} \end{bmatrix} = \begin{bmatrix} 1 & 0 & 0 \\ -K_{p,j} & 0 & K_{I,j} \end{bmatrix} \begin{bmatrix} T_{ia} \\ T_m \\ I \end{bmatrix} + \begin{bmatrix} 0 & 0 \\ K_{p,j} & 0 \end{bmatrix} \begin{bmatrix} T_{spj} \\ T_{oa} \end{bmatrix}; \quad \text{(Eq. F)}$$

where I represents the integral term $\int_0^t \varepsilon_{sp}(s)\, ds$ from Eq. A. The resulting linear system has three states ($T_{ia}$, $T_m$, I), two inputs ($T_{sp,j}$, $T_{oa}$), two outputs ($T_{ia}$, $\dot{Q}_{HVAC}$), and one disturbance $\dot{Q}_{other}$. Because $\dot{Q}_{other}$ is not measured or controlled, the controller 212 models the disturbance using an input disturbance model that adds a forth state d to the state space representation. In a more compact form, this linear system of differential equations can be written as:

$$\dot{x}(t) = A_c(\theta)x(t) + B_c(\theta)u(t); \quad \text{(Eq. G)}$$

$$y(t) = C_c(\theta)x(t) + D_c(\theta)u(t); \text{ where} \quad \text{(Eq. H)}$$

$$A_c(\theta) = \begin{bmatrix} -(\theta_1 + \theta_2 + \theta_3\theta_4) & \theta_2 & \theta_3\theta_4\theta_5 \\ \theta_6 & -\theta_6 & 0 \\ -1 & 0 & 0 \end{bmatrix},$$

$$B_c(\theta) = \begin{bmatrix} \theta_3\theta_4 & \theta_1 \\ 0 & 0 \\ 1 & 0 \end{bmatrix}, C_c(\theta) = \begin{bmatrix} 1 & 0 & 0 \\ -\theta_4 & 0 & \theta_5\theta_4 \end{bmatrix},$$

$$D_c(\theta) = \begin{bmatrix} 0 & 0 \\ \theta_4 & 0 \end{bmatrix}; \theta_1 = \frac{1}{C_{ia}R_{oi}}; \theta_2 = \frac{1}{C_{ia}R_{mi}}; \theta_3 = \frac{1}{C_{ia}};$$

$$\theta_4 = K_p; \theta_5 = \frac{1}{\tau}; \theta_6 = \frac{1}{C_m R_{mi}}; \text{ and}$$

$$\dot{x}(t) = \begin{bmatrix} \dot{T}_{ia} \\ \dot{T}_m \\ \dot{I} \end{bmatrix}; x(t) = \begin{bmatrix} T_{ia} \\ T_m \\ I \end{bmatrix}; u(t) = \begin{bmatrix} T_{spj} \\ T_{oa} \end{bmatrix}.$$

As described in detail below, the controller 212 uses a two-step process to parameterize the system. In the first step, the controller 212 identifies the system parameters $\theta = \{\theta_1, \theta_2, \theta_3, \theta_4, \theta_5, \theta_6\}$ (i.e., the values of $C_{ia}$, $C_m$, $R_{mi}$, $R_{oi}$, $K_{p,j}$, $K_{i,j}$). The disturbance state d is then introduced into the model and a Kalman estimator gain is added, such that in the second step the controller 212 identifies the Kalman gain parameters K.

As used herein, the term 'variable' refers to an item/quantity capable of varying in value over time or with respect to change in some other variable. A "value" as used herein is an instance of that variable at a particular time. A value may be measured or predicted. For example, the temperature setpoint $T_{sp}$ is a variable that changes over time, while $T_{sp}(3)$ is a value that denotes the setpoint at time step 3 (e.g., 68 degrees Fahrenheit). The term "predicted value" as used herein describes a quantity for a particular time step that may vary as a function of one or more parameters.

Controller for HVAC Equipment with System Identification

Figure 4:
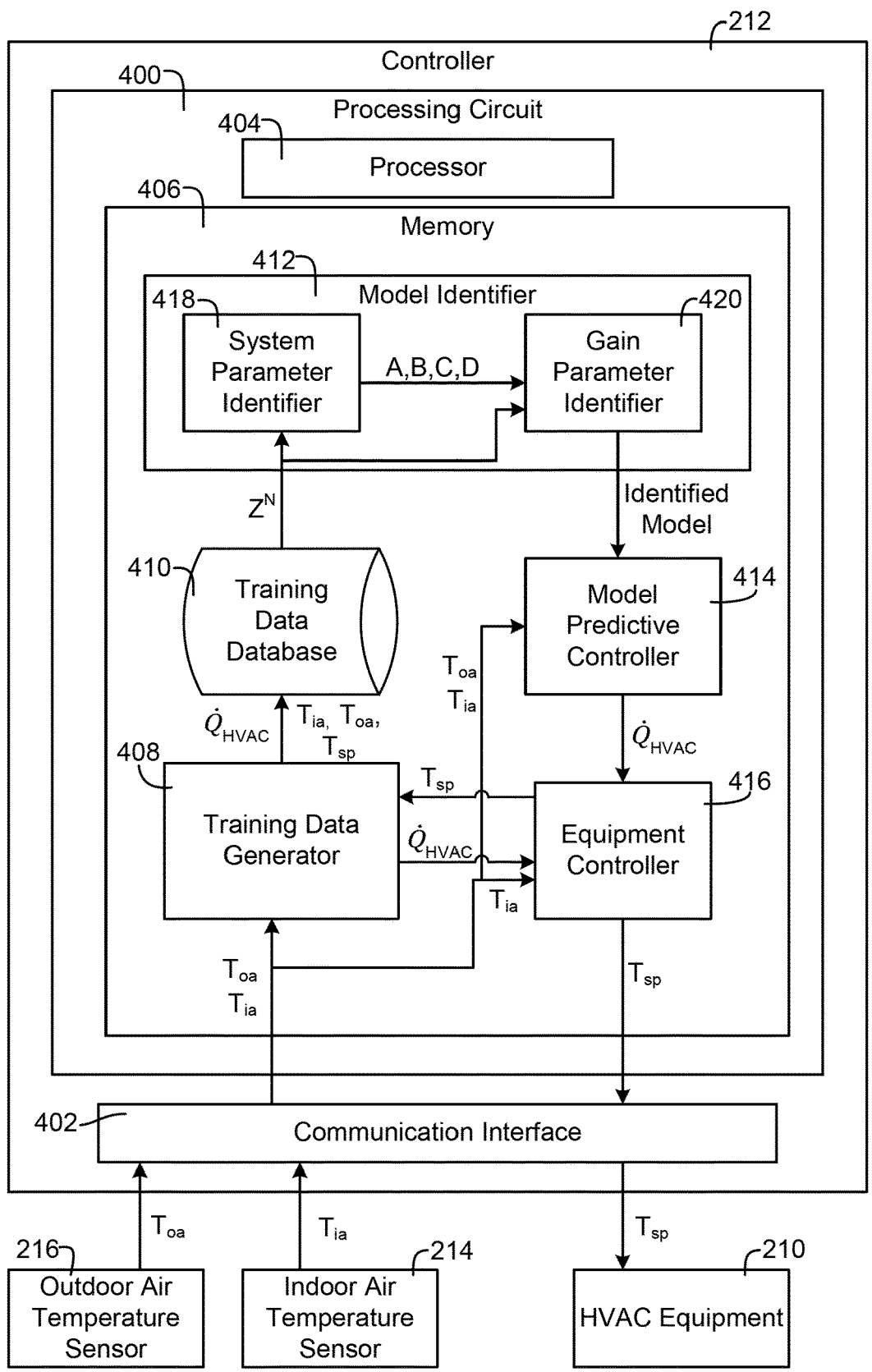
FIG. 4 is a block diagram of a controller for use with the HVAC system of FIG. 1, according to some embodiments.

Referring now to FIG. 4, a detailed diagram of the controller 212 is shown, according to an exemplary embodiment. The controller 212 includes a processing circuit 400 and a communication interface 402. The communication interface 402 is structured to facilitate the exchange of communications (e.g., data, control signals) between the processing circuit 400 and other components of HVAC system 100. As shown in FIG. 4, the communication interface 402 facilitates communication between the processing circuit 400 and the outdoor air temperature sensor 216 and the indoor air temperature sensor 214 to all temperature measurements $T_{oa}$ and $T_{ia}$ to be received by the processing circuit 400. The communication interface 402 also facilitates communication between the processing circuit 400 and the HVAC equipment 210 that allows a control signal (indicated as temperature setpoint $T_{sp}$) to be transmitted from the processing circuit 400 to the HVAC equipment 210.

The processing circuit 400 is structured to carry out the functions of the controller described herein. The processing circuit 400 includes a processor 404 and a memory 406. The processor 404 may be implemented as a general-purpose processor, an application-specific integrated circuit, one or more field programmable gate arrays, a digital signal processor, a group of processing components, or other suitable electronic processing components. The memory 406, described in detail below, includes one or more memory devices (e.g., RAM, ROM, NVRAM, Flash Memory, hard disk storage) that store data and/or computer code for facilitating at least some of the processes described herein. For example, the memory 406 stores programming logic that, when executed by the processor 404, controls the operation of the controller 212. More particularly, the memory 406 includes a training data generator 408, a training data database 410, a model identifier 412, a model predictive controller 414, and an equipment controller 416. The various generators, databases, identifiers, controllers, etc. of memory 406 may be implemented as any combination of hardware components and machine-readable media included with memory 406.

The equipment controller 416 is configured to generate a temperature setpoint $T_{sp}$ that serves as a control signal for the HVAC equipment 210. The equipment controller 416 receives inputs of the indoor air temperature $T_{ia}$ from the indoor air temperature sensor 214 via the communication interface 402 and $\dot{Q}_{HVAC}$ from the model predictive controller 414 (during normal operation) and the training data generator 408 (during a training data generation phase described in detail below). The equipment controller uses $T_{ia}$ and $\dot{Q}_{HVAC}$ to generate $T_{sp}$ by solving Eq. A and Eq. B above for $T_{sp}$. The equipment controller 416 then provides the control signal $T_{sp}$ to the HVAC equipment 210 via the communication interface 402.

The model predictive controller 414 determines $\dot{Q}_{HVAC}$ based on an identified model and the temperature measurements $T_{ia}$, $T_{oa}$, and provides $\dot{Q}_{HVAC}$ to the equipment controller 416. The model predictive controller 414 follows a model predictive control (MPC) approach. The MPC approach involves predicting future system states based on a model of the system, and using those predictions to determine the controllable input to the system (here, $\dot{Q}_{HVAC}$) that bests achieves a control goal (e.g., to maintain the indoor air temperature near a desired temperature). A more accurate model allows the MPC to provide better control based on more accurate predictions. Because the physical phenomena that define the behavior of the system (i.e., of the indoor air 201 in the building 10) are complex, nonlinear, and/or poorly understood, a perfect model derived from first-principles is generally unachievable or unworkable. Thus, the model predictive controller 414 uses a model identified through a system identification process facilitated by the training data generator 408, the training data database 410, and the model identifier 412, described in detail below.

System identification, as facilitated by the training data generator 408, the training data database 410, and the model identifier 412, is a process of constructing mathematical models of dynamic systems. System identification provides a suitable alternative to first-principles-derived model when first principles models are unavailable or too complex for on-line MPC computations. System identification captures the important and relevant system dynamics based on actual input/output data (training data) of the system, in particular by determining model parameters particular to a building or zone to tune the model to the behavior of the building/zone. As described in detail below, the training data generator 408, the training data database 410, and the model identifier 412 each contribute to system identification by the controller 212.

The training data generator 408 is configured to generate training data by providing an excitation signal to the system. That is, the training data generator provides various $\dot{Q}_{HVAC}$ values to the equipment controller 416 for a number N of time steps k, and receives the measured output response of the indoor air temperature $T_{ia}$ at each time step k_ from the air temperature sensor 214. The various $\dot{Q}_{HVAC}$ values may be chosen by the training data generator 408 to explore the system dynamics as much as possible (e.g., across a full range of possible $\dot{Q}_{HVAC}$ values, different patterns of $\dot{Q}_{HVAC}$ values, etc.).

The equipment controller 416 receives the various $\dot{Q}_{HVAC}$ values and generates various control inputs $T_{sp}$ in response. The temperature setpoint $T_{sp}$ for each time step k is provided to the HVAC equipment 210, which operates accordingly to heat or cool the zone 200 (i.e., to influence $T_{ia}$). The temperature setpoints $T_{sp}$ may also be provided to the training data generator 408 to be included in the training data. The training data generator receives an updated measurement of the indoor air temperature $T_{ia}$ for each time step k and may also receive the outdoor air temperature $T_{oa}$ for each time step k. The training data generator 408 thereby causes the states, inputs, and outputs of the system to vary across the time steps k and generates data corresponding to the inputs and outputs.

The inputs and outputs generated by the training data generator 408 are provided to the training data database 410. More particularly, in the nomenclature of the model of Eq. E and Eq. F above, the training data generator 408 provides inputs $T_{sp}$ and $T_{oa}$ and outputs $\dot{Q}_{HVAC}$ and $T_{ia}$ for each time step k to the training data database 410.

The training data database 410 stores the inputs and outputs for each time step k provided by the training data generator 408. Each input and output is tagged with a time step identifier, so that data for the same time step can be associated together. The training data database 410 thereby collects and stores input and output data for each time step k, k=0, ..., N, or, more specifically, $T_{sp}(k)$, $T_{oa}(k)$, $T_{ia}(k)$, and $\dot{Q}_{HVAC}(k)$, fork, k=0, ..., N. This data is grouped together in the training data database 410 in a set of training data $Z^N$. In the notation of Eq. G and Eq. H, $Z^N$=[y(1), u(1), y(2),u(2), ..., y(N), u(N)].

In some embodiments, the training data is refined using a saturation detection and removal process. System and methods for saturation detection and removal suitable for use to refine the training data $Z^N$ are described in U.S. patent application Ser. No. 15/900,459, filed Feb. 20, 2018, incorporated by reference herein in its entirety. For example, as described in detail therein, the training data may be filtered by determining whether the operating capacity is in a non-transient region for a threshold amount of a time period upon determining that an error for the building zone exists for the time period, and in response to a determination that the operating capacity is in the non-transient region for at least the threshold amount of the time period, indicating the time period as a saturation period. Data from the saturation period can then be removed from the training data.

The model identifier 412 accesses the training data database 410 to retrieve the training data $Z^N$ and uses the training data $Z^N$ to identify a model of the system. The model identifier 412 includes a system parameter identifier 418 and a gain parameter identifier 420. As shown in detail in FIG. 5 and discussed in detail with reference thereto, the system parameter identifier 418 carries out a first step of system identification, namely identifying the model parameters, while the gain parameter identifier 420 carries out the second step, namely determining a Kalman gain estimator. The model parameters and the Kalman gain estimator are included in an identified model of the system, and that model is provided to the model predictive controller 414. The model predictive controller can thus facilitate the control of the HVAC equipment 210 as described above.

Figure 5:
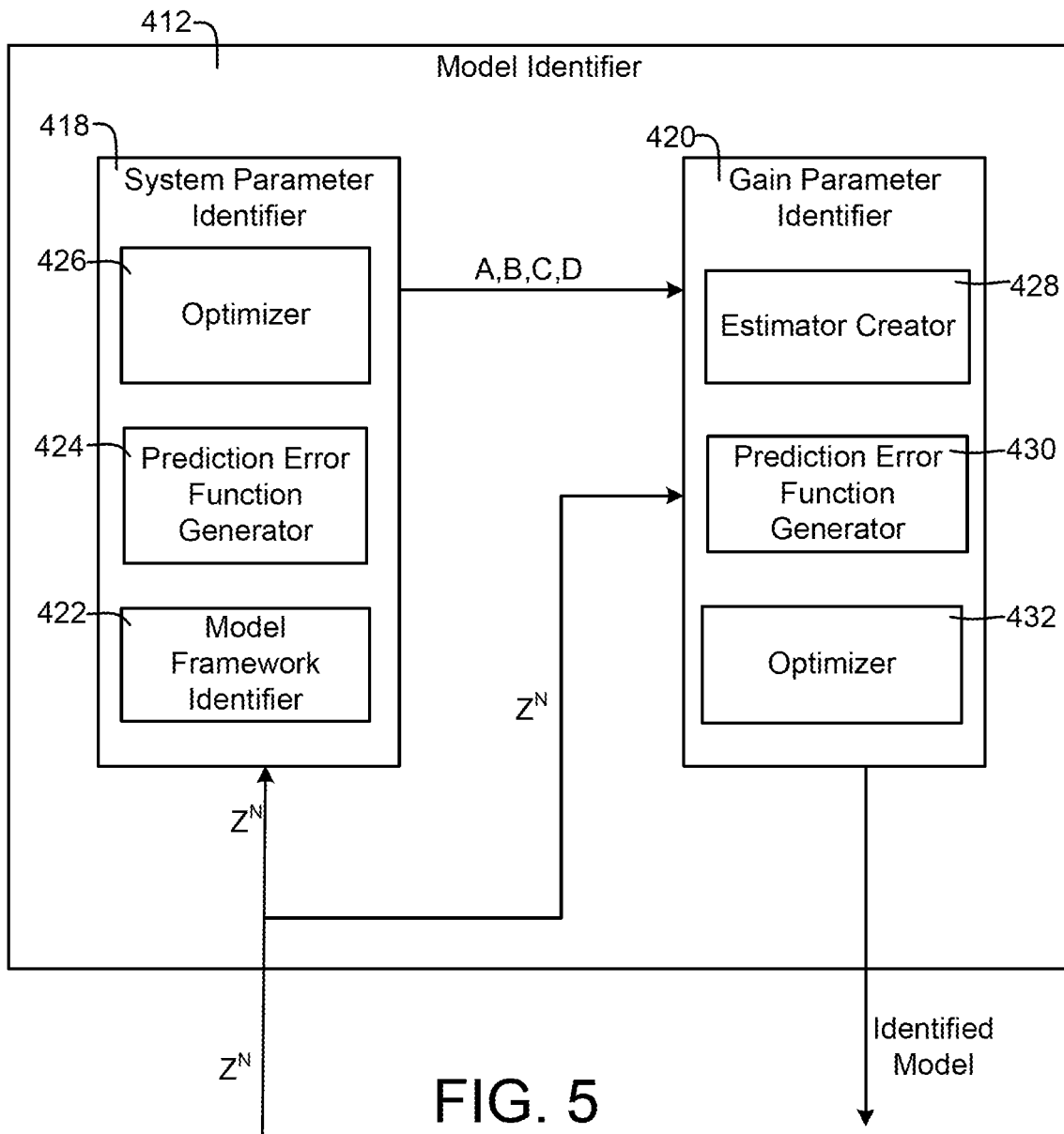
FIG. 5 is a detailed block diagram of a model identifier of the controller of FIG. 4, according to some embodiments.

Referring now to FIG. 5, a detailed view of the model identifier 412 is shown, according to an exemplary embodiment. As mentioned above, the model identifier 412 includes the system parameter identifier 418 and the gain parameter identifier 420. The system parameter identifier 418 is structured to identify the matrices A, B, C, D of Eqs. G and H, i.e., the values of $\theta = \{\theta_1, \theta_2, \theta_3, \theta_4, \theta_5, \theta_6\}$. In the embodiment described herein, this corresponds to finding the values of $C_{ia}$, $C_m$, $R_{mi}$, $R_{oi}$, $K_{p,j}$, and $K_{i,j}$.

The system parameter identifier 418 includes a model framework identifier 422, a prediction error function generator 424, and an optimizer 426. The model framework identifier 422 identifies that the model of the system, denoted as $\mathcal{M}(\theta)$, corresponds to the form described above in Eqs. G and H, i.e., $$\dot{x}(t) = A_c(\theta)x(t) + B_c(\theta)u(t); \qquad \text{(Eq. G)}$$

$$y(t) = C_c(\theta)x(t) + D_c(\theta)u(t); \qquad \text{(Eq. H)}.$$

The model framework identifier 422 thereby determines that the system parameter identifier 418 has the goal of determining a parameter vector $\hat{\theta}_N$ from the set of $\theta \in D_\mathcal{M} \subset \mathbb{R}^d$, where $D_\mathcal{M}$ is the admissible model parameter values. The resulting possible models are given by the set: M= $\{\mathcal{M}(\theta), \theta \in D_\mathcal{M}\}$. The goal of the system parameter identifier 418 is to select a parameter vector $\hat{\theta}_N$ from among possible values of $\theta$ that best matches the model to the physical system (i.e., the vector $\theta$ is a list of variables and the vector $\hat{\theta}_N$ is a list of values), thereby defining matrices A, B, C, and D. The model framework identifier 422 also receives training data $Z^N$ and sorts the training data (i.e., $T_{sp}(k)$, $T_{oa}(k)$, $T_{ia}(k)$, and $\dot{Q}_{HVAC}(k)$, for k, k=0, ..., N) into the notation of Eq. G-H as input/output data $Z^N$=[y(1),u(1), y(2),u(2), ..., y(N), u(N)].

The prediction error function generator 424 receives the model framework M=$\{\mathcal{M}(\theta), \theta \in D_\mathcal{M}\}$ and the training data $Z^N$ from the model framework identifier 422. The prediction error function generator 424 applies a prediction error method to determine the optimal parameter vector $\hat{\theta}_N$. In general, prediction error methods determine the optimal parameter vector $\hat{\theta}_N$ by minimizing some prediction performance function $V_N(\theta, Z^N)$ that is based in some way on the difference between predicted outputs and the observed/measured outputs included in the training data $Z^N$. That is, the parameter estimation $\hat{\theta}_N$ is determined as:

$$\hat{\theta}_N = \hat{\theta}_N(Z^N) = \arg\min_{\theta \in D_\mathcal{M}} V_N(\theta, Z^N).$$

The prediction error function generator 424 use one or more of several possible prediction error approaches to generate a prediction performance function $V_N(\theta,Z^N)$. In the embodiment shown, the prediction error function generator applies a simulation approach. In the simulation approach, the prediction error function generator 424 uses the model $\mathcal{M}(\theta)$, the input trajectory [u(1),u(2), . . . ,u(N)], and an initial state x(0) to produce predicted outputs in terms of θ. That is, the prediction error function generator 424 predicts:

[ŷ(1|0,θ),ŷ(2|0,θ) . . . ŷ(k|0,θ) . . . ,ŷ(N|0,θ)], where ŷ(k|0,θ) denotes the predicted output at time step k given the training data from time 0 and the model $\mathcal{M}(\theta)$. The prediction error function generator 424 then calculates a prediction error at each time step k is given by ε(k,θ):=y(k)−ŷ(k|0,θ). The prediction error function generator 424 then squares the two-norm of each prediction error ε(k,θ) and sums the results to determine the prediction performance function, which can be written as:

$$V_N(\theta,Z^N)=\Sigma_{k=1}^N \|y(k)-\hat{y}(k|0,\theta)\|_2^2 \quad \text{(Eq. I)}.$$

In an alternative embodiment, the prediction error function generator 424 applies a one-step-ahead prediction error method to generate the prediction performance function $V_N(\theta,Z^N)$. In the one-step-ahead prediction error method, the prediction error function generator 424 uses past input-output data and the model $\mathcal{M}(\theta)$ the model to predict the output one step ahead in terms of θ. That is, in the one-step ahead prediction error method, the prediction error function generator 424 generates one-step ahead predictions ŷ(k|k−1,θ), which denotes the predicted output at time step k given the past input-output sequence $Z^{k-1}$ and using parameters θ. The one-step ahead prediction ŷ(k|k−1,θ) is then compared to the measured output y(k) by the prediction error function generator 424 to determine the prediction error at k, defined as ε(k,θ):=y(k)−ŷ(k|k−1,θ). The prediction error function generator 424 then squares the two-norm of the prediction errors for each k and sums the results, generating a prediction performance function that can be expressed in a condensed form as:

$$V_N(\theta, Z^N) = \frac{1}{N}\sum_{k=1}^{N} \|y(k) - \hat{y}(k \mid k-1, \theta)\|_2^2. \quad \text{(Eq. J)}$$

In other alternative embodiments, the prediction error function generator 424 uses a multi-step ahead prediction error approach to generate the prediction performance function. The multi-step ahead prediction error approach is described in detail below with reference to the gain parameter identifier 420 and FIGS. 7A-7B.

The prediction error function generator 424 then provides the performance function $V_N(\theta,Z^N)$ (i.e., from Eq. I or Eq. J in various embodiments) to the optimizer 426.

The optimizer 426 receives the prediction error function generated by the prediction error function generator 424 and optimizes the prediction error function in θ to determine θ̂N. More specifically, the optimizer 426 finds the minimum value of the prediction error function $V_N(\theta,Z^N)$ as θ is varied throughout the allowable values of $\theta \in D_\mathcal{M}$. That is, the optimizer 426 determines $\hat{\theta}_N$ based on:

$$\hat{\theta}_N=\hat{\theta}_N(Z^N)= \arg\min_{\theta \in D_\mathcal{M}} V_N(\theta,Z^N).$$

The optimizer 426 then uses $\hat{\theta}_N$ to calculate the matrices A, B, C, and D. The system parameter identifier 418 then provides the identified matrices A, B, C, D to the gain parameter identifier 420.

The gain parameter identifier 420 receives the model with the matrices A, B, C, D (i.e., the model parameters) from system parameter identifier 418, as well as the training data $Z^N$ from the training data database 410, and uses that information to identify the gain parameters. The gain parameter identifier 420 includes an estimator creator 428, a prediction error function generator 430, and an optimizer 432.

The estimator creator 428 adds a disturbance model and introduces a Kalman estimator gain to account for thermal dynamics of the system, for example for the influence of $\dot{Q}_{other}$ on the system. The estimator creator 428 generates an augmented model with disturbance state d, given by:

$$\begin{bmatrix}\dot{x}(t)\\ \dot{d}(t)\end{bmatrix} = \begin{bmatrix}A_c & B_d\\ 0 & 0\end{bmatrix}\begin{bmatrix}x(t)\\ d(t)\end{bmatrix}+\begin{bmatrix}B_c\\ 0\end{bmatrix}u(t);$$

$$y(t) = \begin{bmatrix}C_c & C_d\end{bmatrix}\begin{bmatrix}x(t)\\ d(t)\end{bmatrix} + D_c u(t)$$

where the parameters $A_c$, $B_c$, $C_c$, and $D_c$ are the matrices A, B, C, D received from the system parameter identifier 418 and the disturbance model is selected with $$B_d = \frac{1}{C_{ia}}$$

and $C_d$=0.

The estimator creator 428 then converts the model to a discrete time model, for example using 5-minute sampling periods, resulting in the matrices $A_{dis}$, $B_{dis}$, $C_{dis}$, $D_{dis}$ and the disturbance model discrete time matrix $B_{d_{dis}}$. The estimator creator 428 then adds a parameterized estimator gain, resulting in the following model:

$$\begin{bmatrix}\hat{x}(t+1 \mid t)\\ \hat{d}(t+1 \mid t)\end{bmatrix} = \begin{bmatrix}A_{dis} & B_{d_{dis}}\\ 0 & I\end{bmatrix}\begin{bmatrix}\hat{x}(t \mid t-1)\\ \hat{d}(t \mid t-1)\end{bmatrix} + \begin{bmatrix}B_{dis}\\ 0\end{bmatrix}u(t) + \quad \text{(Eq. K)}$$

$$\underbrace{\begin{bmatrix}K_x(\phi)\\ K_d(\phi)\end{bmatrix}}_{=:K(\phi)}(y(t) - \hat{y}(t \mid t-1));$$

$$\hat{y}(t \mid t-1) = \begin{bmatrix}C_{dis} & 0\end{bmatrix}\begin{bmatrix}\hat{x}(t \mid t-1)\\ \hat{d}(t \mid t-1)\end{bmatrix} + D_{dis}u(t). \quad \text{(Eq. L)}$$

The matrix K(ϕ) is the estimator gain parameterized with the parameter vector ϕ where:

$$K_x(\phi) = \begin{bmatrix}\phi_1 & \phi_2\\ \phi_3 & \phi_4\\ \phi_5 & \phi_6\end{bmatrix};$$

$$K_d(\phi) = \begin{bmatrix}\phi_7 & \phi_8\end{bmatrix}.$$

In this notation, x̂(t+1|t) is an estimate of the state at time t+1 obtained using the Kalman filter and made utilizing information at sampling time t. For example, with a sampling time of five minutes, x̂(t+1|t) is an estimate of the state five minutes after the collection of the data that the estimate is based on. The goal of the gain parameter identifier is to identify parameters $\bar{\phi}_N$ (i.e., a vector of for each of $\phi_1 \ldots \phi_8$) that make the model best match the physical system.

The estimator creator 428 then provides the discrete time model with estimator gain (i.e., Eqs. K-L) to the prediction error function generator 430. The prediction error function generator receives the model from the estimator creator 428 as well as the training data $Z^N$ from the training data database 410, and uses the model (with the estimator gain) and the training data $Z^N$ to generate a prediction performance function.

Figure 7A:
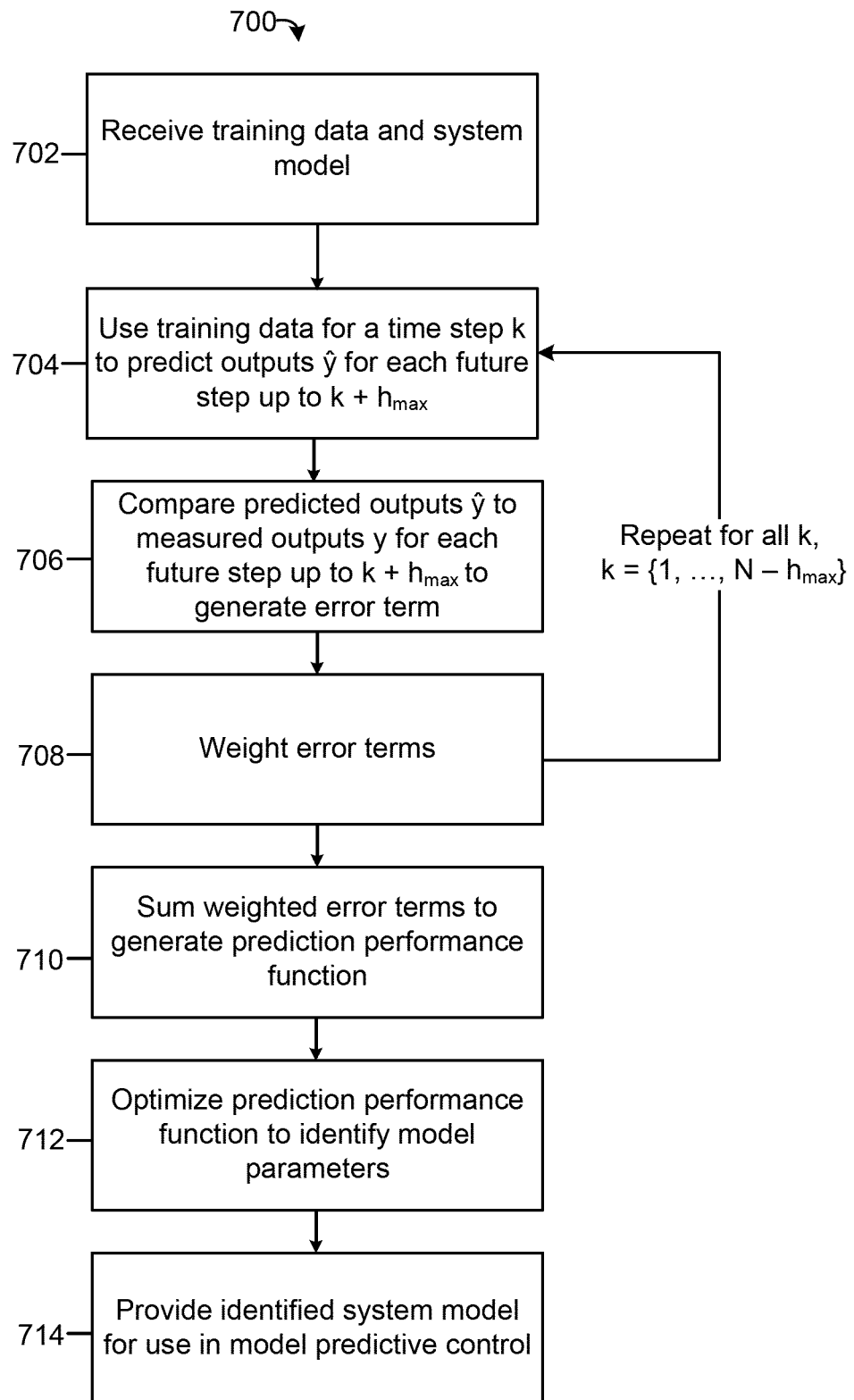
FIG. 7A is a flowchart of a multi-step ahead prediction error method for use in system identification, according to some embodiments.
Figure 7B:
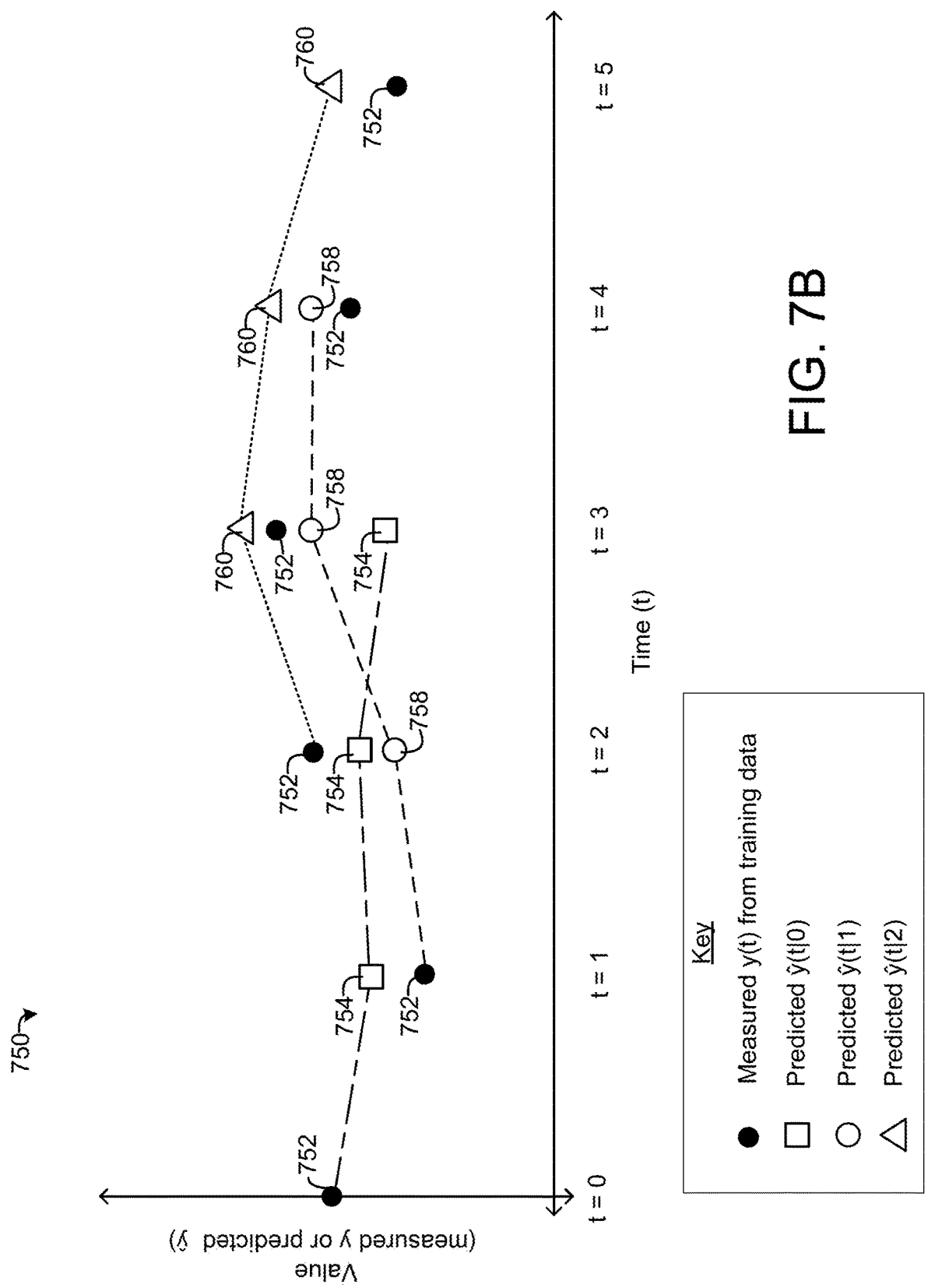
FIG. 7B is a visualization useful in illustrating the multi-step ahead prediction error method of FIG. 7A, according to some embodiments.

The prediction error function generator 430 follows a multi-step ahead prediction error method to generate a predication performance function $V_N(\phi, Z^N)$. The multi-step ahead prediction error method is illustrated in FIGS. 7A-7B and described in detail with reference thereto. As an overview, in the multi-step-ahead prediction error method, the prediction error function generator 430 uses past input-output data and the model $\mathcal{M}$ ($\theta$) the model to predict the output multiple step ahead in terms of $\phi$. That is, in the multi-step ahead prediction error method, the prediction error function generator 430 generates multi-step ahead predictions $\hat{y}(k+h|k-1,\phi)$, which denotes the predicted output at time step k+h given the past input-output sequence $Z_{k-1}$ and using parameters $\phi$. The index h corresponds the number of steps ahead the prediction is made, and for each time step k predictions are made for h=0, . . . , $h_{max}$ (i.e., when h=2, the prediction is three steps ahead because h is indexed from zero).

Each multiple multi-step ahead prediction $\hat{y}(k+h|k-1, \phi)$ is then compared to the corresponding measured output y(k) by the prediction error function generator 430 to determine the prediction error at k, defined as $\varepsilon(k, \theta):=y(k)-\hat{y}(k+h|k-1,\phi)$. The prediction error function generator 430 then squares the two-norm of the prediction errors for each k and sums the results, in some embodiments using an weighting function w(h). The prediction error function generator 430 thereby generates a prediction performance function that can be expressed in a condensed form as:

$$V_N(\phi, Z^N) = \sum_{k=1}^{N-h_{max}+1} \sum_{h=0}^{h_{max}} w(h)\|y(k+h) - \hat{y}(k+h|k-1, \phi)\|_2^2. \quad (\text{Eq. M})$$

The multi-step ahead prediction error method is described in more detail below with reference to FIGS. 7A-7B. In alternative embodiments, the prediction error function generator 430 follows the simulation approach or the one-step ahead prediction error approach discussed above with reference to the prediction error function generator 424.

The prediction error function generator 430 then provides the prediction performance function (i.e., Eq. M) to the optimizer 432. The optimizer 432 receives the prediction error function $V_N(\phi, Z^N)$ generated by the prediction error function generator 430 and optimizes the prediction error function in $\phi$ to determine $\hat{\phi}_N$. More specifically, the optimizer 426 finds the minimum value of the prediction error function $V_N(\phi, Z^N)$ as $\phi$ is varied throughout the allowable values of $\phi$. In some cases, all real values of $\phi$ are allowable. That is, the optimizer 426 determines $\hat{\phi}_N$ based on:

$$\hat{\phi}_N = \hat{\phi}_N(Z^N) = \arg\min_\phi V_N(\phi, Z^N)$$

The optimizer 432 then uses $\hat{\phi}_N$ to calculate the matrices $K_x(\phi)$ and $K_d(\phi)$, resulting in a fully identified model. The gain parameter identifier 420 provides the identified model to the model predictive controller 414.

In some embodiments, the prediction error function generator 430 reconfigures the multi-step ahead prediction problem by defining augmented vectors that allow the multi-step ahead prediction performance function (Eq. M) to be recast in an identical structure to the single-step ahead prediction performance function (Eq. J). Existing software toolboxes and programs (e.g., Matlab system identification toolbox) configured to handle the single-step ahead prediction error approach can then be used to carry out the multi-step ahead prediction error approach. To reconfigure the problem for that purpose, the prediction error function generator 430 considers, the system model of the form:

$$x(k+1)=Ax(k)+Bu(k);$$

$$y(k)=Cx(k)+Du(k).$$

where the one-step prediction of $\hat{x}(k+1|k)$ using a steady-state Kalman gain is:

$$\hat{x}(k+1|k)=A\hat{x}(k|k-1)+Bu(k)+K(y(k)-C\hat{x}(k|k-1)-Du(k));$$

$$\hat{y}(k|k-1)=C\hat{x}(k|k-1)+Du(k).$$

In the multi-step prediction Kalman gain system identification problem, the complete pattern of the algebraic manipulations is shown by the 4-step prediction. The prediction error function generator 430 considers a case with four input data points and four output data-points starting from time h=0 to time h=3, so that $h_{max}$=3. The one-step prediction (with the prediction error function generator 430 given x0) is given by the equation:

$$\hat{x}(1|0)=Ax0+Bu(0)+K(y(0)-Cx0-Du(0));$$

$$\hat{y}(0|0)=Cx0+Du(0).$$

The prediction of the second step is $$\hat{x}(2|0)=A\hat{x}(1|0)+Bu(1)=A(Ax0+Bu(0)+K(y(0)-Cx0-Du(0)))+Bu(1);$$

$$\hat{y}(1|0)=C\hat{x}(1|0)+Du(1)=C(Ax0+Bu(0)+K(y(0)-Cx0-Du(0)))+Du(1).$$

The prediction of the third step is $$\hat{x}(3\mid 0) = A\hat{x}(2\mid 0) + Bu(2) =$$
$$A(A(Ax0 + Bu(0) + K(y(0) - Cx0 - Du(0))) + Bu(1)) + Bu(2);$$

$$\hat{y}(2\mid 0) = C\hat{x}(2\mid 0) + Du(2) =$$
$$C(A(Ax0 + Bu(0) + K(y(0) - Cx0 - Du(0))) + Bu(1)) + Du(2).$$

The forth step prediction is $$\hat{x}(4\mid 0) = A\hat{x}(3\mid 0) + Bu(3) =$$
$$A(A(A(Ax0 + Bu(0) + K(y(0) - Cx0 - Du(0))) + Bu(1)) + Bu(2)) + Bu(3);$$

$$\hat{y}(3\mid 0) = C\hat{x}(3\mid 0) + Du(3) =$$
$$C(A(A(Ax0 + Bu(0) + K(y(0) - Cx0 - Du(0))) + Bu(1)) + Bu(2)) + Du(3).$$

With these 4-step predictions, the pattern needed to cast the multi-step prediction problem as a 1-step prediction is revealed. By aggregating the matrices multiplying x, y(0), u(0), u(1), u(2), and u(3), the pattern revealed is:

$$\hat{x}(1|0)=Ax0+Bu(0)+K(y(0)-Cx0-Du(0));$$

$$\hat{x}(2|0)=(A^2-AKC)x0+(AB-AKD)u(0)+Bu(1)+AKy(0);$$

$\hat{x}(3|0)=(A^3-A^2KC)x0+(A^2B-A^2KD)u(0)+ABu(1)+Bu(2)+A^2Ky(0);$ $\hat{x}(4|0)=(A^4-A^3KC)x0+(A^3B-A^3KD)u(0)+A^2Bu(1)ABu(2)+Bu(3)+A^3Ky(0);$ $\hat{y}(0)=Cx0+Du(0);$ $\hat{y}(1|0)=(CA-CKC)x0+(CB-CKD)u(0)+Du(1)+CKy(0);$ $\hat{y}(2|0)=(CA^2-CAKC)x0+(CAB-CAKD)u(0)+CBu(1)+Du(2)+CAKy(0);$ $\hat{y}(3|0)=(CA^3-CA^2KC)x0+(CA^2B-CA^2KD)u(0)+CABu(1)+CBu(2)+Du(3)+CA^2Ky(0).$ Based on that pattern, the prediction error function generator 430 defines the following vectors:

$$\tilde{u}(0) = \begin{bmatrix} u(0) \\ u(1) \\ u(2) \\ u(3) \\ y(0) \end{bmatrix}, \tilde{y}(0) = \begin{bmatrix} \hat{y}(0) \\ \hat{y}(1|0) \\ \hat{y}(2|0) \\ \hat{y}(3|0) \end{bmatrix}, \tilde{y}(0) = \begin{bmatrix} y(0) \\ y(1) \\ y(2) \\ y(3) \end{bmatrix},$$

$\hat{x}(1|0)$ and x0 remain unchanged.

The new system that has the 4-step prediction casted into a one-step prediction which can be analyzed by the prediction error function generator 430 using an existing system identification software product as:

$$\hat{x}(1|0) = Ax0 + [B\ 0\ 0\ 0\ 0] + \tilde{u}(0)[K\ 0\ 0\ 0](\tilde{y}(0) - \hat{\tilde{y}}(0));$$

$$\hat{\tilde{y}}(0) = \begin{bmatrix} C \\ (CA - CKC) \\ (CA^2 - CAKC) \\ (CA^3 - CA^2KC) \end{bmatrix}$$

$$x0 + \begin{bmatrix} D & 0 & 0 & 0 \\ (CB - CKD) & D & 0 & 0 & CK \\ (CAB - CAKD) & CB & D & 0 & CAK \\ (CA^2B - CA^2KD) & CAB & CB & D & CA^2K \end{bmatrix} \tilde{y}(0).$$

In order to have the general formulation at time k for predicting $h_{max}$ step ahead in time, this four-step example can be extrapolated to define the general augmented input and output vectors as:

$$\tilde{\tilde{y}}(k) = \begin{bmatrix} C \\ (CA - CKC) \\ (CA^2 - CAKC) \\ \vdots \\ (CA^{h_{max}} - CA^{h_{max}-1}KC) \end{bmatrix} \hat{x}(k|k-1) +$$

$$\begin{bmatrix} D & 0 & 0 & 0 & 0 & 0 \\ (CB - CKD) & D & 0 & 0 & 0 & CK \\ (CAB - CAKD) & CB & D & 0 & 0 & CAK \\ (CA^2B - CA^2KD) & CAB & \ddots & \ddots & 0 & 0 & CA^2K \\ \vdots & \vdots & \ddots & CB & D & 0 & \vdots \\ (CA^{h_{max}-1}B - CA^{h_{max}-1}KD) & CA^{h_{max}-2}B & \ldots & CAB & CB & D & CA^{h_{max}-1}K \end{bmatrix}$$

$\tilde{u}(k);$ $$\tilde{u}(k) = \begin{bmatrix} u(k) \\ u(k+1) \\ \vdots \\ u(k+h_{max}) \\ y(k) \end{bmatrix}, \tilde{\tilde{y}}(k) = \begin{bmatrix} \hat{y}(k|k-1) \\ \hat{y}(k+1|k-1) \\ \vdots \\ \hat{y}(k+h_{max}|k-1) \end{bmatrix}, \tilde{y}(k) = \begin{bmatrix} y(k) \\ y(k+1) \\ \vdots \\ y(k+h_{max}) \end{bmatrix}$$

With these definition, the general formulation at time k for predicting $h_{max}$ steps ahead in time is:

$\hat{x}(k+1|k)=A\hat{x}(k|k-1)+[B0\ \ldots\ 0]\tilde{u}(k)+[K0\ \ldots\ 0](\tilde{y}(k)-\hat{\tilde{y}}(k)).$ As described above, in the multi-step ahead prediction error method the prediction error function generator 430 generates a function of the form:

$$V_N(\phi, Z^N) = \sum_{k=1}^{N-h_{max}+1} \sum_{h=0}^{h_{max}} w(h)\|y(k+h) - \hat{y}(k+h\,|\,k-1, \phi)\|_2^2. \quad \text{(Eq. M)}$$

If w(h)≡1 for all h, and using the augmented input and output vectors defined above, the multi-step ahead prediction performance function can be reconfigured into the following one-step ahead prediction performance function by the prediction error function generator 430:

$$V_N(\theta, Z^N) = V_N(\theta, Z^N) = \sum_{k=1}^{N-h_{max}+1} \left\|\tilde{y}(k) - \hat{\tilde{y}}(k_k, \theta)\right\|_2^2$$

The prediction error function generator 430 then uses this reconfigured format of the prediction performance function with existing software toolboxes suited for the one-step ahead prediction error approach. The prediction error function generator 430 may include machine-readable media storing computer code executable to apply such software.

System Identification Methods

Figure 6:
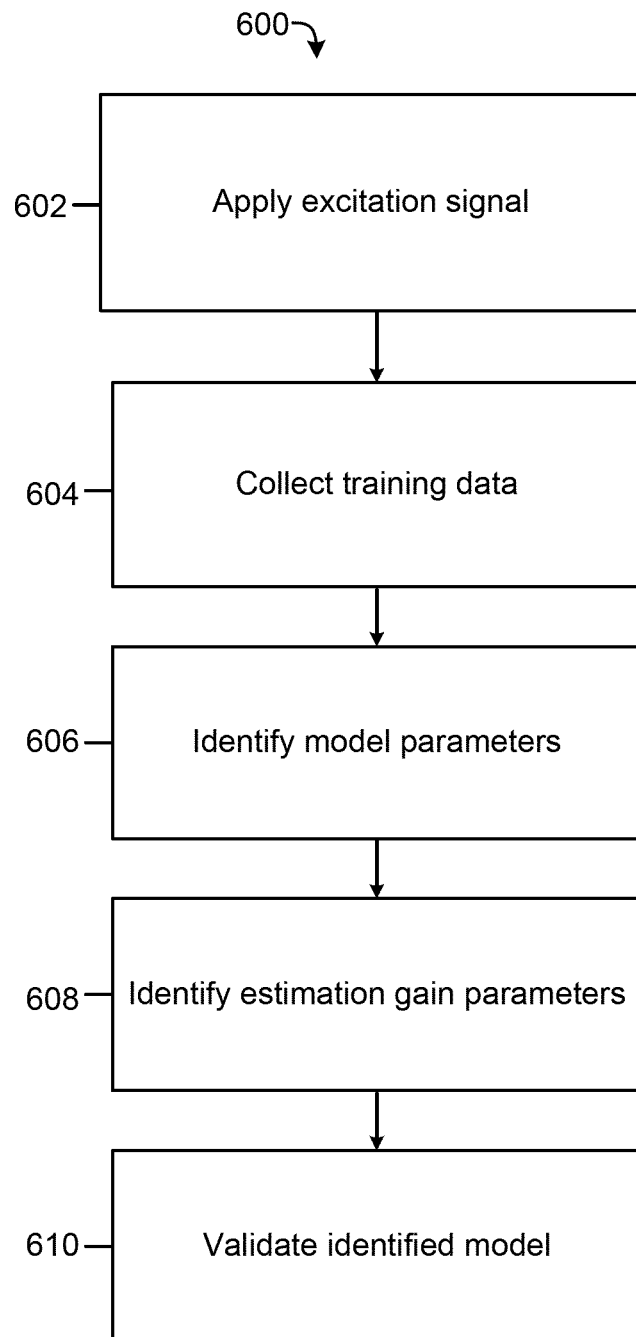
FIG. 6 is flowchart of a process for system identification, according to some embodiments.

Referring now to FIG. 6, a flowchart of a process 600 for system identification is shown, according to an exemplary embodiment. The process 600 can be carried out by the controller 212 of FIGS. 2 and 4.

At step 602, the controller 212 applies an excitation signal to the HVAC equipment 210. For example, the training data generator 408 may vary the $\dot{Q}_{HVAC}$ values supplied to the equipment controller 416, causing an excitation signal to be generated in the temperature setpoint $T_{sp}$ inputs provided to the HVAC equipment 210. In general, the excitation signal is designed to test the system in a way to provide robust data for use in system identification.

At step 604, training data is collected and stored by the controller 212. Training data includes measurable temperature readings, i.e., $T_{oa}$ and $T_{ia}$, controller-determined values $\dot{Q}_{HVAC}$ and $T_{sp}$ for each of a plurality of time steps k, k=0, . . . , N. The training data therefore includes inputs u(k) and the outputs y(k) for the time period. The training data is received from temperature sensors 214, 216, training data generator 408, and/or equipment controller 416 and stored in training data database 410.

At step 606, the controller 212 identifies the model parameters for the system. That is, as discussed in detail above, the controller 212 determines the matrices A(θ), $B(\theta)$, $C(\theta)$, and $D(\theta)$ that minimize a prediction performance function $V_N(Z^N, \theta)$ for the model:

$$\dot{x}(t) = A_c(\theta)x(t) + B_c(\theta)u(t); \quad \text{(Eq. G)}$$

$$y(t) = C_c(\theta)x(t) + D_c(\theta)u(t). \quad \text{(Eq. H)}$$

In identifying the model parameters, a simulation approach or a one-step-ahead prediction error approach is followed in some embodiments. These approaches are described in detail above with reference to the prediction error function generator 424 of FIG. 5. In other embodiments, the model parameters are determined at step 606 using a multi-step ahead prediction error method, described in detail with reference to FIGS. 7A-7B.

At step 608, the controller 212 identifies the gain estimator parameters. That is, the controller 212 determines the matrices $K_x$ and $K_d$ of Eq. K above. In preferred embodiments, the controller 212 uses the multi-step ahead prediction error method to find the matrices $K_x$ and $K_d$. The multi-step ahead prediction error method is described in detail below with reference to FIGS. 7A-7B. In alternative embodiments, a simulation approach or a one-step-ahead prediction error approach is followed to find the matrices $K_x$ and $K_d$.

At step 610, the identified model is validated by the controller 212. The controller 212 uses the identified model to generate control signal inputs $T_{sp}$ for the HVAC equipment 210 using model predictive control. The controller then monitors the temperature measurements $T_{oa}$ and $T_{ia}$ from temperature sensors 214, 216, the input $T_{sp}$, and the value $\dot{Q}_{HVAC}$ to determine how well the model matches system behavior in normal operation. For example, the training data database 410 may collect and store an addition set of training data that can be used by the model identifier 412 to validate the model. If some discrepancy is determined, the identified model may be updated. The identified model can thereby be dynamically adjusted to adjust for changes in the physical system.

Referring now to FIGS. 7A-7B the multi-step ahead prediction error approach for use in system identification is illustrated, according to an exemplary embodiment. In FIG. 7A, a flowchart of a process 700 for identifying system parameters using the multi-step ahead prediction error approach is shown, according to an exemplary embodiment. FIG. 7B shows an example visualization useful in explaining process 700. Process 700 can be carried out by the system parameter identifier 418 and/or the gain parameter identifier 420 of FIG. 5. In the embodiment described herein, the process 700 is implemented with the gain parameter identifier 420.

Process 700 begins at step 702, where the gain parameter identifier 420 receives training data $Z^N = [y(1), u(1), y(2), u(2), \ldots, y(N), u(N)]$ from the training data database 410. The training data includes measured outputs $y(k)$ (i.e., $T_{ia}(k)$ and $\dot{Q}_{HVAC}(k)$) and inputs $u(k)$ (i.e., $T_{oa}(k)$ and $T_{sp}(k)$) for each time step k, $k=1, \ldots, N$. N is the number of samples in the training data. The gain parameter identifier 420 also receives the system model from the system parameter identifier 418.

At step 704, the prediction error function generator 430 uses the training data for a time step k to predict outputs y for each subsequent time step up to $k+h_{max}$. The value $h_{max}$ corresponds to the number of steps ahead the predictions are made, referred to herein as the prediction horizon. Because $h_{max}$ is indexed from zero in Eq. M above, the prediction horizon is one more than the value of $h_{max}$. For example, in the case shown in FIG. 7B and described below, predictions are made three steps ahead, corresponding to $h_{max}=2$ in the notation of Eq. D and a prediction horizon of three. The prediction horizon may be any integer greater than one, for example four or eight. The prediction horizon can be tuned experimentally, to determine an ideal prediction horizon. For example, too long of a prediction horizon may lead to poor prediction while too short of a prediction horizon may suffer the same limitations as the one-step ahead prediction error method mentioned above. In some cases, a prediction horizon of eight is preferred.

More specifically, at each step 704 the predicted outputs $[\hat{y}(k|k-1), \hat{y}(k+1|k-1), \ldots \hat{y}(k+h_{max}|k-1)]$ are predicted based on the past training data (i.e., through step k−1), denoted as $Z_{k-1}$, along with future inputs $[u(k), u(k+1) \ldots u(k+h_{max})]$. These predictions are made using the model $\mathcal{M}(\phi)$, such that predicted outputs $\hat{y}$ depend on $\phi$.

To illustrate the predictions of step 704, FIG. 7B shows a simplified visualization in which $y(k)$ and $\hat{y}(k)$ are depicted as scalar values for the sake of simplified explanation. In FIG. 7B, the graph 750 plots the values of y and $\hat{y}$ over time t for five time steps past a starting time t=0. The solid circles 752 represent measured outputs $y(t)$ from the training data. The unfilled boxes 754 represent predicted outputs $\hat{y}(t|0)$, that is, the outputs predicted for each time step based on the input/output data available at time t=0 (e.g., y(0)). The dashed lines represent the propagation of the predictions; for example, graph 750 includes three unfilled boxes 754 connected by a dashed line to the solid circle 752 corresponding to y(0). This shows that the predictions $\hat{y}(t|0)$, $1 \leq t \leq 3$, represented by the unfilled boxes 754 were based on the measured value of y(0).

At step 706, the prediction error function generator 430 compares the predicted outputs $\hat{y}$ to the measured outputs y for each future step up to $k+h_{max}$ (i.e., for all predicted outputs $\hat{y}$ generated at step 704). More specifically, an error term for each step may be defined as $y(k+h) - \hat{y}(k+h|k-1, \phi)$. Because y and $\hat{y}$ are vectors, the two-norm of this error term may be taken and squared to facilitate comparison between prediction errors as scalars, such that the error term becomes $\|y(k+h) - \hat{y}(k+h|k-1, \phi)\|_2^2$. This term appears in Eq. M above.

As shown in FIG. 7B, step 706 can be understood as measuring the distance between, for example, each unfilled box 754 and the corresponding solid circle 752 (i.e., the unfilled box 754 and the solid circle 752 at the same time t). Thus, in the example of FIG. 7B, step 706 includes calculating three error terms.

At step 708, the error terms are weighted based on a weighting function $w(h)$. The weighting function $w(h)$ allows the prediction errors to be given more or less weight depending on how many steps ahead the prediction is. The weighting function $w(h)$ is preferably a monotonically decreasing function of h, so that farther-out-in-time predictions have less influence on the prediction error. In some embodiments, the weighting function $w(h)=1$. Step 708 thereby corresponds the $w(h)$ term in Eq. M above.

The process 700 then returns to step 704 to repeat steps 704-706 for each value of k, $k=1, N-h_{max}$. As illustrated in FIG. 7B, repeating step 704 corresponds to generating the predictions represented by the unfilled circles 758 and the unfilled triangles 760. The unfilled circles 758 chart the predictions based on the output data available at time t=1, i.e., $\hat{y}(t|1)$, for t=2, 3, 4. The unfilled triangles chart the predictions based on the output data available at time t=2, i.e., $\hat{y}(t|2)$, for t=3, 4, 5. Process 700 therefore involves making multiple predictions for most time steps: for example, FIG. 7B shows three separate predictions for time t=3.

At step 706, the prediction error function generator 430 again compares the predicted outputs ŷ for the new value of k to the measured outputs y for each future step up to k+$h_{max}$ to define the error term $\|y(k+h)-\hat{y}(k+h|k-1, \theta)\|_2^2$ as included in Eq. M. At step 708, the terms are again weighted by the weighting function w(h). The weighting function w(h) may be the same for each k.

In the notation of Eq. M, each iteration of steps 704-708 thus corresponds to steps necessary to generate the values used by the inner (right) summation indexed in h, while repetition of the steps 704-708 corresponds to the iteration through k represented in the outer (left) summation. At step 710, then, these summations are executed. In other words, the system identification circuit 108 sums the weighted error terms generated by steps 704-708 to generate a prediction performance function as:

$$V_N(\theta, Z^N) = \sum_{k=1}^{N-h_{max}+1} \sum_{h=0}^{h_{max}} w(h) \|y(k+h) - \hat{y}(k+h|k-1, \phi)\|_2^2. \quad \text{(Eq. M)}$$

The prediction performance function is a function of the input data $Z^N$ and the parameter variable φ. Typically, the input data $Z^N$ is given (i.e., received by the model identifier 412 and used in the calculation of error terms as described above). Thus, the prediction performance function is primarily a function of φ.

At step 712, the prediction performance function $V_N(\phi, Z^N)$ is minimized to find an optimal parameter vector $\hat{\theta}_N = \arg\min_{\theta \in D_M} V_N(\phi, Z^N)$. Any minimization procedure $\min_{\theta \in D_M}$ may be followed. The result of step 712 is a vector $\hat{\phi}_N$ of identified model parameters that tune the model $\mathcal{M}(\hat{\phi}_N)$ to accurately predict system evolution multiple steps ahead. At step 714, the model identifier 412 provides the identified system model (i.e., $\mathcal{M}(\hat{\phi}_N)$) to the model predictive controller 414 for use in generating control inputs for the HVAC equipment 210.

According to various embodiments, process 700 is run once at set-up to establish the system model, run periodically to update the system model, or run repeatedly/continuously to dynamically update the system model in real time.

Adaptive Online System Identification
Overview

Referring generally to FIGS. 8-24B, systems, methods, and experimental results of performing adaptive online system identification (SI) are shown, according to some embodiments. It should be appreciated that adaptive SI can be referred to interchangeably with adaptive online system identification for ease of explanation. The application of model predictive control (MPC) technology in buildings has the potential for creating significant energy and cost savings. MPC can rely on availability of a model that can capture crucial process dynamics and can produce accurate multistep predictions of process evolution into the future. Modeling energy and HVAC systems through first-principals models that describe detailed physical properties can be challenging and may result in models that are not suited for MPC online computations. Therefore, system identification can serve as a suitable alternative and can result in models that are suited for MPC online optimization. However, accuracy of the identified model may decrease with time due to several factors such as, for example, significant changes in disturbances or changes in physical properties of the system. As such, adaptive SI can be utilized to update the identified models online if/when accuracy of the model decreases.

Modeling building energy and HVAC systems can include the following three steps: identification of a deterministic heat disturbance model, identification of system dynamics and a scale factor for deterministic heat disturbance, and identification of a Kalman filter and a stochastic heat disturbance prediction model. It should be appreciated that said three step process is not limited to building thermal models. The three step process (or a portion thereof) can be used in modeling various dynamics in buildings such as, for example, relative humidity, particulate matter 2.5 (PM2.5), and carbon dioxide ($CO_2$). The modeling and system identification can be done in a batch form such that for each time identification is desired, all three steps are remodeled and only new data is used in the modeling. However, batch strategy may not be effective as previous model information is not utilized in training a new model.

The concept of adaptive models can refer to usage of old models coupled with new data collected online in creating new and more accurate models. As described in greater detail below throughout FIGS. 8-24B, two adaptive SI frameworks for buildings models are presented. Each of the adaptive SI frameworks may start with an adaptive heat disturbance modeling step that utilizes an old model coupled with data collected online in order to generate accurate heat disturbance training data. The adaptive heat disturbance modeling method can utilize online data, a system dynamical model, online heat disturbance profiles from old stochastic and deterministic prediction models, and Kalman filter errors in order to generate accurate heat disturbance training data. Utilizing the Kalman filter errors and the system dynamical model can be useful to learn true shapes and variations in heat disturbances.

A first adaptive system identification method can be referred to as light online system identification (light online SI). In light online SI, data collected online along with adaptive heat disturbance training data can be used in order to train a new deterministic heat disturbance model, a new scale factor for deterministic heat disturbance, a new stochastic heat disturbance prediction model, and a new Kalman filter gain. Light online SI can provide various processing improvements for a computer system performing system identification and/or MPC. In some embodiments, physical properties of buildings do not change on a regular basis. For example, physical properties of buildings may change every four to six months. Physical properties may change due to various factors such as, for example, occupants opening windows thereby leading to less resistance between indoor and air outdoor air (i.e., a change in a physical property), construction in a building, etc. As compared to physical properties, heat disturbances may change on a regular basis as solar effects and occupant dynamics can change frequently. Therefore, it may not be necessary to constantly re-identify all models/model parameters if old models perform poorly. In this way, light online SI can keep the old system dynamical model(s) and can remodel the Kalman filter gain and the heat disturbance models and components. As such, light online SI can provide processing improvements as fewer models/model parameters are re-identified regularly.

A second adaptive SI method can be referred to as intensive online system identification (intensive online SI). In intensive online SI, data collected online along with the adaptive heat disturbance training data can be used in order to re-identify all models. As such, intensive online SI may include re-identification of a deterministic heat disturbance model, re-identification of system dynamics, re-identification of a scale factor for deterministic heat disturbance, and re-identification of a Kalman filter and a stochastic heat disturbance prediction model. Intensive online SI can be used if light online SI fails to generate models with an acceptable multi-step prediction accuracy that may be needed for MPC applications. If light online SI fails to generate acceptable models, this may indicate that not only heat disturbance components have changed, but also that some physical properties of the system have changed. If physical properties of the system have changed, remodeling of the entire system may be needed. Adaptive heat disturbance training data can still be used in intensive online SI as the adaptive heat disturbance training may have a component that accounts for plant model mismatch. In addition, intensive online SI may be robust to any bias in the adaptive heat disturbance training data as intensive online SI can include re-identifying the system dynamics along with the scale factor for deterministic heat disturbance in the same step. In some embodiments, due to the fact that the intensive online SI can re-identify the system dynamical model, the training data used for intensive online SI should contain only data sections with sufficient system dynamics excitations. Therefore, a data selection process can be utilized in order to select sections of the training data that contain sufficient excitations of the system dynamics. Said data sections can be used as the training data in intensive online SI.

Several indicators can trigger an adaptive SI process as described in greater detail below throughout FIGS. 8-24B. In addition, if MPC is controlling building zones with several decoupled models, identification can be triggered for each individual model alone. For example, if MPC utilizes four different models to control zone temperature, relative humidity, PM2.5, and CO2 concentration, re-identification of each individual model can be triggered alone without re-identification of the remaining models. If re-identification of one of the four models is triggered, light online SI followed by intensive-online system identification (if necessary) can be performed for said model. However, models that are heavily coupled can be re-identified together. For example, if the zone temperature model and relative humidity model are heavily coupled, then re-identification of both models may be necessary if re-identification is determined to be necessary for either model. Various methods and metrics that can trigger model re-identification are described in greater detail below with reference to FIGS. 8-24B.

Building zone group thermal models can capture crucial dynamics for MPC and other control-oriented applications. In some embodiments, the building zone group thermal model can be described by the following differential equations:

$$C_{ia}\dot{T}_{ia} = \frac{1}{R_{mi}}(T_m - T_{ia}) + \frac{1}{R_{oi}}(T_{oa} - T_{ia}) + \dot{Q}_{HVAC} + \dot{Q}_{other}$$

$$C_m\dot{T}_m = \frac{1}{R_{mi}}(T_{ia} - T_m)$$

where $T_{ia}$ is an indoor air temperature, $T_{oa}$ is an outdoor air temperature, $T_m$ is a lumped thermal mass temperature, $C_m$ is a lumped mass thermal capacitance, $C_{ia}$ is an indoor air thermal capacitance, $R_{mi}$ is an indoor air and thermal mass thermal resistance, $R_{oi}$ is an indoor air and outdoor air thermal resistance, $\dot{Q}_{HVAC}$ is a sensible heat provided to and/or removed from a building space by an HVAC system, and $\dot{Q}_{other}$ is an internal heat load/gains. The internal heat load/gains described by $\dot{Q}_{other}$ can result from various sources. For example, the internal heat load/gains can result from solar radiation, occupancy, electrical equipment, etc.

Inputs to the above building zone group thermal model can include $\dot{Q}_{HVAC}$ which can be measured and controlled, $T_{oa}$ which can be measured but not controlled, and $\dot{Q}_{other}$ which may be neither measured nor controlled. However, $\dot{Q}_{other}$ can be predicted in some embodiments. States of the building thermal model can include a measured state of $T_{ia}$ and an unmeasured state of $T_m$. An output of the thermal model can include $T_{ia}$ as a measured output. Obtaining the resistances and capacitances (i.e., $C_{ia}$, $C_m$, $R_{mi}$, $R_{oi}$) can be done through system identification where data for a building zone is collected and used to fit the parameters that provide accurate predictions of the building thermal dynamics. In this case, a first system in state space form can be given by:

$$\begin{bmatrix}\dot{T}_{ia}\\\dot{T}_m\end{bmatrix} = \begin{bmatrix}\frac{1}{C_{ia}}\left(-\frac{1}{R_{mi}}-\frac{1}{R_{oi}}\right) & \frac{1}{C_{ia}R_{mi}}\\ \frac{1}{C_m R_{mi}} & -\frac{1}{C_m R_{mi}}\end{bmatrix}\begin{bmatrix}T_{ia}\\T_m\end{bmatrix} + \begin{bmatrix}\frac{1}{C_{ia}} & \frac{1}{C_{ia}R_{oi}}\\0 & 0\end{bmatrix}\begin{bmatrix}\dot{Q}_{HVAC}\\T_{oa}\end{bmatrix} + \begin{bmatrix}\frac{1}{C_{ia}}\\0\end{bmatrix}\dot{Q}_{other}$$

$$[T_{ia}] = [1\ 0]\begin{bmatrix}T_{ia}\\T_m\end{bmatrix} + [0\ 0]\begin{bmatrix}\dot{Q}_{HVAC}\\T_{oa}\end{bmatrix}$$

In some embodiments, a second state space system is given by:

$$\begin{bmatrix}\dot{T}_{ia}\\\dot{T}_m\\\dot{I}\end{bmatrix} = \begin{bmatrix}\frac{1}{C_{ia}}\left(K_{p,j}-\frac{1}{R_{mi}}-\frac{1}{R_{oi}}\right) & \frac{1}{C_{ia}R_{mi}} & \frac{K_{I,j}}{C_{ia}}\\ \frac{1}{C_m R_{mi}} & -\frac{1}{C_m R_{mi}} & 0\\ -1 & 0 & 0\end{bmatrix}\begin{bmatrix}T_{ia}\\T_m\\I\end{bmatrix} +$$

$$\begin{bmatrix}-\frac{K_{p,j}}{C_{ia}} & \frac{1}{C_{ia}R_{oi}}\\0 & 0\\1 & 0\end{bmatrix}\begin{bmatrix}T_{sp,j}\\T_{oa}\end{bmatrix} + \begin{bmatrix}\frac{1}{C_{ia}}\\0\\0\end{bmatrix}\dot{Q}_{other}$$

$$\begin{bmatrix}T_{ia}\\\dot{Q}_{HVAC,j}\end{bmatrix} = \begin{bmatrix}1 & 0 & 0\\-K_{p,j} & 0 & K_{I,j}\end{bmatrix}\begin{bmatrix}T_{ia}\\T_m\\I\end{bmatrix} + \begin{bmatrix}0 & 0\\K_{p,j} & 0\end{bmatrix}\begin{bmatrix}T_{sp,j}\\T_{oa}\end{bmatrix}$$

It should be noted that the first state space system has $\dot{Q}_{HVAC}$ an input, whereas the second state space system has $\dot{Q}_{HVAC}$ as an output. The first state space system may a preferred state space system for performing adaptive online SI.

Controller for Adaptive Online SI

Figure 8:
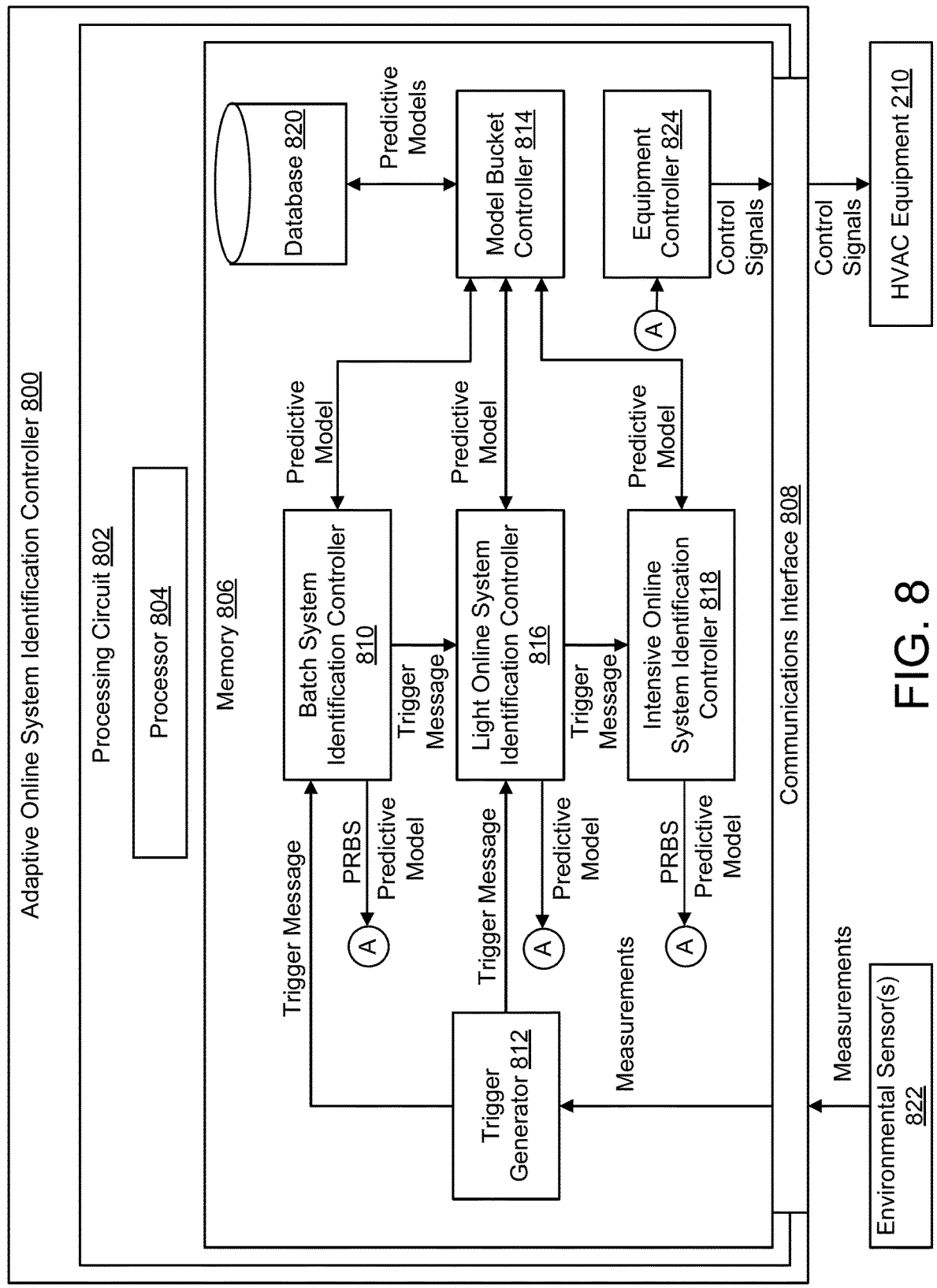
FIG. 8 is block diagram of an adaptive online system identification controller for performing adaptive online system identification, according to some embodiments.

Referring now to FIG. 8, an adaptive online system identification controller 800 for performing adaptive online system identification is shown, according to some embodiments. In some embodiments, adaptive online SI controller 800 is similar to and/or the same as controller 212 as described with reference to FIGS. 2 and 4. In some embodiments, some and/or all components of adaptive online SI controller 800 are components of controller 212. As such, controller 212 can include some and/or all of the functionality of adaptive online SI controller 800 as described herein.

Adaptive online system identification controller 800 is shown to include a communications interface 808 and a processing circuit 802. Communications interface 808 may include wired or wireless interfaces (e.g., jacks, antennas, transmitters, receivers, transceivers, wire terminals, etc.) for conducting data communications with various systems, devices, or networks. For example, communications interface 808 may include an Ethernet card and port for sending and receiving data via an Ethernet-based communications network and/or a Wi-Fi transceiver for communicating via a wireless communications network. Communications interface 808 may be configured to communicate via local area networks or wide area networks (e.g., the Internet, a building WAN, etc.) and may use a variety of communications protocols (e.g., BACnet, IP, LON, etc.).

Communications interface 808 may be a network interface configured to facilitate electronic data communications between adaptive online system identification controller 800 and various external systems or devices (e.g., an environmental sensor(s) 822, HVAC equipment 210, etc.). For example, adaptive online system identification controller 800 may receive environmental data from environmental sensor(s) 822 indicating one or more environmental conditions (e.g., temperature, humidity, air quality, etc.) via communications interface 808. In some embodiments, environmental sensor(s) 822 a similar to and/or the same as outdoor air temperature sensor 216 and/or indoor air temperature sensor 214 as described above with reference to FIG. 2. In some embodiments, communications interface 808 is configured to provide control signals to HVAC equipment 210.

Still referring to FIG. 8, processing circuit 802 is shown to include a processor 804 and memory 806. Processor 804 may be a general purpose or specific purpose processor, an application specific integrated circuit (ASIC), one or more field programmable gate arrays (FPGAs), a group of processing components, or other suitable processing components. Processor 804 may be configured to execute computer code or instructions stored in memory 806 or received from other computer readable media (e.g., CDROM, network storage, a remote server, etc.).

Memory 806 may include one or more devices (e.g., memory units, memory devices, storage devices, etc.) for storing data and/or computer code for completing and/or facilitating the various processes described in the present disclosure. Memory 806 may include random access memory (RAM), read-only memory (ROM), hard drive storage, temporary storage, non-volatile memory, flash memory, optical memory, or any other suitable memory for storing software objects and/or computer instructions. Memory 806 may include database components, object code components, script components, or any other type of information structure for supporting the various activities and information structures described in the present disclosure. Memory 806 may be communicably connected to processor 804 via processing circuit 802 and may include computer code for executing (e.g., by processor 804) one or more processes described herein. In some embodiments, one or more components of memory 806 are part of a singular component. However, each component of memory 806 is shown independently for ease of explanation.

Triggering of Online System Identification

Memory 806 is shown to include a trigger generator 812. Trigger generator 812 is shown to receive measurements from environmental sensor(s) 822 via communications interface 808. In some embodiments, environmental sensor(s) 822 includes a single environmental sensor. In some embodiments, environmental sensor(s) 822 includes multiple environmental sensors. Environmental sensor(s) 822 can monitor and measure various conditions of a space (e.g., zone 200) and provide said measurements to adaptive online SI controller 800. For example, environmental sensor(s) 822 can measure values of temperature, humidity, air quality, carbon dioxide, etc. Based on the measurements, trigger generator 812 can determine if a system identification process should be performed. If no default models are available (i.e., a database 820 includes no default models), trigger generator 812 may generate and provide a trigger message to a batch SI controller 810 indicating batch SI process should be performed. In this case, trigger generator 812 may be effectively initiating system modeling to occur for the first time. Otherwise, if one or more default models are available (i.e., database 820 includes one or more default models), trigger generator 812 can generate trigger messages to initiate light online SI and/or intensive online SI as necessary. As referred to herein, a default model can describe any predictive model stored by database 820. As such, default models may be similar to and/or the same as predictive models as described herein.

In some embodiments, online system identification is triggered by trigger generator 812 according to a predefined schedule (e.g., once per week, once per month, seasonally, etc.), if a user decides to remodel the system (e.g., triggered in response to a request from a user), and/or based on error-trigger model re-identification. The predefined schedule can be set by a user, adaptive online SI controller 800, and/or other various sources. A user can indicate to adaptive online SI controller 800 to remodel the system in various ways. For example, the user may interact with a computer, a smart device (e.g., a smart phone, a smart watch, etc.), a thermostat, and/or other various devices to indicate a desire to remodel the system. In some embodiments, other methods for trigger online SI are used alone and/or in combination with those described herein.

Methods for error-triggered model re-identification performed by trigger generator 812 can be based on tracking errors for each output of a current predictive model. For example, trigger generator 812 can track a moving horizon error that can be given by the following:

$$e_i(t) = \frac{\sum_{n=t-H}^{t} \|y_{i_p}(k) - y_{i_m}(k)\|_2}{\sigma_i}$$

where $y_{i_m}(k)$ is a measured output i at time step k, $y_{i_p}(k)$ is a predicted output i at time step k, $\sigma_i$ is a standard deviation of the error, and H is a time horizon. If tracking the moving horizon error, trigger generator 812 may trigger re-identification based on an average and/or a summation of all outputs. In some embodiments, trigger generator 812 may trigger re-identification based on an average and/or a summation of each output individually. It should be appreciated that accounting for each output individually can be used by trigger generator 812 to trigger re-identification for a four variable model (or some other number of variables) where some dynamics are decoupled and can be remodeled and corrected individually.

Figure 16:
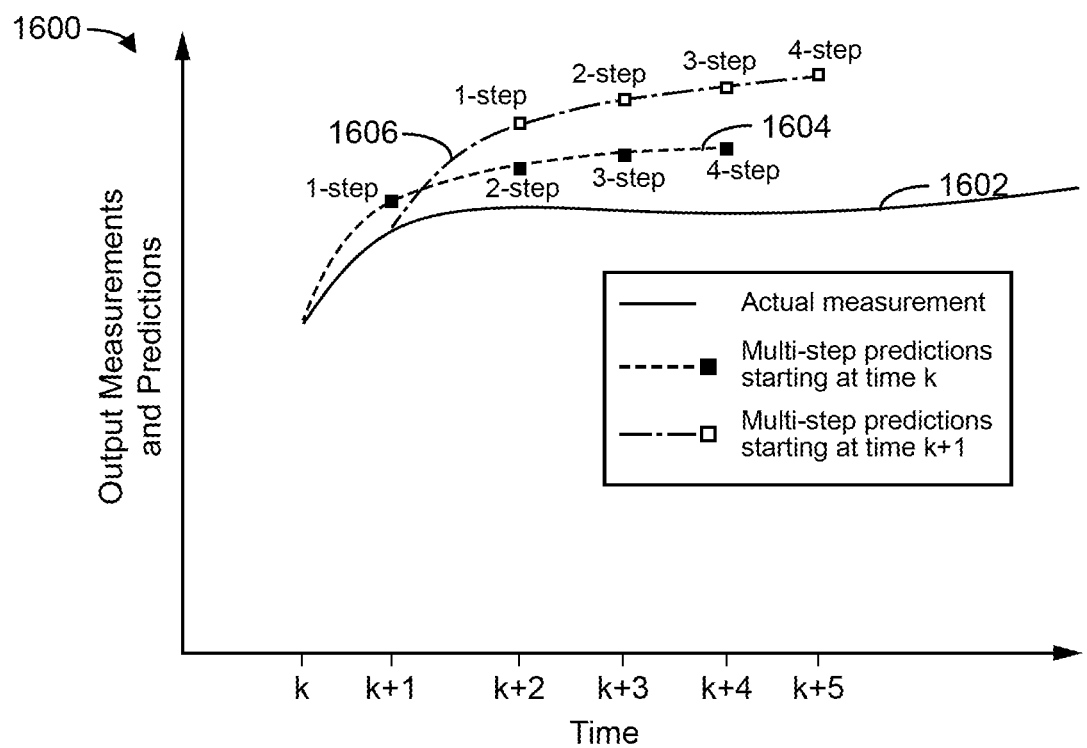
FIG. 16 is a graph illustrating an example of multi-step NRMSPE predictions for a prediction horizon looking four samples into the future, according to some embodiments.

Trigger generator 812 may utilize a multi-step normalized root mean square prediction error (NRMSPE) metric to determine if model re-identification should be triggered. A one-step NRMSPE can be given by the following:

$$NRMSPE_{i,1} = \frac{\|y_{i_p} - y_{i_m}\|_2}{\|y_{i_m} - \text{mean}(y_{i_m})\|_2}$$

where $NRMSPE_{i,1}$ is the one-step NRMSPE for output i, $y_{i_p}$ is a one-step prediction vector for output i, and $y_{i_m}$ is a measured vector for output i. The multi-step NRMSPE can extend the one-step NRMSPE for a multi-step prediction case. To compute the multi-step NRMSPE, multi-step predictions of the outputs for a horizon H looking into the future can be predicted for each given state estimate. An example illustrating predictions of an output for a horizon of four steps (H=4) looking into the future from each state estimate is illustrated in FIG. 16. These multi-step predictions can be used to compute the multi-step NRMSPE.

For each output i, trigger generator 812 can compute several NRMSPE metrics where each computes NRMSPE for a $j^{th}$-step prediction. For an output i, the $j^{th}$-step prediction NRMSPE can be given by the following:

$$NRMSPE_{i,j} = \frac{\|y_{i,j_p} - y_{i,j_m}\|_2}{\|y_{i,j_m} - \text{mean}(y_{i,j_m})\|_2}$$

where $NRMSPE_{i,j}$ is a $j^{th}$-step NRMPSE for output i, $y_{i,j_p}$ is a $j^{th}$-step prediction vector for output i, and $y_{i,j_m}$ is an output i measurements vector that corresponds to the $j^{th}$ step predictions times. For example, $y_{i,1_p}$ can represent a one-step output prediction vector for output i and $y_{i,1_m}$ can represent a measured vector corresponding to times of one-step predictions. The times of the one-step predictions may be the entire measured vector for one-step prediction. As another example, the vector $y_{i,2_p}$ can represent a vector containing all two-step predictions of output i and $y_{i,2_m}$ can represent a measured vector corresponding to times of two-step predictions. The times of the two-step predictions may start from a second measurement until a last measurement.

The multi-step NRMSPE for an output i can be defined as a weighted sum of all individual $j^{th}$-step prediction NRMSPE which can be given by the following equation:

$$\text{Multi-Step } NRMSPE \text{ for output } i = \sum_{j=1}^{H} w_j NRMSPE_{i,j}$$

In some embodiments, a sum of weights $w_j$ is equal to one to ensure a proper weighted metric is calculated. In some embodiments, systems (e.g., engineering systems) may have multiple outputs associated with multiple measurements (e.g., temperature, humidity, $CO_2$, etc.). If some of said measurements are coupled through a single model, a weighted multi-step NRMSPE metric can be defined for all the coupled outputs as presented by the following equation:

$$N \text{ output Multi-Step } NRMSPE = \sum_{i=1}^{N}\sum_{j=1}^{H} v_i w_j NRMSPE_{i,j}$$

For each of the remaining decoupled outputs, a separate multi-step NRMSPE can be used for each output to trigger updating the output's model individually if needed without re-identifying the remaining models.

Model Bucketing

Adaptive online SI controller 800 is also shown to include model bucket controller 814 and database 820. Model bucket controller 814 can perform a model bucketing process to store predictive models in database 820, determine a quality of predictions (e.g., a quality of fit) of models in database 820, and/or otherwise maintain database 820 and perform processes associated with predictive models. It should be noted that predictive models and identified models can be referred to synonymously herein. Further, predictive models can refer to composite models that can include multiple models and/or model parameters. For example, predictive models can include deterministic heat disturbance prediction models, system dynamics models, stochastic heat disturbance prediction models, a Kalman gain, etc.

To calculate a quality of predictions for a predictive model, model bucket controller 814 can leverage the NRMPSE calculated for predictions of the predictive model. Specifically, a one-step quality of predictions for the predictive model can be given by the following equation:

$$P_{i,1} = 100\left(1 - \frac{\|y_{i_p} - y_{i_m}\|_2}{\|y_{i_m} - \text{mean}(y_{i_m})\|_2}\right) = 100(1 - NRMSPE_{i,1})$$

where $P_{i,1}$ is the one-step quality of predictions for output i. Similarly, the multi-step quality of predictions can be calculated based on the following equation:

$$P_{i,j} = 100\left(1 - \frac{\|y_{i,j_p} - y_{i,j_m}\|_2}{\|y_{i,j_m} - \text{mean}(y_{i,j_m})\|_2}\right)$$

where $P_{i,j}$ is a $j^{th}$-step quality of predictions for otut i. Accordingly, quality of predictions may be provided as a percentage value indicating an accuracy of predictions of the predictive model. If model bucket controller 814 is imposing a quality of predictions threshold to ensure predictive models utilized generated sufficiently accurate predictions, the quality of predictions threshold may likewise be a percentage threshold. As such, a quality of predictions value calculated for a predictive model may be required to be over a certain percentage (e.g., 70%, 80%, etc.). Of course, it should be appreciated that the above equations should not be regarded as limiting on equations to calculate quality of predictions. Rather, the above equations are provided for sake of example in calculating quality of predictions values. Likewise, other metrics for the quality of predictions may be utilized instead of or in addition to percentage. For example, the quality of predictions value may be represented as a standard numerical value dependent on an equation used to calculate the quality of predictions.

Database 820 can store a predefined number of predictive models N+1 where N is a predefined maximum number of predictive models that can be stored in database 820 after a model bucketing process is performed by model bucket controller 814. For example, N can indicate that database 820 can store, five predictive models, ten predictive models, twenty predictive models, eighty predictive models, etc. In some embodiments, N is determined based on an amount of storage in database 820. In this case, as the amount of storage in database 820 increases, N may also increase. In some embodiments, N is set by a user, determined by a controller/system, and/or is generated in another appropriate fashion. In some embodiments, database 820 stores system data, experimental data, and/or other data describing a system that can be used in an SI process. For example, database 820 can store SI experimental data based on the SI experiment performed by batch SI controller 810 as described above. In some embodiments, adaptive online SI controller 800 includes multiple databases 820. For example, adaptive online SI controller 800 can include a first database 820 that stores predictive models and a second database 820 that stores system data. Further, it should be appreciated that while database 820 is shown in FIG. 8 to communicate with model bucket controller 814, database 820 may be able to communicate with various components of memory 806. Predictive models stored in database 820 can be referred to synonymously herein as default models. Database 820 can also be referred to as a default models bucket and/or a model bucket.

Model bucket controller 814 can receive predictive models from batch SI controller 810, an intensive online SI controller 818, and/or a light online SI controller 816 of adaptive online SI controller 800. Based on a predictive model received, model bucket controller 814 can record a multi-step quality of predictions for the predictive model and add the predictive model to database 820. In some embodiments, batch SI controller 810, intensive online SI controller 818, and/or light online SI controller 816 determine the multi-step quality of predictions of the predictive model and provides the quality of predictions and the predictive model to model bucket controller 814. By adding the received predictive model to database 820, database 820 can have up to a maximum of N+1 predictive models stored. However, database 820 may have less than N+1 predictive models stored if database 820 does not have N predictive models prior to storing the received predictive model. The multi-step quality of predictions for the predictive model can be calculated by passing data through the predictive model and determining how well outputs of the predictive model match up with measured data. In some embodiments, a one-step quality of predictions is calculated instead of or in addition to the multi-step quality of predictions. The one-step quality of predictions can be used to determine how suitable a predictive model is for modeling a system. In some embodiments, other metrics are used to determine a quality of predictions of predictive models. For example, identified parameters of a predictive model can be compared to expected or average parameter values to determine if the identified parameters are in line with expectations. As such, other metrics can be used to determine adequacy of predictive models rather than and/or in addition to multi-step quality of predictions as described herein.

In addition to storing the predictive model and recording the quality of predictions of the predictive model, model bucket controller 814 can pass the data through each predictive model stored in database 820 and record a multi-step quality of predictions for each predictive model. Based on the multi-step quality of predictions for each predictive model, model bucket controller 814 can select a predictive model with a highest multi-step quality of predictions. Specifically, if the quality of predictions is calculated as a percentage value, the predictive model with the highest multi-step quality of predictions may be selected as the predictive model with a quality of predictions closest to 100%. The selected model can be used for MWC and/or other control-based applications. In some circumstances, the most recently identified model may not be the predictive model with the highest multi-step quality of predictions. For example, if recently gathered system data includes inaccuracies, a significant amount of unexcited data, etc., the recently identified model may not model system dynamics as well as an existing default model of database 820. Advantageously, by storing previous predictive models in database 820, adaptive online SI can avoid utilizing the most recently identified model if the most recently identified model is not as accurate as other models of database 820. Comparing the multi-step quality of predictions of each predictive model stored in database 820 can ensure MPC and/or other control-based applications utilize a best predictive model available.

In evaluating qualities of fit of various predictive models to select a predictive model for use in MPC (and/or other control-based applications), model bucket controller 814 can compare each predictive model to some set of data. For example, consider a situation where a first predictive model generated using a first data set associated with a first time period and a second predictive model generated using a second data set associated with a second time period are being compared. The first and second predictive models can be compared to a third data set associated with a third time period. Each data set may be received from a user, gathered from operating equipment over time, and/or obtained from some other source of data that can provide data used to generate predictive models.

It should be noted that the time periods associated with each set of data may have varying levels of overlap dependent on situation. For example, the first and second time periods may at least partially overlap. At least partial overlap of the time periods can refer to a variety of situations such as, for example, a situation where the first and second time periods have the same duration but include different start times and/or different end times such that there is at least some overlap between the time periods, a situation where the time periods have different durations such but at least partially overlap, a situation where one time period is entirely contained within the other time period (e.g., the first predictive model is for a most recent month whereas the second predictive model is for a most recent year, the first predictive model is for a previous winter whereas the second predictive model is for an entire last year including the previous winter, etc.), or any other situation such that the time periods at least partially overlap. In some embodiments, the time periods are discrete time periods. For example, the first time period and the second time period may be discrete time periods such that the first and second time periods have no overlap. In some embodiments, the time periods may have varying degrees of overlap. For example, the first time period and the second time period may be discrete, but the third time period may at least partially overlap with the second time period.

In some embodiments, future predicted states are utilized to select a model to use in MPC and/or other control based applications. Model accuracy may vary over time due to changes in various conditions applicable to system dynamics. For example, database 820 may include predictive models specialized for use in different seasons (e.g., fall models, winter models, etc.). As seasons change, certain models may be more accurate. Accordingly, selection of a model to use may be based on future predicted states for an upcoming season. The predicted states may be based on, for example, historical averages for a given season. As a particular example, if a seasonal change from summer to fall will soon occur, quality of predictions of the predictive models may be analyzed using data describing historical averages for fall over the past ten years such that a "fall model" with a highest quality of predictions can be selected. As should, it should be noted that quality of predictions can be analyzed using data sets associated with a variety of times and does not necessarily need to be analyzed with respect to a most recently gathered data set.

In some embodiments, other considerations are accounted for by model bucket controller 814 in selecting a predictive model separate from or in addition to quality of predictions. In other words, quality of predictions may not be the only metric utilized by model bucket controller 814 in selecting a predictive model. For example, model bucket controller 814 may determine what predictive model is associated with a most recent time period and select a predictive model based on the quality of predictions and a recency of time periods. In this case, a first time period and a second time period corresponding with a first predictive model and a second predictive model, respectively, can be compared to determine which time period occurred more recently. If, for example, the second time period occurred more recently as compared to the first time period, model bucket controller 814 may select the second predictive model even if the first predictive model has a better quality of predictions as compared to the second predictive model. If quality of predictions values for multiple predictive models are similar (e.g., within ±5%) of one another, selecting a most recent predictive model may be preferred as the most recent predictive model is associated with the most recently gathered data and thereby may be expected to more accurately model current system dynamics. However, if quality of predictions values of each predictive model are significantly different from one another (e.g., >5% different), model bucket controller 814 may select a predictive model with a highest quality of predictions regardless of a recency of an associated time period.

Model bucket controller 814 can delete a default model with a lowest multi-step quality of predictions. In some embodiments, model bucket controller 814 only deletes the default model with the lowest multi-step quality of predictions if a number of default models stored in database 820 after storing the most recently identified model is N+1. In this way, database 820 can store newly identified models until database 820 reaches capacity. If database 820 reaches capacity (i.e., database 820 stores N+1 predictive models after the most recently identified model is stored), deleting models with a low multi-step quality of predictions can ensure that database 820 includes the best available predictive models for modeling system dynamics.

At the end of the modeling bucket process, model bucket controller 814 may provide the selected model (i.e., the predictive model with the highest multi-step quality of predictions) to an associated controller (e.g., batch SI controller 810, light online SI controller 816, and/or intensive online SI controller 818) of memory 806. The associated controller may be the controller that provided the most recently identified model. For example, if light online SI controller 816 provided the most recently identified model, model bucket controller 814 can provide the selected model to light online SI controller 816. In this way, the associated controller can determine if the selected model is suitable for use in MPC or if an online SI process (e.g., light online SI or intensive online SI) should be performed to generate a new predictive model.

Batch System Identification

Still referring to FIG. 8, memory 806 is shown to include batch SI controller 810. Batch SI controller 810 can perform a batch SI process to generate an initial predictive model for use in MPC and/or other control-related applications. The batch SI process may refer to a standard SI process that can be performed to start modeling of a system for the first time. In other words, the batch SI process can be performed if no predictive model exists at a current time. Batch SI controller 810 may initiate the batch SI process based on a trigger message received from trigger generator 812.

To perform the batch SI process, batch SI controller 810 can train a deterministic heat disturbance prediction model using a batch heat disturbance modeling method. The batch heat disturbance modeling method may assume a default deterministic heat disturbance shape for each day. The batch heat disturbance modeling method can use various regression methods on collected data of a site in order to generate approximate heat disturbance data that can be used to train the deterministic heat disturbance prediction model. In some embodiments, the batch heat disturbance modeling method is similar to and/or the same as the system identification process described above with reference to FIGS. 4-7B. The batch heat disturbance modeling method that can be performed by batch SI controller 810 is further described in U.S. patent application Ser. No. 16/590,783 filed Oct. 2, 2019, the entirety of which is incorporated by reference herein.

Batch SI controller 810 can perform a system identification experiment by sending a pseudo-random binary sequence (PRBS) temperature setpoint to HVAC equipment 210 (e.g., via equipment controller 824). The PRBS temperature setpoint can be used to gather various information regarding HVAC equipment 210 and the system (e.g., building 10) that can be used to perform SI. By providing the PRBS, excited data can be generated that may be reflective of system dynamics and useful for performing SI.

Based on the trained deterministic heat disturbance prediction model, batch SI controller 810 generate a deterministic heat disturbance profile that corresponds to a system identification period. Further, batch SI controller 810 can model system dynamics (e.g., building thermal dynamics) as well as a scale factor of the deterministic heat disturbance using prediction error method (PEM). In this way, batch SI controller 810 can model system dynamics using data collected online during the SI experiment along with the heat disturbance profile. As such, the system can be given in state space form as:

$$\begin{bmatrix} \dot{T}_{ia} \\ \dot{T}_m \end{bmatrix} = \begin{bmatrix} \frac{1}{C_{ia}}\left(-\frac{1}{R_{mi}} - \frac{1}{R_{oi}}\right) & \frac{1}{C_{ia}R_{mi}} \\ \frac{1}{C_m R_{mi}} & -\frac{1}{C_m R_{mi}} \end{bmatrix} \begin{bmatrix} T_{ia} \\ T_m \end{bmatrix} +$$

$$\begin{bmatrix} \frac{1}{C_{ia}} & \frac{1}{C_{ia}R_{oi}} & Q_{other,scale}\frac{1}{C_{ia}} \\ 0 & 0 & 0 \end{bmatrix} \begin{bmatrix} \dot{Q}_{HVAC} \\ T_{oa} \\ \hat{Q}_{Other,deterministic} \end{bmatrix}$$

$$[T_{ia}] = [1 \quad 0]\begin{bmatrix} T_{ia} \\ T_m \end{bmatrix} + [0 \quad 0 \quad 0]\begin{bmatrix} \dot{Q}_{HVAC} \\ T_{oa} \\ \hat{Q}_{Other,deterministic} \end{bmatrix}$$

where $Q_{other,scale}$ is the scale factor of the deterministic heat disturbance and $\hat{Q}_{other,deterministic}$ represents the deterministic heat disturbance. The system in state space form can be shown compactly as:

$$\dot{x}(t) = A_c x(t) + B_c u(t)$$
$$y(t) = C_c x(t) + D_c u(t)$$

where $\dot{x}(t) = \begin{bmatrix} \dot{T}_{ia} \\ \dot{T}_m \end{bmatrix}$, $y(t) = T_{ia}$, and $u(t) = \begin{bmatrix} \dot{Q}_{HVAC} \\ T_{oa} \\ \hat{Q}_{Other,deterministic} \end{bmatrix}$.

The matrices of the above system model can be given as:

$$A_c(\theta) = \begin{bmatrix} -(\theta_1 + \theta_2) & \theta_2 \\ \theta_3 & -\theta_3 \end{bmatrix}, B_c(\theta) = \begin{bmatrix} \theta_4 & \theta_1 & \theta_5\theta_4 \\ 0 & 0 & 0 \end{bmatrix}$$

$$C_c(\theta) = [1 \quad 0], \quad D_c(\theta) = [0 \quad 0]$$

where $\theta_1 = \dfrac{1}{C_{ia}R_{oi}}$, $\theta_2 = \dfrac{1}{C_{ia}R_{mi}}$, $\theta_3 = \dfrac{1}{C_m R_{mi}}$, $\theta_4 = \dfrac{1}{C_{ia}}$, and $\theta_5 = Q_{other,scale}$.

Batch SI controller 810 can augment the system model with a stochastic heat disturbance prediction model and can convert the augmented system into a discrete time model. A Kalman gain can be added to the augmented discrete time system. Batch SI controller 810 can identify the stochastic heat disturbance prediction model and the Kalman gain by performing multi-step PEM. In some embodiments, batch SI controller 810 performs one-step PEM to identify the stochastic heat disturbance prediction model and the Kalman gain. The identification process (multi-step PEM or one-step PEM) can utilize the data collected online during the SI experiment along with the generated heat disturbance profile.

The augmented system model with the stochastic heat disturbance prediction model may have the following state-space form:

$$\begin{bmatrix} \dot{T}_{ia} \\ \dot{T}_m \\ \dot{d}_e \end{bmatrix} = \begin{bmatrix} \dfrac{1}{C_{ia}}\left(-\dfrac{1}{R_{mi}}-\dfrac{1}{R_{oi}}\right) & \dfrac{1}{C_{ia}R_{mi}} & \dfrac{1}{C_{ia}} \\ \dfrac{1}{C_m R_{mi}} & -\dfrac{1}{C_m R_{mi}} & 0 \\ 0 & 0 & A_{d_e} \end{bmatrix} \begin{bmatrix} T_{ia} \\ T_m \\ d_e \end{bmatrix} +$$

$$\begin{bmatrix} \dfrac{1}{C_{ia}} & \dfrac{1}{C_{ia}R_{oi}} & Q_{other,scale}\dfrac{1}{C_{ia}} \\ 0 & 0 & 0 \\ 0 & 0 & 0 \end{bmatrix} \begin{bmatrix} \dot{Q}_{HVAC} \\ T_{oa} \\ \hat{Q}_{Other,deterministic} \end{bmatrix}$$

$$[T_{ia}] = [1 \quad 0 \quad 0] \begin{bmatrix} T_{ia} \\ T_m \\ d_e \end{bmatrix} + [0 \quad 0 \quad 0] \begin{bmatrix} \dot{Q}_{HVAC} \\ T_{oa} \\ \hat{Q}_{Other,deterministic} \end{bmatrix}$$

where $A_{d_e}$ is the stochastic heat disturbance prediction model. The augmented system model can be given compactly as:

$$\begin{bmatrix} \dot{x}(t) \\ \dot{d}_e(t) \end{bmatrix} = \begin{bmatrix} A_c & B_d \\ 0 & A_{d_e} \end{bmatrix} \begin{bmatrix} x(t) \\ d_e(t) \end{bmatrix} + \begin{bmatrix} B_c \\ B_{dd} \end{bmatrix} u(t)$$

$$y(t) = [C_c \quad C_d] \begin{bmatrix} x(t) \\ d_e(t) \end{bmatrix} + D_c u(t)$$

where the matrices $B_d$, $B_{dd}$ and $C_d$ can define coupling between the system model and the stochastic heat disturbance prediction model. The matrices $B_d$, $B_{dd}$ and $C_d$ can be chosen to be $$B_d = \begin{bmatrix} \dfrac{1}{C_{ia}} \\ 0 \end{bmatrix},$$

$B_{dd} = [0 \quad 0 \quad 0]$, and $C_d = 0$. In some embodiments, the matrices take on different values.

The augmented system model can be converted into discrete time and put into an observer system (i.e., the Kalman gain can be added). Said conversion can be given by the following:

$$\begin{bmatrix} \widehat{T_{ia}}(k+1) \\ \widehat{T_m}(k+1) \\ \widehat{d_e}(k+1) \end{bmatrix} = \begin{bmatrix} A_{d_{1,1}} & A_{d_{1,2}} & B_{dis_{1,1}} \\ A_{d_{2,1}} & A_{d_{2,2}} & B_{dis_{2,1}} \\ 0 & 0 & A_{dis} \end{bmatrix} \begin{bmatrix} \widehat{T_{ia}}(k) \\ \widehat{T_m}(k) \\ \widehat{d_e}(k) \end{bmatrix} + \begin{bmatrix} B_{d_{1,1}} & B_{d_{1,2}} & B_{d_{1,3}} \\ B_{d_{2,1}} & B_{d_{2,2}} & B_{d_{2,3}} \\ 0 & 0 & 0 \end{bmatrix}$$

$$\begin{bmatrix} \dot{Q}_{HVAC}(k) \\ T_{oa}(k) \\ \hat{Q}_{Other,deterministic}(k) \end{bmatrix} + \begin{bmatrix} K_{1,1} \\ K_{1,2} \\ K_{1,3} \end{bmatrix} (T_{ia}(k) - \widehat{T_{ia}}(k))$$

$$\widehat{T_{ia}}(k) = [1 \quad 0 \quad 0] \begin{bmatrix} \widehat{T_{ia}}(k) \\ \widehat{T_m}(k) \\ \widehat{d_e}(k) \end{bmatrix} + [0 \quad 0 \quad 0] \begin{bmatrix} \dot{Q}_{HVAC}(k) \\ T_{oa}(k) \\ \hat{Q}_{Other,deterministic}(k) \end{bmatrix}$$

or compactly as:

$$\begin{bmatrix} \hat{x}(k+1) \\ \hat{d}_e(k+1) \end{bmatrix} = \begin{bmatrix} A_d & B_{dis} \\ 0 & A_{dis} \end{bmatrix} \begin{bmatrix} \hat{x}(k) \\ \hat{d}_e(k) \end{bmatrix} + \begin{bmatrix} B_d \\ 0 \end{bmatrix} u(k) + K(y(k) - \hat{y}(k))$$

$$\hat{y}(k|k-1) = [C_c \quad 0] \begin{bmatrix} \hat{x}(k) \\ \hat{d}_e(k) \end{bmatrix} + D_c u(k)$$

where $\hat{x}(k) = \begin{bmatrix} \widehat{T_{ia}}(k) \\ \widehat{T_m}(k) \end{bmatrix}$ and $\hat{y}(k|k-1) = \widehat{T_{ia}}(k)$. The matrices $A_d$, $B_{dis}$, $A_{dis}$, $B_d$ may be discrete time versions of the matrices $A_c$, $B_d$, $A_{d_e}$, and $B_c$, respectively. K can represent the Kalman filter gain. The matrices $C_c$ and $D_c$ may stay the same in discrete time and in continuous time. Batch SI controller 810 can also identify Kalman filter gain parameters $K_{1,1}$, $K_{1,2}$, and $K_{1,3}$ as well as the stochastic heat disturbance prediction model $A_{d_e}$ (which in discrete time may correspond to $A_{dis}$) using multi-step PEM or one-step PEM. Batch SI controller 810 can provide the predictive model (e.g., a model capturing the deterministic heat disturbance prediction model, the augmented system model, etc.) to model bucket controller 814 to perform a model bucketing process as described in greater detail above. Based on the model bucketing process performed by model bucket controller 814, batch SI controller 810 can receive a selected model with a highest multi-step quality of predictions of the default models stored by database 820.

Based on the selected model (i.e., the model with the highest multi-step quality of predictions), batch SI controller 810 can determine if the selected model satisfies a desired multi-step quality of predictions. The desired multi-step quality of predictions can be a threshold value that ensures the selected model is adequate for use in MPC. The desired multi-step quality of predictions can be set by a user, determined by adaptive online SI controller 800, etc. If the selected model satisfies the desired multi-step quality of predictions, the selected model can be provided to an equipment controller 824 and/or some other controller (e.g., controller 212) for performing MPC and/or another control-based application. In some embodiments, equipment controller 824 includes some and/or all functionality of model predictive controller 414 and/or equipment controller 416 as described in greater detail above with reference to FIG. 4. Equipment controller 824 can utilize a predictive model to perform MPC for HVAC equipment 210. If the selected model does not satisfy the desired multi-step quality of predictions, batch SI controller 810 can trigger an online SI process. In particular, batch SI controller 810 may trigger light online SI controller 816 to perform a light online SI process if the selected model does not meet the desired quality of predictions.

In some embodiments, batch SI controller 810 models additional dynamics for the same system. Said models can be coupled to and/or decoupled from an original building thermal model generated for the system. The models of the additional dynamics can include models of, for example, $CO_2$, PM2.5, humidity, etc.

Adaptive Heat Disturbance Modeling

Still referring to FIG. 8, adaptive online SI controller 800 is shown to include light online SI controller 816 and intensive online SI controller 818. Light online SI controller 816 and intensive online SI controller 818 can perform an adaptive heat disturbance modeling process to generate a new/updated predictive model. The adaptive heat disturbance modeling process may differ slightly between light online SI and intensive online SI in that intensive online SI includes identification of a new system model (e.g., a new building thermal model) whereas light online SI may not. However, steps of the adaptive heat disturbance modeling process as described below can be performed by light online SI controller 816 and intensive online SI controller 818 except for differences as noted.

The adaptive heat disturbance modeling method performed by light online SI controller 816 and intensive online SI controller 818 can include estimating corrected heat disturbance values based on the most recent two weeks (or any other desired period of time) of data. The adaptive heat disturbance modeling method can include generating online heat disturbance calculations based on historic data. From a first glance, it may appear that online heat disturbance calculations can be the addition of deterministic and stochastic heat disturbance values that can be generated from deterministic and stochastic models of a predictive model generated by light online SI controller 816 and/or intensive online SI controller 818. Doing so may assume that heat disturbances throughout a year have similar magnitudes and shapes. However, solar irradiance can vary dramatically throughout the year making said assumption invalid. In addition, occupant activities and dynamics may also change throughout the year, thereby further affecting the heat disturbance. If heat disturbances throughout the year have similar magnitudes and shapes, zone temperature predictions may only have zero mean errors due to sensor noise and slight disturbance variations. In that case, the Kalman online corrections may be small and can result in zero mean correction values.

However, if heat disturbance values change over time due to solar irradiance variations, varying occupant dynamics, and/or other sources of heat disturbances, the zone temperature prediction errors may be larger and may no longer be zero mean errors as compared to if the heat disturbances throughout the year have similar magnitudes and shapes. In such cases, the Kalman corrections can contain a portion of the heat disturbances. Therefore, online heat disturbance calculations can account for all three components of the heat disturbance including the deterministic prediction values, stochastic heat disturbance predictions values, and online Kalman corrections. To account for all three components, the augmented state space model generated by light online SI controller 816 and/or intensive online SI controller 818 can be considered as described below:

$$\begin{bmatrix} \dot{T}_{ia} \\ \dot{T}_m \\ \dot{d}_e \end{bmatrix} = \begin{bmatrix} \frac{1}{C_{ia}}\left(-\frac{1}{R_{mi}}-\frac{1}{R_{oi}}\right) & \frac{1}{C_{ia}R_{mi}} & \frac{1}{C_{ia}} \\ \frac{1}{C_m R_{mi}} & -\frac{1}{C_m R_{mi}} & 0 \\ 0 & 0 & A_{d_e} \end{bmatrix} \begin{bmatrix} T_{ia} \\ T_m \\ d_e \end{bmatrix} +$$

$$\begin{bmatrix} \frac{1}{C_{ia}} & \frac{1}{C_{ia}R_{oi}} & \theta_5 \frac{1}{C_{ia}} \\ 0 & 0 & 0 \\ 0 & 0 & 0 \end{bmatrix} \begin{bmatrix} \dot{Q}_{HVAC} \\ T_{oa} \\ \dot{Q}_{Other,deterministic} \end{bmatrix}$$

$$[T_{ia}] = [1 \ 0 \ 0] \begin{bmatrix} T_{ia} \\ T_m \\ d_e \end{bmatrix} + [0 \ 0 \ 0] \begin{bmatrix} \dot{Q}_{HVAC} \\ T_{oa} \\ \dot{Q}_{Other,deterministic} \end{bmatrix}$$

The above system can be converted into discrete time and put into an observer system. Said conversion can be performed by light online SI controller 816 and/or intensive online SI controller 818 and can be given by:

$$\begin{bmatrix} \widehat{T_{ia}}(k+1) \\ \widehat{T_m}(k+1) \\ \widehat{d_e}(k+1) \end{bmatrix} = \begin{bmatrix} A_{d_{1,1}} & A_{d_{1,2}} & B_{dis_{1,1}} \\ A_{d_{2,1}} & A_{d_{2,2}} & B_{dis_{2,1}} \\ 0 & 0 & A_{dis} \end{bmatrix} \begin{bmatrix} \widehat{T_{ia}}(k) \\ \widehat{T_m}(k) \\ \widehat{d_e}(k) \end{bmatrix} + \begin{bmatrix} B_{d_{1,1}} & B_{d_{1,2}} & B_{d_{1,3}} \\ B_{d_{2,1}} & B_{d_{2,2}} & B_{d_{2,3}} \\ 0 & 0 & 0 \end{bmatrix}$$

$$\begin{bmatrix} \dot{Q}_{HVAC}(k) \\ T_{oa}(k) \\ \dot{Q}_{Other,deterministic}(k) \end{bmatrix} + \begin{bmatrix} K_{1,1} \\ K_{1,2} \\ K_{1,3} \end{bmatrix}(T_{ia}(k) - \widehat{T_{ia}}(k))$$

$$\widehat{T_{ia}}(k) = [1 \ 0 \ 0] \begin{bmatrix} \widehat{T_{ia}}(k) \\ \widehat{T_m}(k) \\ \widehat{d_e}(k) \end{bmatrix} + [0 \ 0 \ 0] \begin{bmatrix} \dot{Q}_{HVAC}(k) \\ T_{oa}(k) \\ \dot{Q}_{Other,deterministic}(k) \end{bmatrix}$$

The above converted system can be given compactly as:

$$\begin{bmatrix} \hat{x}(k+1) \\ \widehat{d_e}(k+1) \end{bmatrix} = \begin{bmatrix} A_d & B_{dis} \\ 0 & A_{dis} \end{bmatrix} \begin{bmatrix} \hat{x}(k) \\ \hat{d}_e(k) \end{bmatrix} + \begin{bmatrix} B_d \\ 0 \end{bmatrix} u(k) + K(y(k) - \hat{y}(k))$$

$$\hat{y}(k|k-1) = [C \ C_{dis}] \begin{bmatrix} \hat{x}(k) \\ \hat{d}_e(k) \end{bmatrix} + Du(k)$$

-continued where $\hat{x}(k+1) = \begin{bmatrix} \widehat{T_{ia}}(k) \\ \widehat{T_m}(k) \end{bmatrix}$, $\hat{y}(k|k-1) = \widehat{T_{ia}}(k)$, and $u(k) = \begin{bmatrix} \dot{Q}_{HVAC}(k) \\ T_{oa}(k) \\ \hat{Q}_{Other,deterministic}(k) \end{bmatrix}$.

Due to the fact that the $\hat{Q}_{other,deterministic}(k)$ values may not correctly capture the heat disturbances if solar irradiance and occupant's dynamics change significantly, the Kalman correction can contain a portion of the heat disturbances in the $K_{1,1}(T_{ia}(k)-\widehat{T_{ia}}(k))$ terms. In this case, error from model predictions may be considerably large (i.e., the error is it is not only a result of sensor noise). If the sensor noise element of the prediction error is ignored, the remaining error can be attributed to both the heat disturbance mismatch and plant model-mismatch. In some embodiments, the plant model mismatch has a minor effect if compared to the heat disturbance effect.

Based on said assumptions, light online SI controller 816 and/or intensive online SI controller 818 can back calculate the heat disturbance as:

$$Q_{other}(k) = \frac{\theta_5\left(B_{dis_{1,1}}\hat{d}_e(k) + K_{1,1}(T_{ia}(k) - \widehat{T_{ia}}(k))\right)}{B_{d_{1,3}}} + \theta_5\hat{Q}_{Other,deterministic}(k)$$

In this case, a resulting signal may be noisy as it is lumped with sensor noise. As such, the resulting signal can be processed through a low pass filter to smooth the output, thereby reducing high frequency sensor noise. The computed $Q_{other}(k)$ can represent the online heat disturbance calculations from historic data.

If the plant-model mismatch is significant (i.e., identified parameters result in incorrect values for $C_{ia}$, $C_m$, $R_{oi}$, $R_{mi}$), the resulting computed online Qthe(k) can be processed through an additional filter to remove plant-model mismatch from $Q_{other}(k)$. An example of a method performed by light online SI controller 816 and/or intensive online SI controller 818 for filtering the plant-model mismatch can be to compute $Q_{other}(k)$ for a certain period in time and compute a standard deviation. Any values of $Q_{other}(k)$ that exceed twice the computed standard deviation can be removed. Further, for each point in time k where $Q_{other}(k)$ exceeds twice the standard deviation, $Q_{other}(k)$ values that span a period that is equal to twice the largest time constant of the observer error system dynamics can be removed. Said observer error system dynamics can be described by the following:

$$\begin{bmatrix} A_d & B_{dis} \\ 0 & A_{dis} \end{bmatrix} - K[C_c \ 0] = \begin{bmatrix} A_{d_{1,1}} & A_{d_{1,2}} & B_{dis_{1,1}} \\ A_{d_{2,1}} & A_{d_{2,2}} & B_{dis_{2,1}} \\ 0 & 0 & A_{dis} \end{bmatrix} - \begin{bmatrix} K_{1,1} \\ K_{1,2} \\ K_{1,3} \end{bmatrix}[1 \ 0 \ 0]$$

Deleting said $Q_{other}(k)$ values may result in a $Q_{other}(k)$ profile that is missing some data points. Therefore, interpolation can be performed by light online SI controller 816 and/or intensive online SI controller 818 to fill in the missing $Q_{other}(k)$ data points. The resulting $Q_{other}(k)$ profile can represent the online heat disturbance calculations from historic data.

Based on the heat disturbance values (i.e., the $Q_{other}(k)$ profile) and weather data (e.g., outdoor air temperature, relative humidity, etc.), a new deterministic heat disturbance prediction model can be trained by light online SI controller 816 and/or intensive online SI controller 818 to replace an old deterministic heat disturbance prediction model of the system model. In some embodiments, to train the new deterministic heat disturbance prediction model, a linear regression and data fitting process is performed. In some embodiments, the new deterministic heat disturbance prediction model is obtained using a pattern recognition and linear regression strategy as described in greater detail in U.S. patent application Ser. No. 14/717,593 filed May 20, 2015, the entirety of which is incorporated by reference herein.

Using the new deterministic heat disturbance prediction model, deterministic heat disturbance predictions (i.e., a deterministic heat disturbance profile) can be generated by light online SI controller 816 and/or intensive online SI controller 818. In this way, a new $\hat{Q}_{other,deterministic}$ can be generated that corresponds to data collected online. The deterministic heat disturbance profile can correspond to any desired period of time. For example, the deterministic heat disturbance profile can correspond to data gathered over a two week period.

Based on the data collected online and the generated deterministic heat disturbance profile, a deterministic heat disturbance scale factor of the B matrix in the system model can be identified using simulation PEM. The system model considered in this step of the adaptive heat disturbance modeling method may not include the stochastic disturbance model and the Kalman gain. If intensive online SI controller 818 performs the adaptive heat disturbance modeling method rather than light online SI controller 816, the building thermal model can be identified together with the scale factor of deterministic heat disturbance. If light online SI is performed by light online SI controller 816, only the deterministic heat disturbance model may be identified and other system dynamics parameters can be kept constant. To perform the identification of the deterministic heat disturbance scale factor in terms of light online SI, other system dynamics parameters (e.g., building thermal dynamics parameters) of the system model can be kept constant as they do not need to be re-identified in light online SI. In other words, re-identification of the deterministic heat disturbance scale factor for light online SI can follow the same reduced order system that can be modeled using simulation PEM in the batch SI process described above. However, in terms of intensive online SI performed by intensive online SI controller 818, the building thermal model along with the deterministic heat disturbance scale factor can be identified together using simulation PEM.

The system model used in identification of the deterministic heat disturbance scale factor and the building thermal model (if performing intensive online SI) can be given by:

$$\begin{bmatrix} \dot{T}_{ia} \\ \dot{T}_m \end{bmatrix} = \begin{bmatrix} \frac{1}{C_{ia}}\left(-\frac{1}{R_{mi}} - \frac{1}{R_{oi}}\right) & \frac{1}{C_{ia}R_{mi}} \\ \frac{1}{C_m R_{mi}} & -\frac{1}{C_m R_{mi}} \end{bmatrix}$$

$$\begin{bmatrix} T_{ia} \\ T_m \end{bmatrix} + \begin{bmatrix} \frac{1}{C_{ia}} & \frac{1}{C_{ia}R_{oi}} & Q_{other,scale}\frac{1}{C_{ia}} \\ 0 & 0 & 0 \end{bmatrix} \begin{bmatrix} \dot{Q}_{HVAC} \\ T_{oa} \\ \hat{Q}_{Other,deterministic} \end{bmatrix}$$

-continued $$[T_{ia}] = [1\ 0]\begin{bmatrix} T_{ia} \\ T_m \end{bmatrix} + [0\ 0\ 0]\begin{bmatrix} \dot{Q}_{HVAC} \\ T_{oa} \\ \hat{Q}_{Other,deterministic} \end{bmatrix}$$

where $\theta_1 = \dfrac{1}{C_{ia}R_{oi}}$, $\theta_2 = \dfrac{1}{C_{ia}R_{mi}}$, $\theta_3 = \dfrac{1}{C_m R_{mi}}$, and $\theta_4 = \dfrac{1}{C_{ia}}$, Each of said parameters (i.e., $\theta_1$, $\theta_2$, $\theta_3$, and $\theta_4$) of the above system model may already be known from a previous system identification if light online SI is performed. In other words, the only unknown parameter that needs to be identified in light online SI is the deterministic heat disturbance scale factor $\theta_5 = Q_{other,scale}$. Intensive online SI, however, can include identification of each of said parameters such that no parameters from the previous system identification are used. As such, intensive online SI may include more identification steps as compared to light online SI.

The system to be identified can be represented by the following matrices:

$$A_c(\theta) = \begin{bmatrix} -(\theta_1 + \theta_2) & \theta_2 \\ \theta_3 & -\theta_3 \end{bmatrix},\ B_c(\theta) = \begin{bmatrix} \theta_4 & \theta_1 & \theta_5\theta_4 \\ 0 & 0 & 0 \end{bmatrix}$$

$$C_c(\theta) = [1\ 0],\ D_c(\theta) = [0\ 0]$$

As described above, if light online SI is performed by light online SI controller 816, only $\theta_5$ may need to be identified as the remaining building thermal parameters (i.e., $\theta_1$, $\theta_2$, $\theta_3$, and $\theta_4$) can be pre-fixed. As a result of $\theta_5$ appearing in the form $\theta_5\theta_4$ and said form is in the B matrix, the resulting identification of $\theta_5$ may only be a convex optimization problem and can be solved efficiently.

The adaptive heat disturbance modeling method can also include augmenting the system model with a stochastic disturbance model. The stochastic disturbance model can be augmented to the system model in both light online SI and intensive online SI performed by light online SI controller 816 and intensive online SI controller 818, respectively. The augmented system can be converted into a discrete time model and a Kalman gain can be added to the augmented discrete time system. Further, the stochastic disturbance model and the Kalman gain can be identified by using multi-step PEM. Specifically, the following system with the stochastic heat disturbance prediction model and the Kalman gain can be considered:

$$\begin{bmatrix} \tilde{T}_{ia}(k+1) \\ \tilde{T}_m(k+1) \\ \tilde{d}_e(k+1) \end{bmatrix} = \begin{bmatrix} A_{d_{1,1}} & A_{d_{1,2}} & B_{dis_{1,1}} \\ A_{d_{2,1}} & A_{d_{2,2}} & B_{dis_{2,1}} \\ 0 & 0 & A_{dis} \end{bmatrix} \begin{bmatrix} \tilde{T}_{ia}(k) \\ \tilde{T}_m(k) \\ \tilde{d}_e(k) \end{bmatrix} +$$

$$\begin{bmatrix} B_{d_{1,1}} & B_{d_{1,2}} & B_{d_{1,3}} \\ B_{d_{2,1}} & B_{d_{2,2}} & B_{d_{2,3}} \\ 0 & 0 & 0 \end{bmatrix} \begin{bmatrix} \dot{Q}_{HVAC}(k) \\ T_{oa}(k) \\ \hat{Q}_{Other,deterministic}(k) \end{bmatrix} + \begin{bmatrix} K_{1,1} \\ K_{1,2} \\ K_{1,3} \end{bmatrix}(T_{ia}(k) - \tilde{T}_{ia}(k))$$

$$\tilde{T}_{ia}(k) = [1\ 0\ 0]\begin{bmatrix} \tilde{T}_{ia}(k) \\ \tilde{T}_m(k) \\ \tilde{d}_e(k) \end{bmatrix} + [0\ 0\ 0]\begin{bmatrix} \dot{Q}_{HVAC}(k) \\ T_{oa}(k) \\ \hat{Q}_{Other,deterministic}(k) \end{bmatrix}$$

In this step of the adaptive heat disturbance modeling method, the Kalman gain parameters $K_{1,1}$, $K_{1,2}$, and $K_{1m3}$ as well as the stochastic heat disturbance prediction model $A_{d_e}$ (which in discrete time corresponds to $A_{dis}$) can be identified. In this way, the adaptive heat disturbance modeling method can conclude with a new predictive model.

Light Online System Identification

Still referring to FIG. 8, adaptive online SI controller 800 is shown to include light online SI controller 816. Light online SI controller 816 can receive a trigger message from trigger generator 812 and/or batch SI controller 810. Light online SI controller 816 may receive a trigger message from trigger generator 812 if trigger generator 812 determines an online SI process should be performed and that one or more default models are stored in database 820. Light online SI controller 816 may receive a trigger message from batch SI controller 810 if batch SI controller 810 receives a selected model from model bucket controller 814 that does not meet a desired multi-step quality of predictions. However, light online SI controller 816 may receive a trigger message due to other various determinations that light online SI should be performed. In general, a trigger message can indicate to light online SI controller 816 to perform a light online SI process.

In some embodiments, light online SI controller 816 can perform an adaptive heat disturbance modeling process as described above to identify a predictive model that can be used to predict heat disturbances. In short, light online SI controller 816 can estimate corrected heat disturbance values, generate a deterministic heat disturbance prediction model, generate a deterministic heat disturbance profile/predictions, and identify a heat disturbance scale factor of a system model using simulation PEM. Light online SI controller 816 can also augment the system model with a stochastic heat disturbance prediction model and a Kalman gain and can identify the stochastic heat disturbance prediction model and the Kalman gain. In this way, light online SI controller 816 can identify the predictive model as to predict heat disturbances.

Light online SI controller 816 can provide the predictive to model bucket controller 814 to perform a model bucketing process as described above. Based on the model bucketing process, model bucket controller 814 can provide a selected model (i.e., a model stored by database 820 with a highest multi-step quality of predictions) to light online SI controller 816. Light online SI controller 816 can determine if the selected model satisfies a desired multi-step quality of predictions. If the selected model satisfies the desired multi-step quality of predictions, light online SI controller 816 can provide the selected model to be used for MPC. In particular, light online SI controller 816 may provide the selected model to equipment controller 824 to perform MPC using the selected model to generate control signals for HVAC equipment 210. If the selected model does not satisfy the desired multi-step quality of predictions, light online SI controller 816 may provide a trigger message to intensive online SI controller 818. The selected model not satisfying the desired multi-step quality of predictions may indicate that physical properties of the system have changed. As such, intensive online SI can be performed by intensive online SI controller 818 to generate a new predictive model that can capture the physical changes.

Intensive Online System Identification

Adaptive online SI controller 800 is also shown to include intensive online SI controller 818. Intensive online SI controller 818 can receive a trigger message from light online SI controller 816 indicating that intensive online SI should be performed. In some embodiments, intensive online SI controller 818 receives a trigger message and/or some other indication to perform intensive online SI from a different component of adaptive online SI controller 800. For example, if intensive online SI is performed on a periodic basis (e.g., monthly, seasonally, etc.), trigger generator 812 may provide a trigger message to intensive online SI controller 818 periodically.

Similar to light online SI controller 816, intensive online SI controller 818 can perform an adaptive heat disturbance modeling process to generate a new predictive model for predicting heat disturbances. However, as compared to light online SI controller 816 that keeps some parameters the same during re-identification of the deterministic heat disturbance scale factor, intensive online SI controller 818 can remodel the entire system model and the deterministic heat disturbance scale factor using simulation PEM. By performing the adaptive heat disturbance modeling process, intensive online SI controller 818 can generate a new predictive model for predicting heat disturbances.

Intensive online SI controller 818 can provide the predictive model to model bucket controller 814 to perform a model bucketing process as described in greater detail above. Model bucket controller 814 can provide a selected model to intensive online SI controller 818. If intensive online SI controller 818 determines the selected model satisfies a desired multi-step quality of predictions, the selected model can be used in MWC. However, if intensive online SI controller 818 determines the selected model does not satisfy the desired multi-step quality of predictions, intensive online SI controller 818 may determine an insufficient amount of excited data exists in data used to generate the predictive model.

If an insufficient amount of excited data is determined to exist, intensive online SI controller 818 can perform a new SI experiment to gather new excited data. To perform the new SI experiment, intensive online SI controller 818 can provide a new PRBS signal to equipment controller 824. A new deterministic heat disturbance profile can be generated corresponding to times of the gathered data under the PRBS excitation. In some embodiments, rather than performing a new PRBS experiment, intensive online SI controller 818 executes a data selection process as described in greater detail below to select data for use in intensive online SI. Using the new deterministic heat disturbance profile, intensive online SI controller 818 can re-identify the system model and the deterministic heat disturbance scale factor as well as augment a new stochastic heat disturbance prediction model to the system model, convert the augmented system into a discrete time model, and add a Kalman gain to the augmented discrete time system. Intensive online SI controller 818 can further identify the new stochastic heat disturbance prediction model and the Kalman gain using multi-step PEM to generate a new predictive model.

The new predictive model can be provided to model bucket controller 814 and a new selected model can be received by intensive online SI controller 818. If intensive online SI controller 818 determines the new selected model satisfies a desired multi-step quality of predictions, intensive online SI controller 818 can provide the new selected model for use in MPC. However, even if the new selected model does not satisfy the desired multi-step quality of predictions after performing intensive online SI based on data gathered in the new SI experiment and/or selected from the data selection process, intensive online SI controller 818 may nevertheless provide the new selected model for use in MPC for a certain period of time. The certain period of time can be any predetermined amount of time (e.g., one week, one month, etc.). By using the new selected model in MPC for the certain period of time, adaptive online SI controller 800 can ensure that computationally expensive SI processes are not repeating many times and/or indefinitely if multiple low quality of predictions predictive models are being generated. After the certain period of time, intensive online SI controller 818 may initiate a new light online SI process to be performed by light online SI controller 816 and followed by an intensive online SI process. In this way, MPC can be performed for the certain period of time, after which adaptive online SI controller 800 can attempt to generate better predictive models.

Data Selection Process for System Identification

In some embodiments, rather than re-executing the PRBS experiment, intensive online SI controller 818 performs one or more data selection processes to select data for usage in model re-identification. Combining the one or more data selection processes with intensive online SI can provide an adaptive method to update MPC model coefficients without re-executing PRBS experiment. In some embodiments, the data selection processes are used in combination with re-execution of the PRBS experiment such that specific data from the PRBS experiment is selected to be used in model re-identification. In general, the data selection processes can, given data spanning a period of time (e.g., multiple days), detect and select ranges of data appropriate for use in SI. An example data selection process is described in detail below and with reference to FIG. 15. It should be appreciated, however, that the data selection process described below is provided for sake of example. Other processes can be integrated to ensure representative data is utilized in SI. If a data selection process is to be performed and multiple data selection processes are available, intensive online SI controller 818 can determine what data selection process to execute and whether multiple data selection processes should be executed to ensure appropriate data is selected for use in SI.

Further, it should be appreciated that the data selection processes described herein can be applied prior to any system identification process described herein and is not necessarily limited to intensive online SI. For example, the data selection process can be performed prior to performing batch SI or light online SI. Accordingly, the data selection process can be performed by batch SI controller 810, light online SI controller 816, etc. separately or in addition to being performed by intensive online SI controller 818. As such, description of the data selection process as being performed by intensive online SI controller 818 is provided for sake of example.

For an accurate model to be generated via SI, a variety of conditions may need to be met. First, the HVAC system in question must be well-controlled. In other words, the HVAC system may be required to be actively operating to control indoor air temperature and/or other environmental conditions. Interruptions in operation (e.g., the HVAC system being disabled) can result in poor control over the system and therefore data that is likely inaccurate. Moreover, data used in SI should be gathered under a sufficient heating or cooling load. As described in detail below, data associated with a low load may not contain sufficient excitations of the system and may result in unreliable models that do not accurately represent thermal dynamics of the corresponding building. Further, to ensure reliability of models generated via SI, a proper amount of HVAC excitations should be included in the data. If the system is in good control and is under enough heating or cooling loads, proper HVAC excitation can result from setpoint signals with sufficient frequencies. Low-frequency setpoint excitations may indicate few (or no) setpoint changes are included in the data. Few setpoint changes can result in a time-consuming identification process and may still generate an inaccurate model. On the other hand, very high-frequency excitations are not favorable as the HVAC system may not have enough time to respond to the setpoint changes. In addition, high-frequency excitations can increase a difficulty for intensive online SI controller 818 to distinguish a true signal from sensor noise as the true signal and the sensor noise may have a similar frequency. Therefore, selected data should include sufficient excitations that are between extreme low-frequencies and extreme high frequencies.

The data used for adaptive SI may be generated under MPC behaviors. As such, the resulting data may contain large sections with insufficient amounts of HVAC excitations. For example, shoulder seasons may be associated with insufficient HVAC excitations. High-frequency excitations can also harm identification of a good predictive model for MPC. Because intensive online SI can re-identify the system dynamical model, the training data used for intensive online SI should contain only the data sections with sufficient system dynamics excitations. In this way, proper data set selection can lead to identification of a more accurate predictive model with less running time. The data selection processes can, given multiple days' data, detect and select sections of the data that contains sufficient amounts of HVAC excitations for system identification.

With regard to an abbreviated description of the example data selection process, intensive online SI controller 818 can require zone setpoint temperatures with associated timestamps as well as a sampling rate at which data samples are gathered. The data selection process may require a minimum amount of time (e.g., 2 days) over which data should be gathered. The zone setpoint temperatures can be gathered in degrees Celsius, degrees Fahrenheit, Kelvin, etc. The data selection process may also require a minimum sampling rate (e.g., 60 minutes) for which the data is sampled.

Intensive online SI controller 818 can define data selection criteria in the data selection process. A required minimum and maximum duration of a constant setpoint in hours and/or another time increment can be defined. Said duration period/frequency can be defined by a user, adaptive online SI controller 800, etc. For example, if a user cares more about data when the setpoint temperature holds between three to five hours, the user can set the minimum duration to three and the maximum duration to five. In some embodiments, a default minimum duration is one hour and a maximum duration is twelve hours. Intensive online SI controller 818 can also define a daily minimum excitation percentage. If only a few periods of data meet the minimum and maximum duration, the data may not be useful for performing SI. Similar to the minimum and maximum duration, the daily minimum excitation percentage can be defined by a user, adaptive online SI controller 800, etc. In some embodiments, a default daily minimum excitation percentage is 25%.

Intensive online SI controller 818 can detect daily setpoint change and a duration of each change. Based on the detected changes, intensive online SI controller 818 can select time periods in each day that have setpoint changes that meet the minimum and maximum durations defined. Each qualifying period can be summed by intensive online SI controller 818. For each day's worth of data, if the summation of the qualifying period is greater than or equal to the daily minimum excitation percentage, said time periods can be recorded as having valuable data for system identification. In some embodiments, the data selection process includes performing a fast Fourier transform (FFT). If the FFT is performed, a frequency of changes for each day can be determined. Based on the frequency of changes for each day, one or more days with a desired frequency of changes can be selected and recorded for use in SI.

Based on the recorded time periods, intensive online SI controller 818 can gather zone input and output data (i.e., $T_{ia}$, $\hat{Q}_{HVAC}$, $T_{oa}$, and $\hat{Q}_{other,deterministic}$) that corresponds to the time periods with qualifying excited data. Several data sections can be generated based on the gathered zone input and output data and can be used by intensive online SI controller 818 in performing intensive online SI. In this way, intensive online SI controller 818 can gather excited data for SI without performing a new PRBS experiment which may take additional time, result in additional processing, and/or cause occupant to be temporarily uncomfortable in a space.

Now with regard to a more detailed explanation of the data selection process, intensive online SI controller 818 may utilize correlation coefficients to determine what periods of data are suitable for use in SI. To properly analyze a quality of data collected online for necessary and sufficient conditions as described above, the data selection process can cut the collected data into smaller data sections with equal duration. After the collected data is divided into the smaller data sections, a quality of each duration can be examined for certain conditions (e.g., active operation of the HVAC system to control indoor air temperature, sufficient heating or cooling load, a proper amount of HVAC excitations, etc.). Said durations can be referred to as data selection algorithm minimum test durations, also referred to as "test durations" and/or "minimum durations," as the duration can indicate a minimum amount of data that SI needs in order to properly identify a model. For example, if four days' worth of data is collected, a minimum duration may be half a day that results in eight equal data sections or a full day which results in four equal data sections. The minimum duration may be required to be at least of a certain length of time (e.g., half a day).

In the data selection process, a correlation coefficient between a setpoint and an indoor air temperature during each test duration can be calculated by intensive online SI controller 818. The correlation coefficient of the two variables (i.e., the setpoint and the indoor air temperature) can indicate a measure of their linear dependence, thereby indicating if the system is under control. The correlation coefficient can be calculated based on the following equation:

$$\rho(T_{sp}, T_{ia}) = \frac{cov(T_{sp}, T_{ia})}{\sigma_{T_{sp}}\sigma_{T_{ia}}}$$

where $\rho(T_{sp}, T_{ia})$ is the correlation coefficient, $cov(T_{sp}, T_{ia})$ is a covariance of setpoint $T_{sp}$ and indoor air temperature $T_{ia}$, and $\sigma_{T_{sp}}$ and $\sigma_{T_{ia}}$ are the standard deviation of $T_{sp}$ and $T_{ia}$, respectively. Based on the calculated correlation coefficients for each test duration, intensive online SI controller 818 can compare the calculated correlation coefficients with a correlation threshold. The correlation threshold can indicate a minimum value that indicates the system is under good control. In some embodiments, the correlation threshold is a value between 0 and 1 and has some default value (e.g., 0.7). As a result of the comparisons between the calculated correlation coefficients and the correlation threshold, intensive online SI controller 818 can detect periods of time under "good control" as those test durations where the calculated correlation coefficients is greater than the correlation threshold.

In the data selection process, intensive online SI controller 818 may also count a number of low load hours per test duration. As the equipment capacity may not be included in system identification training data, a low load period can be defined as a time range that sensible heat $Q_{HVAC}$ provided by the HVAC system is below a defined low load ranges (e.g., 10%) of a max $Q_{HVAC}$ value within the entire training data set. For each test duration, intensive online SI controller 818 can compare an overall low load hours with a predefined duration threshold to determine a validity of the test duration. Intensive online SI controller 818 can then detect/identify test durations with few low load values (e.g., less than a predefined threshold) as suitable for use in SI.

To determine the HVAC excitations in the data selection process, intensive online SI controller 818 can first define a minimum period and a maximum period of constant setpoint per test duration to avoid frequency signals that are either too low or too high. In each test duration, intensive online SI controller 818 can track an amount of time spent at a constant setpoint value. In this case, defining a constant setpoint value can be based on a $T_{sp}$ detection resolution. For a constant setpoint value, the $T_{sp}$ detection resolution can represent a range of temperature setpoint variations around a given setpoint that do not need represent a setpoint change. For example, if the $T_{sp}$ detection resolution can be defined as 0.5° C. and a temperature setpoint value is 25° C., then all values between 24.5° C. and 25.5° C. can be considered as a constant. However, if the temperature setpoint value moves above 25.5° C. or below 24.5° C., a setpoint change may be identified.

Based on tracked amounts of time spent at certain constant setpoint values, intensive online SI controller 818 can validate that the setpoints remained within a minimum and maximum periods of constant setpoint. The minimum and maximum periods of constant setpoint can be defined in various time scales (e.g., minutes, hours, etc.) and can be used to determine what setpoints are valid. In this case, intensive online SI controller 818 may label these setpoints as valid setpoints within a test duration.

For each test duration, in the data selection process, intensive online SI controller 818 can further take all setpoint values and compute a percentage of the setpoint periods that remained within the minimum and maximum periods of constant setpoint. The computed percentage can be compared against a predefined smallest qualifying percentage within a test duration. The predefined smallest qualifying percentage can be defined by a user, by intensive online SI controller 818, by some external system/device, etc. as between 0% and 100%. In some embodiments, a default value of the predefined smallest qualifying percentage is set to 25%. Based on the comparisons performed between the computed percentage and the predefined smallest qualifying percentage, test durations with a valid amount of HVAC excitations can be defined as test durations where the computed percentage exceeds the predefined smallest qualifying percentage.

As a result of detecting test durations with a good control period, few low load values, and a proper amount of HVAC excitations, intensive online SI controller 818 can select test durations (if any) that satisfy all three criteria. In this way, SI can be performed using only data that is relevant and useful in identifying a model. In other words, by performing the data selection process, intensive online SI controller 818 can prevent data associated with poor control, a high number of low load values, and/or with an insufficient amount of HVAC excitations from being used in SI. The data selection process is described in additional detail below with reference to FIG. 15.

Processes for Adaptive Online System Identification

Referring generally to FIGS. 9-15, processes utilized for performing adaptive online SI are described, according to some embodiments. In some embodiments, the processes described below throughout FIGS. 9-15 can be performed by adaptive online SI controller 800 and/or components thereof as described above with reference to FIG. 8.

Figure 9:
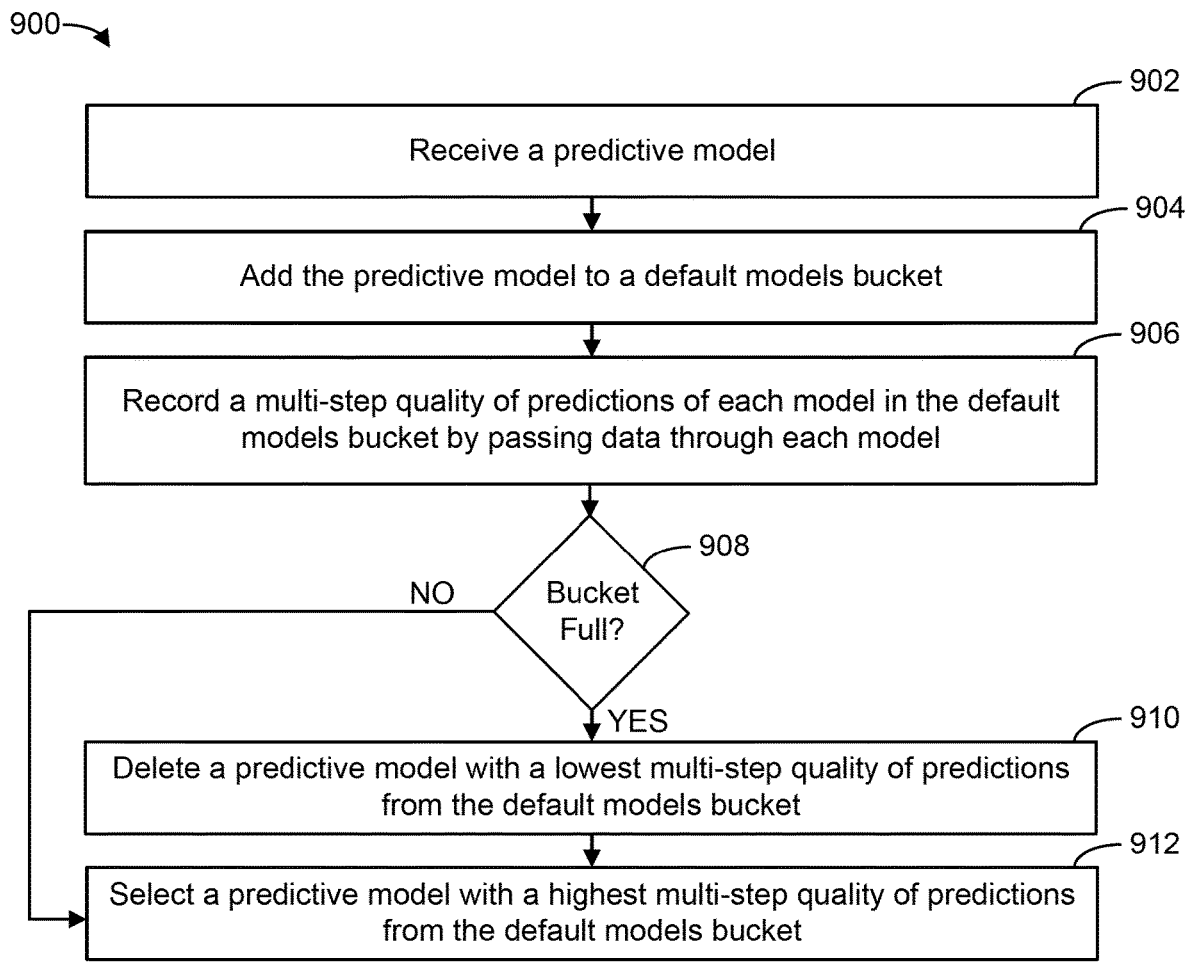
FIG. 9 is a flow diagram of a process for performing a model bucketing process, according to some embodiments.

Referring now to FIG. 9, a process 900 for performing a model bucketing process is shown, according to some embodiments. Process 900 can illustrate how a bucket of models can be used to ensure MWC utilizes a best available model. It may not always be the case that a most recently identified model is the most accurate predictive model of available models. However, the default models bucket can ensure that a most accurate available predictive model is used regardless of whether the most recently identified model is the most accurate available predictive model. In some embodiments, process 900 is performed by model bucket controller 814 and database 820.

Process 900 is shown to include receiving a predictive model (step 902). The predictive model can be received from various SI controllers and/or as a result of batch SI, light online SI, and/or intensive online SI being performed. In some embodiments, step 902 is performed by model bucket controller 814.

Process 900 is shown to include adding the predictive model to a default models bucket (step 904). The default models bucket can be a database that can store predictive models for use in performing MPC and/or other control-based applications. The default models bucket can hold up to N+1 default models where N is a maximum number of default models that should be in the default models bucket after process 900 concludes. As a result of adding the predictive model the default models bucket, the default models bucket can have between 1 and N+1 default models stored dependent on a number of default models stored before the addition of the predictive model. In some embodiments, step 904 is performed by model bucket controller 814 and/or database 820.

Process 900 is shown to include recording a multi-step quality of predictions of each model in the default models bucket by passing data through each model (step 906). The data utilized in step 906 can be gathered from an SI experiment where a PRBS signal is provided to HVAC equipment. By determining the multi-step quality of predictions of each model, it can be determined what models provide results that most accurately reflect actual system dynamics. In some embodiments, step 906 is performed by model bucket controller 814.

Process 900 is shown to include a determination of whether the default models bucket is full (step 908). In essence, step 908 can include determining if the default models bucket stores N+1 default models after the addition of the predictive model in step 904. If the default models bucket is not full (i.e., the default models bucket stores less than N+1 default models), the addition of the predictive model does not result in the default models bucket exceeding capacity. In this way, if the default models bucket is not full (step 908, "NO"), process 900 can proceed to step 912. However, if the default models bucket is full (step 908, "YES"), process 900 can proceed to step 910. In some embodiments, step 908 is performed by model bucket controller 814.

Process 900 is shown to include deleting a predictive model with a lowest multi-step quality of predictions from the default models bucket (step 910). The predictive model with the lowest multi-step quality of predictions can be determined based on the multi-step quality of predictions recorded in step 906. As the default models bucket should only store a maximum of N models at the conclusion of process 900, step 910 can result in removal of a default model to ensure said storage maximum is satisfied. Specifically, the predictive model with the lowest multi-step quality of predictions is deleted as said predictive model is unlikely to be accurate for use in MPC. If two or more models have the same value of the lowest multi-step quality of predictions, some other comparison can be performed to determine which model to delete. For example, an oldest model may be deleted if two or more models have the same lowest multi-step quality of predictions. In some embodiments, step 910 is performed by model bucket controller 814 and/or database 820.

Process 900 is shown to include selecting a predictive model with a highest multi-step quality of predictions from the default models bucket (step 912). The predictive model with the highest multi-step quality of predictions may be a best model for use in performing MPC. The predictive model with the highest multi-step quality of predictions can be selected based on the multi-step quality of predictions recorded in step 906. In some embodiments, step 912 includes providing the selected model to a controller and/or some other component/device. For example, the selected model may be provided to a component that provided the predictive model received in step 902. In some embodiments, steps 908, 910, and 912 are performed in different orders than as shown. For example, the predictive model selected in step 912 may be selected first, then, if the default models bucket is full, the predictive model with the worst quality of predictions can be deleted. In some embodiments, step 912 is performed by model bucket controller 814.

Figure 10:
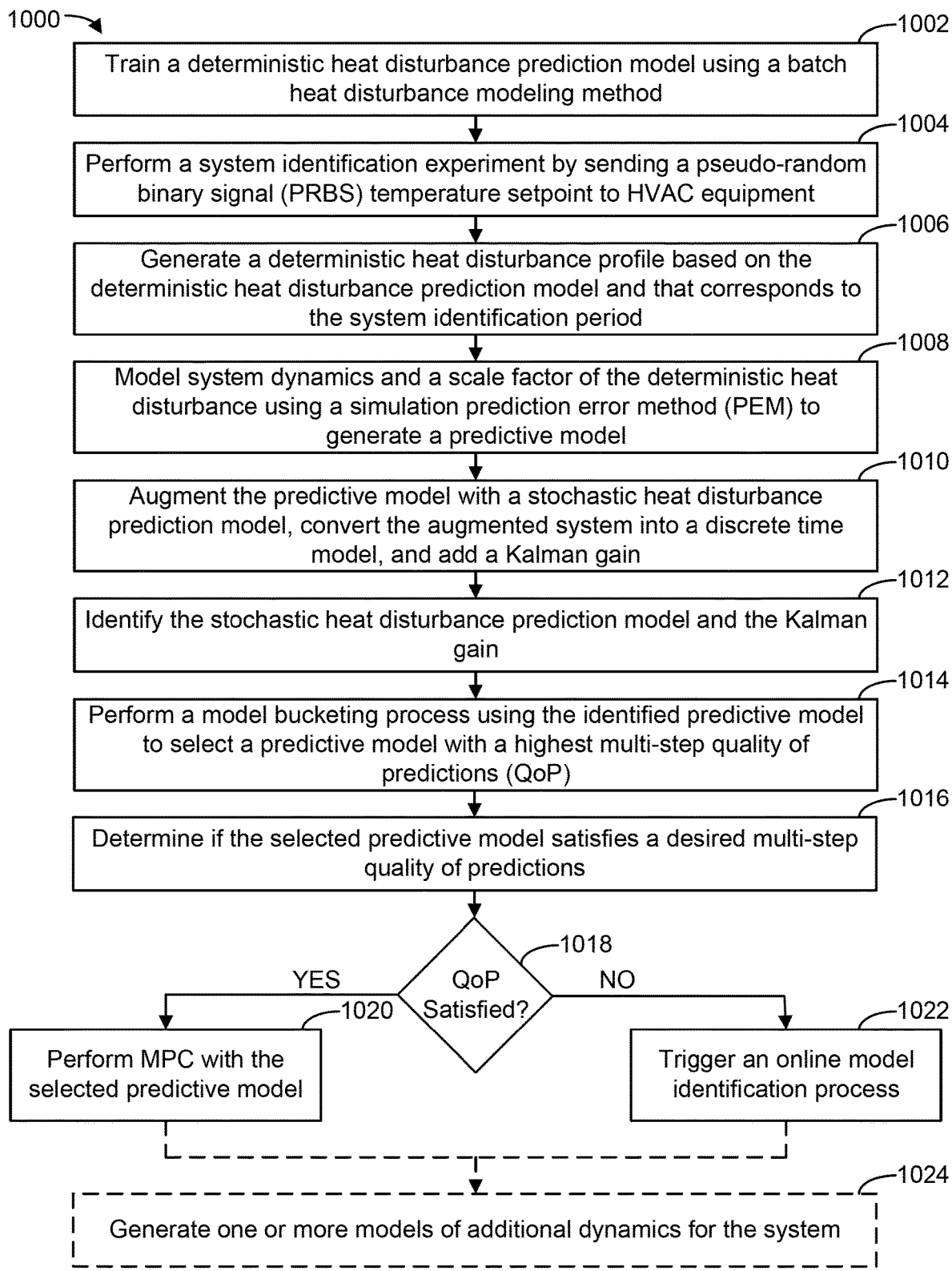
FIG. 10 is a flow diagram of a process for performing batch system identification, according to some embodiments.

Referring now to FIG. 10, a process 1000 for performing batch system identification is shown, according to some embodiments. Batch system identification can be performed if no prior predictive models exist. In this way, process 1000 may be similar to and/or the same as process 600 described above with reference to FIG. 6. In some embodiments, process 1000 is performed by batch SI controller 810 and/or other components of adaptive online SI controller 800 as described with reference to FIG. 8.

Process 1000 is shown to include training a deterministic heat disturbance prediction model using a batch heat disturbance modeling method (step 1002). Batch heat disturbance modeling methods can assume a default deterministic heat disturbance shape for each day. Further, batch heat disturbance modeling methods can use regression methods on data collected from a site in order to generate approximate heat disturbance data. The approximate heat disturbance data can be used to train the deterministic heat disturbance prediction model. In some embodiments, step 1002 is performed by batch SI controller 810. The batch heat disturbance modeling method that can be performed in step 1002 is further described in U.S. patent application Ser. No. 16/590,783 filed Oct. 2, 2019, the entirety of which is incorporated by reference herein.

Process 1000 is shown to include performing a system identification experiment by sending a pseudo-random binary sequence (PRBS) temperature setpoint to HVAC equipment (step 1004). Performing step 1004 can generate data that can be used to identify a system model that captures system dynamics. The PRBS temperature setpoint can be used as the PRBS temperature setpoint may result in at least some of the gathered data including excited HVAC dynamics that can be beneficial for generating accurate predictive models. In some embodiments, step 1004 is performed by batch SI controller 810 and/or equipment controller 824.

Process 1000 is shown to include generating a deterministic heat disturbance profile based on the deterministic heat disturbance prediction model and that corresponds to the system identification period (step 1006). To generate the deterministic heat disturbance profile, the data gathered in step 1004 can be passed through the deterministic heat disturbance prediction model to generate deterministic heat disturbance predictions. In some embodiments, step 1006 is performed by batch SI controller 810.

Process 1000 is shown to include modeling system dynamics and a scale factor of the deterministic heat disturbance using a simulation prediction error method (PEM) to generate a predictive model (step 1008). Step 1008 can utilize the data collected online in step 1004 and the heat deterministic heat disturbance profile generated in step 1006. In this way, the predictive model can be given by the following:

$$\begin{bmatrix} \dot{T}_{ia} \\ \dot{T}_m \end{bmatrix} = \begin{bmatrix} \frac{1}{C_{ia}}\left(-\frac{1}{R_{mi}} - \frac{1}{R_{oi}}\right) & \frac{1}{C_{ia}R_{mi}} \\ \frac{1}{C_m R_{mi}} & -\frac{1}{C_m R_{mi}} \end{bmatrix}$$

$$\begin{bmatrix} T_{ia} \\ T_m \end{bmatrix} + \begin{bmatrix} \frac{1}{C_{ia}} & \frac{1}{C_{ia}R_{oi}} & Q_{other,scale}\frac{1}{C_{ia}} \\ 0 & 0 & 0 \end{bmatrix} \begin{bmatrix} \dot{Q}_{HVAC} \\ T_{oa} \\ \dot{Q}_{Other,deterministic} \end{bmatrix}$$

$$[T_{ia}] = [1\ 0]\begin{bmatrix} T_{ia} \\ T_m \end{bmatrix} + [0\ 0\ 0]\begin{bmatrix} \dot{Q}_{HVAC} \\ T_{oa} \\ \dot{Q}_{Other,deterministic} \end{bmatrix}$$

or compactly as:

$$\dot{x}(t) = A_c\, x(t) + B_c\, u(t)$$
$$y(t) = C_c x(t) + D_c u(t)$$

where $\dot{x}(t) = \begin{bmatrix} \dot{T}_{ia} \\ \dot{T}_m \end{bmatrix}$, $y(t) = T_{ia}$, and $u(t) = \begin{bmatrix} \dot{Q}_{HVAC} \\ T_{oa} \\ \dot{Q}_{Other,deterministic} \end{bmatrix}$.

Step 1008 can include parameterizing the predictive model such that the parameterized form of the predictive model can be given by the following:

$$A_c(\theta) = \begin{bmatrix} -(\theta_1 + \theta_2) & \theta_2 \\ \theta_3 & -\theta_3 \end{bmatrix},\ B_c(\theta) = \begin{bmatrix} \theta_4 & \theta_1 & \theta_5\theta_4 \\ 0 & 0 & 0 \end{bmatrix}$$

$$C_c(\theta) = [1\ 0],\ D_c(\theta) = [0\ 0]$$

where $\theta_1 = \frac{1}{C_{ia}R_{oi}},\ \theta_2 = \frac{1}{C_{ia}R_{mi}},\ \theta_3 = \frac{1}{C_m R_{mi}},\ \theta_4 = \frac{1}{C_{ia}}$, and $\theta_5 = Q_{other,scale}$ which is deterministic heat disturbance scale factor that is identified in step 1008. In some embodiments, step 1008 is performed by batch SI controller 810.

Process 1000 is shown to include augmenting the predictive model with a stochastic heat disturbance prediction model, converting the augmented system into a discrete time model, and adding a Kalman gain (step 1010). The augmented system model with the stochastic heat disturbance prediction model can have the following state-space form:

$$\begin{bmatrix} \dot{T}_{ia} \\ \dot{T}_m \\ \dot{d}_e \end{bmatrix} = \begin{bmatrix} \frac{1}{C_{ia}}\left(-\frac{1}{R_{mi}} - \frac{1}{R_{oi}}\right) & \frac{1}{C_{ia}R_{mi}} & \frac{1}{C_{ia}} \\ \frac{1}{C_m R_{mi}} & -\frac{1}{C_m R_{mi}} & 0 \\ 0 & 0 & A_{d_e} \end{bmatrix}$$

$$\begin{bmatrix} T_{ia} \\ T_m \\ d_e \end{bmatrix} + \begin{bmatrix} \frac{1}{C_{ia}} & \frac{1}{C_{ia}R_{oi}} & Q_{other,scale} \frac{1}{C_{ia}} \\ 0 & 0 & 0 \\ 0 & 0 & 0 \end{bmatrix} \begin{bmatrix} \dot{Q}_{HVAC} \\ T_{oa} \\ \hat{Q}_{Other,deterministic} \end{bmatrix}$$

$$[T_{ia}] = [1\ 0\ 0]\begin{bmatrix} T_{ia} \\ T_m \\ d_e \end{bmatrix} + [0\ 0\ 0]\begin{bmatrix} \dot{Q}_{HVAC} \\ T_{oa} \\ \hat{Q}_{Other,deterministic} \end{bmatrix}$$

or can be given compactly as:

$$\begin{bmatrix} \dot{x}(t) \\ \dot{d}_e(t) \end{bmatrix} = \begin{bmatrix} A_c & B_d \\ 0 & A_{d_e} \end{bmatrix}\begin{bmatrix} x(t) \\ d_e(t) \end{bmatrix} + \begin{bmatrix} B_c \\ B_{dd} \end{bmatrix}u(t)$$

$$y(t) = [C_c\ C_d]\begin{bmatrix} x(t) \\ d_e(t) \end{bmatrix} + D_c u(t)$$

where $A_{d_e}$ is the stochastic heat disturbance prediction model. The matrices $B_d$, $B_{dd}$ and $C_d$ can define the coupling between the system model and the stochastic heat disturbance model. The matrices $B_d$, $B_{dd}$ and $C_d$ can be chosen to be $$B_d = \begin{bmatrix} \frac{1}{C_{ia}} \\ 0 \end{bmatrix},$$

$B_{dd}=[0\ 0\ 0]$, and $C_d=0$. By converting the system into discrete time and put into an observer system (i.e. the Kalman gain is added), the system can be given by the following:

$$\begin{bmatrix} \widehat{T_{ia}}(k+1) \\ \widehat{T_m}(k+1) \\ \widehat{d_e}(k+1) \end{bmatrix} = \begin{bmatrix} A_{d_{1,1}} & A_{d_{1,2}} & B_{dis_{1,1}} \\ A_{d_{2,1}} & A_{d_{2,2}} & B_{dis_{2,1}} \\ 0 & 0 & A_{dis} \end{bmatrix}\begin{bmatrix} \widehat{T_{ia}}(k) \\ \widehat{T_m}(k) \\ \widehat{d_e}(k) \end{bmatrix} +$$

$$\begin{bmatrix} B_{d_{1,1}} & B_{d_{1,2}} & B_{d_{1,3}} \\ B_{d_{2,1}} & B_{d_{2,2}} & B_{d_{2,3}} \\ 0 & 0 & 0 \end{bmatrix}\begin{bmatrix} \dot{Q}_{HVAC}(k) \\ T_{oa}(k) \\ \hat{Q}_{Other,deterministic}(k) \end{bmatrix} + \begin{bmatrix} K_{1,1} \\ K_{1,2} \\ K_{1,3} \end{bmatrix}(T_{ia}(k)-\widehat{T_{ia}}(k))$$

$$\widehat{T_{ia}}(k) = [1\ 0\ 0]\begin{bmatrix} \widehat{T_{ia}}(k) \\ \widehat{T_m}(k) \\ \widehat{d_e}(k) \end{bmatrix} + [0\ 0\ 0]\begin{bmatrix} \dot{Q}_{HVAC}(k) \\ T_{oa}(k) \\ \hat{Q}_{Other,deterministic}(k) \end{bmatrix}$$

or can be given compactly as:

$$\begin{bmatrix} \hat{x}(k+1) \\ \hat{d}_e(k+1) \end{bmatrix} = \begin{bmatrix} A_d & B_{dis} \\ 0 & A_{dis} \end{bmatrix}\begin{bmatrix} \hat{x}(k) \\ \hat{d}_e(k) \end{bmatrix} + \begin{bmatrix} B_d \\ 0 \end{bmatrix}u(k) + K(y(k)-\hat{y}(k))$$

$$\hat{y}(k\mid k-1) = [C_c\ 0]\begin{bmatrix} \hat{x}(k) \\ \hat{d}_e(k) \end{bmatrix} + D_c u(k)$$

where $\hat{x}(k) = \begin{bmatrix} \widehat{T_{ia}}(k) \\ \widehat{T_m}(k) \end{bmatrix}$ and $\hat{y}(k\mid k-1) = \widehat{T_{ia}}(k)$.

The matrices $A_d$, $B_{dis}$, $A_{dis}$, $B_d$ may be the discrete time version of the matrices $A_c$, $B_d$, $A_{d_e}$, and $B_c$, respectively. K can represent the Kalman filter gain. The matrices $C_c$ and $D_c$ may stay the same in discrete time and in continuous time. In some embodiments, step 1010 is performed by batch SI controller 810.

Process 1000 is shown to include identifying the stochastic heat disturbance prediction model and the Kalman gain (step 1012). Based on the above augmented discrete time model put into the observer system, the Kalman filter gain parameters (i.e., $K_{1,1}$, $K_{1,2}$, and $K_{1,3}$) as well as the stochastic heat disturbance model $A_{d_e}$ (which in discrete time corresponds to $A_{dis}$) can be identified using multi-step PEM. In some embodiments, one-step PEM is used instead of and/or in conjunction with multi-step PEM. By performing step 1012, a new predictive model can be generated that models system dynamics (e.g., building thermal dynamics) and can be used to predict heat disturbances affecting a space. In some embodiments, step 1012 is performed by batch SI controller 810.

Process 1000 is shown to include performing a model bucketing process using the identified predictive model to select a predictive model with a highest multi-step quality of predictions (step 1014). In some embodiments, step 1014 includes performing process 900 as described with reference to FIG. 9. By performing process 900, a predictive model with a highest multi-step quality of predictions can be selected of available default models stored in a default models bucket. In some embodiments, step 1014 is performed by batch SI controller 810, model bucket controller 814, and/or database 820.

Process 1000 is shown to include determining if the selected predictive model satisfies a desired multi-step quality of predictions (step 1016). The desired multi-step quality of predictions can be set by a user, a controller, an external system, etc. The desired multi-step quality of predictions can be set such that predictive models are only used in MWC if they are expected to sufficiently model system dynamics. In some embodiments, step 1016 is performed by batch SI controller 810.

Process 1000 is shown to include a determination of whether the desired multi-step quality of predictions is satisfied (step 1018). If the desired multi-step quality of predictions is satisfied (step 1018, "YES"), process 1000 can proceed to step 1020. If the desired multi-step quality of predictions is not satisfied (step 1018, "NO"), process 1000 can proceed to step 1022. In some embodiments, step 1018 is performed by batch SI controller 810.

Process 1000 is shown to include performing MPC with the selected predictive model (step 1020). If step 1020 is performed, the selected model should satisfy the desired multi-step quality of predictions such that the selected model is suitable for use in MPC. As such, the selected predictive model may adequately capture system dynamics such that cost-effective decisions can be made in MPC. In some embodiments, step 1020 is performed by equipment controller 824.

Process 1000 is shown to include triggering an online model identification process (step 1022). If step 1022 is performed, the selected predictive model may not satisfy the desired multi-step quality of predictions. In other words, the selected predictive model may not be suitable for use in MPC. Therefore, the online model identification process can generate a new predictive model to be considered for use in MPC. In some embodiments, step 1022 triggers a process 1200 as described below with reference to FIG. 12 to be performed. In some embodiments, step 1022 is performed by batch SI controller 810.

Process 1000 is shown to include generating one or more models of additional dynamics for the system (optional step 1024). Step 1024 is shown to be an optional step of process 1000 as MPC may or may not utilize models of additional dynamics other than thermal dynamics. The one or more models that can be generated can be coupled and/or decoupled from the original building thermal model. For example, models of $CO_2$, PM2.5, humidity, etc. can be generated in step 1024. In some embodiments, step 1024 is performed by components of adaptive online SI controller 800.

Figure 11:
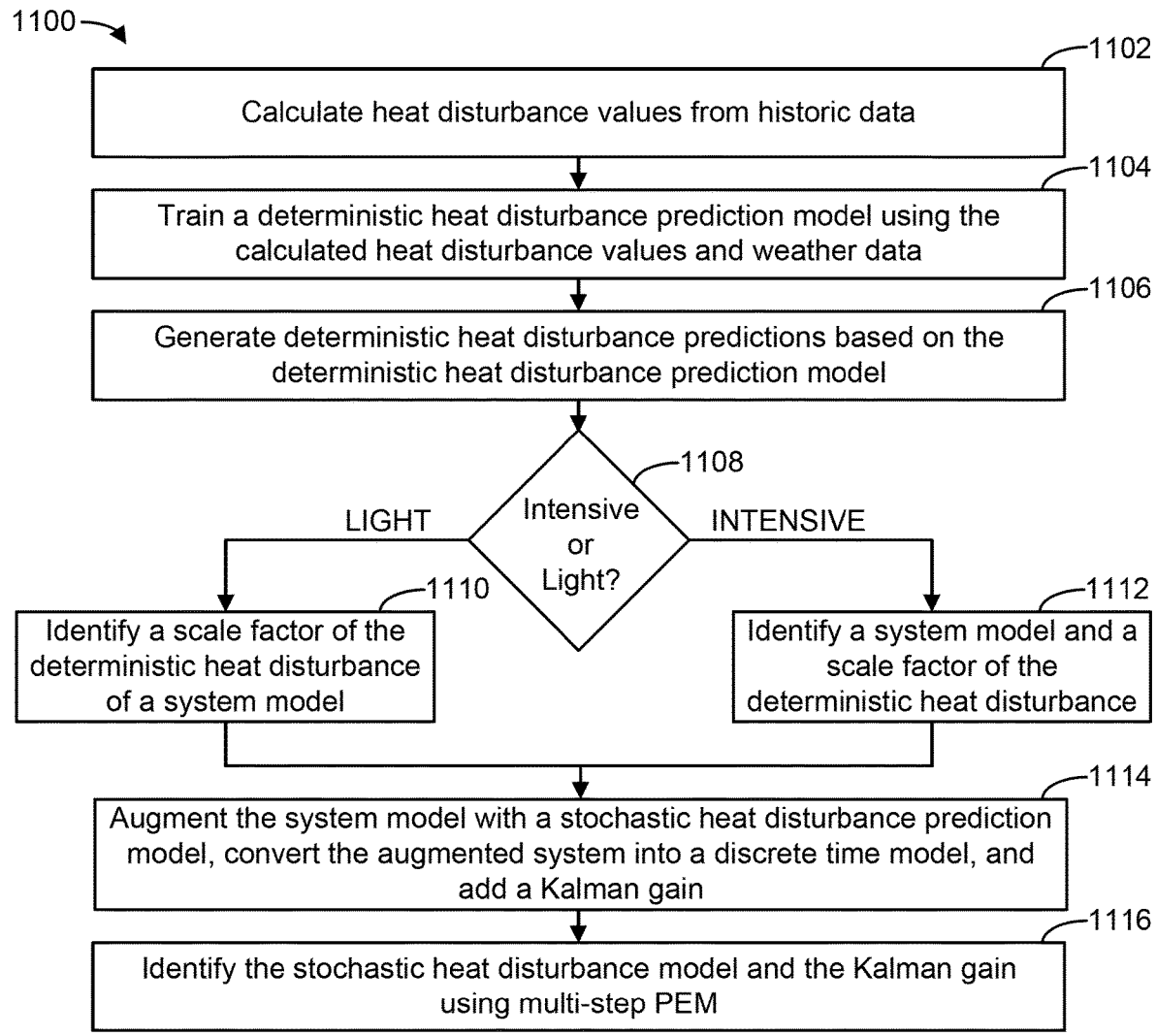
FIG. 11 is a flow diagram of a process for performing an adaptive heat disturbance modeling method, according to some embodiments.

Referring now to FIG. 11, a process 1100 for performing an adaptive heat disturbance modeling method is shown, according to some embodiments. In some embodiments, process 1100 is performed in light online SI and/or intensive online SI. As such, process 1100 can be performed in process 1200 and/or process 1300 as described below with reference to FIGS. 12 and 13, respectively. In some embodiments, process 1100 is performed by components of adaptive online SI controller 800 (e.g., light online SI controller 816, intensive online SI controller 818, etc.).

Process 1100 is shown to include calculating heat disturbance values from historic data (step 1102). Step 1102 can include estimating corrected heat disturbance values based on the most recent two weeks (or any other desired period of time) of collected data. It may seem that online heat disturbance calculations can be the addition of deterministic and stochastic heat disturbance values that can be generated from deterministic and stochastic models of a system model. Doing so may assume that heat disturbances throughout a year have similar magnitudes and shapes. However, solar irradiance can vary dramatically throughout the year making said assumption invalid. In addition, occupant activities and dynamics may also change throughout the year, thereby further affecting the heat disturbance. If heat disturbances throughout the year have similar magnitudes and shapes, zone temperature predictions may only have zero mean errors due to sensor noise and slight disturbance variations. In that case, the Kalman online corrections may be small and can result in zero mean correction values.

However, if heat disturbance values change dramatically due to solar irradiance variations, varying occupant dynamics, and/or other sources of heat disturbances, the zone temperature prediction errors may be larger and are no longer zero mean errors as compared to if the heat disturbances throughout the year have similar magnitudes and shapes. In such cases, Kalman corrections can contain a portion of the heat disturbances. Therefore, online heat disturbance calculations can account for all three components of the heat disturbance including deterministic prediction values, stochastic heat disturbance predictions values, and online Kalman corrections. To account for all three components, an augmented state space model can be considered as described below:

$$\begin{bmatrix} \dot{T}_{ia} \\ \dot{T}_m \\ \dot{d}_e \end{bmatrix} = \begin{bmatrix} \frac{1}{C_{ia}}\left(-\frac{1}{R_{mi}} - \frac{1}{R_{oi}}\right) & \frac{1}{C_{ia}R_{mi}} & \frac{1}{C_{ia}} \\ \frac{1}{C_m R_{mi}} & -\frac{1}{C_m R_{mi}} & 0 \\ 0 & 0 & A_{d_e} \end{bmatrix}$$

$$\begin{bmatrix} T_{ia} \\ T_m \\ d_e \end{bmatrix} + \begin{bmatrix} \frac{1}{C_{ia}} & \frac{1}{C_{ia}R_{oi}} & \theta_5 \frac{1}{C_{ia}} \\ 0 & 0 & 0 \\ 0 & 0 & 0 \end{bmatrix} \begin{bmatrix} \dot{Q}_{HVAC} \\ T_{oa} \\ \hat{Q}_{Other,deterministic} \end{bmatrix}$$

$$[T_{ia}] = [1\ 0\ 0] \begin{bmatrix} T_{ia} \\ T_m \\ d_e \end{bmatrix} + [0\ 0\ 0] \begin{bmatrix} \dot{Q}_{HVAC}(k) \\ T_{oa}(k) \\ \hat{Q}_{Other,deterministic}(k) \end{bmatrix}$$

The above system can be converted into discrete time and put into an observer system. Said conversion can be given by:

$$\begin{bmatrix} \widehat{T_{ia}}(k+1) \\ \widehat{T_m}(k+1) \\ \widehat{d_e}(k+1) \end{bmatrix} = \begin{bmatrix} A_{d_{1,1}} & A_{d_{1,2}} & B_{dis_{1,1}} \\ A_{d_{2,1}} & A_{d_{2,2}} & B_{dis_{2,1}} \\ 0 & 0 & A_{dis} \end{bmatrix} \begin{bmatrix} \widehat{T_{ia}}(k) \\ \widehat{T_m}(k) \\ \widehat{d_e}(k) \end{bmatrix} + \begin{bmatrix} B_{d_{1,1}} & B_{d_{1,2}} & B_{d_{1,3}} \\ B_{d_{2,1}} & B_{d_{2,2}} & B_{d_{2,3}} \\ 0 & 0 & 0 \end{bmatrix}$$

$$\begin{bmatrix} \dot{Q}_{HVAC}(k) \\ T_{oa}(k) \\ \hat{Q}_{Other,deterministic}(k) \end{bmatrix} + \begin{bmatrix} K_{1,1} \\ K_{1,2} \\ K_{1,3} \end{bmatrix} (T_{ia}(k) - \widehat{T_{ia}}(k))$$

$$\widehat{T_{ia}}(k) = [1\ 0\ 0] \begin{bmatrix} \widehat{T_{ia}}(k) \\ \widehat{T_m}(k) \\ \widehat{d_e}(k) \end{bmatrix} + [0\ 0\ 0] \begin{bmatrix} \dot{Q}_{HVAC}(k) \\ T_{oa}(k) \\ \hat{Q}_{Other,deterministic}(k) \end{bmatrix}$$

The above converted system can be given compactly as:

$$\begin{bmatrix} \hat{x}(k+1) \\ \widehat{d_e}(k+1) \end{bmatrix} = \begin{bmatrix} A_d & B_{dis} \\ 0 & A_{dis} \end{bmatrix} \begin{bmatrix} \hat{x}(k) \\ \hat{d}_e(k) \end{bmatrix} + \begin{bmatrix} B_d \\ 0 \end{bmatrix} u(k) + K(y(k) - \hat{y}(k))$$

$$\hat{y}(k \mid k-1) = [C\ C_{dis}] \begin{bmatrix} \hat{x}(k) \\ \hat{d}_e(k) \end{bmatrix} + Du(k)$$

where $\hat{x}(k+1) = \begin{bmatrix} \widehat{T_{ia}}(k) \\ \widehat{T_m}(k) \end{bmatrix}$, $\hat{y}(k \mid k-1) = \widehat{T_{ia}}(k)$, $$\text{and } u(k) = \begin{bmatrix} \dot{Q}_{HVAC}(k) \\ T_{oa}(k) \\ \hat{Q}_{Other,deterministic}(k) \end{bmatrix}.$$

Due to the fact that the $\hat{Q}_{Other,deterministic}(k)$ values may not correctly capture the heat disturbances if solar irradiance and occupant's dynamics change significantly, the Kalman correction can contain a portion of the heat disturbances in the $K_{1,1}(T_{ia}(k) - \widehat{T_{ia}}(k))$ terms. In this case, error from model predictions may considerably large (i.e., the error is it is not only a result of sensor noise). If the sensor noise element of the prediction error is ignored, the remaining error can be attributed to both the heat disturbance mismatch and plant model-mismatch. In some embodiments, the plant model mismatch has a minor effect if compared to the heat disturbance effect.

Based on said assumptions, the heat disturbance can be back calculated as:

$$Q_{other}(k) = \frac{\theta_5 \left( B_{dis_{1,1}} \hat{d}_e(k) + K_{1,1}(T_{ia}(k) - \widehat{T_{ia}}(k)) \right)}{B_{d_{1,3}}} + \theta_5 \hat{Q}_{Other,deterministic}(k)$$

In this case, a resulting signal may be noisy as it is lumped with sensor noise. As such, the resulting signal can be processed through a low pass filter to smooth the output, thereby reducing high frequency sensor noise. The computed $Q_{other}(k)$ can represent the online heat disturbance calculations from historic data. If the heat disturbance does not change, extra terms of the above equation may not have any effect (e.g., the Kalman corrections may be zero mean which indicates that $K_{1,1}(T_{ia}(k) - \widehat{T_{ia}}(k))$ will be zero mean). If the previous model perfectly models $Q_{other}(k)$, then $$\frac{\theta_5 B_{dis_{1,1}}}{B_{d_{1,3}}} = 1$$

should hold true.

If the plant-model mismatch is significant (i.e., identified parameters result in incorrect values for $C_{ia}$, $C_m$, $R_{oi}$, and/or $R_{mi}$), the resulting computed online $Q_{other}(k)$ can be processed through an additional filter to remove plant-model mismatch from $Q_{other}(k)$. An example of a method for filtering the plant-model mismatch can be to compute $Q_{other}(k)$ for a certain period of time and compute a standard deviation. Any values of $Q_{other}(k)$ that exceed twice the computed standard deviation can be removed. Further, for each point in time k where $Q_{other}(k)$ exceeds twice the standard deviation, $Q_{other}(k)$ values that span a period that is equal to twice the largest time constant of the observer error system dynamics can be removed. Said observer error system dynamics can be described by the following:

$$\begin{bmatrix} A_d & B_{dis} \\ 0 & A_{dis} \end{bmatrix} - K[C_c \ 0] = \begin{bmatrix} A_{d_{1,1}} & A_{d_{1,2}} & B_{dis_{1,1}} \\ A_{d_{2,1}} & A_{d_{2,2}} & A_{dis_{2,1}} \\ 0 & 0 & A_{dis} \end{bmatrix} - \begin{bmatrix} K_{1,1} \\ K_{1,2} \\ K_{1,3} \end{bmatrix} [1 \ 0 \ 0]$$

Deleting said $Q_{other}(k)$ values may result in a $Q_{other}(k)$ profile that is missing some data points. Therefore, interpolation can be performed to fill in the missing $Q_{other}(k)$ data points. The resulting $Q_{other}(k)$ profile can represent the online heat disturbance calculations from historic data. In some embodiments, step 1102 is performed by light online SI controller 816 and/or intensive online SI controller 818.

Process 1100 is shown to include training a deterministic heat disturbance prediction model using the calculated heat disturbance values and weather data (step 1104). In step 1104, the $Q_{other}(k)$ values calculated in step 1102 can be used as well as collected weather data (e.g., relative humidity and outdoor air temperature). Specifically, the deterministic heat disturbance prediction model can be trained based on the calculated $Q_{other}(k)$ values and the weather data. In some embodiments, the deterministic $\dot{Q}_{other}$ prediction model is obtained using a linear regression and data fitting process. In some embodiments, step 1104 is performed by light online SI controller 816 and/or intensive online SI controller 818. In some embodiments, the deterministic heat disturbance model is obtained using a pattern recognition and linear regression strategy as described in U.S. patent application Ser. No. 14/717,593 filed May 20, 2015, the entirety of which is incorporated by reference herein.

Process 1100 is shown to include generating deterministic heat disturbance predictions based on the deterministic heat disturbance prediction model (step 1106). In step 1106, the new deterministic heat disturbance prediction model trained in step 1104 can be used to generate the deterministic portion of heat disturbance values (i.e., a new $\hat{Q}_{other,deterministic}$) that corresponds to data collected online. In some embodiments, step 1106 is performed by light online SI controller 816 and/or intensive online SI controller 818.

Process 1100 is shown to include determining whether intensive online SI or light online SI is being performed (step 1108). Step 1108 can be performed to ensure that correct parameters are identified based on a type of online SI being performed. If light online SI is being performed (step 1108, "LIGHT"), process 1100 can proceed to step 1110. If intensive online SI is being performed (step 1108, "INTENSIVE"), process 1100 can proceed to step 1112. In some embodiments, step 1108 is performed by light online SI controller 816 and/or intensive online SI controller 818.

Process 1100 is shown to include identifying a scale factor of the deterministic heat disturbance of a system model (step 1110). As step 1110 is specific to light online SI, other parameters (e.g., building thermal dynamics parameters) of the system model can be kept constant as light online SI does not include re-identification of said parameters. Step 1110 may not involve the stochastic heat disturbance model. In other words, the system model considered in step 1110 may be the same as the reduced order system that is modeled using simulation PEM in batch system identification as described with reference to FIG. 10. Specifically, step 1110 can consider the following system:

$$\begin{bmatrix} \dot{T}_{ia} \\ \dot{T}_m \end{bmatrix} = \begin{bmatrix} \frac{1}{C_{ia}}\left(-\frac{1}{R_{mi}} - \frac{1}{R_{oi}}\right) & \frac{1}{C_{ia}R_{mi}} \\ \frac{1}{C_m R_{mi}} & -\frac{1}{C_m R_{mi}} \end{bmatrix} \begin{bmatrix} T_{ia} \\ T_m \end{bmatrix} + \begin{bmatrix} \frac{1}{C_{ia}} & \frac{1}{C_{ia}R_{oi}} & Q_{other,scale}\frac{1}{C_{ia}} \\ 0 & 0 & 0 \end{bmatrix} \begin{bmatrix} \dot{Q}_{HVAC} \\ T_{oa} \\ \hat{Q}_{Other,deterministic} \end{bmatrix}$$

$$[T_{ia}] = [1 \ 0] \begin{bmatrix} T_{ia} \\ T_m \end{bmatrix} + [0 \ 0 \ 0] \begin{bmatrix} \dot{Q}_{HVAC} \\ T_{oa} \\ \hat{Q}_{Other,deterministic} \end{bmatrix}$$

and can be given by the following matrices:

$$A_c(\theta) = \begin{bmatrix} -(\theta_1 + \theta_2) & \theta_2 \\ \theta_3 & -\theta_3 \end{bmatrix}, B_c(\theta) = \begin{bmatrix} \theta_4 & \theta_1 & \theta_5\theta_4 \\ 0 & 0 & 0 \end{bmatrix}$$

$$C_c(\theta) = [1 \ 0], D_c(\theta) = [0 \ 0 \ 0]$$

where all the parameters $$\theta_1 = \frac{1}{C_{ia}R_{oi}}, \theta_2 = \frac{1}{C_{ia}R_{mi}}, \theta_3 = \frac{1}{C_mR_{mi}}, \text{ and } \theta_4 = \frac{1}{C_{ia}}$$

are known from the previous system identification and the only unknown parameter that is identified in step 1110 is $\theta_5 = Q_{other,scale}$. In some embodiments, step 1110 is performed by light online SI controller 816.

Process 1100 is shown to include identifying a system model and a scale factor of the deterministic heat disturbance (step 1112). Step 1112 can differ from step 1110 in that step 1112 can involve identification of both the scale factor and parameters of the system model whereas step 1110 may only involve identification of the scale factor. In this sense, step 1112 can involve identifying all the parameters $$\theta_1 = \frac{1}{C_{ia}R_{oi}}, \theta_2 = \frac{1}{C_{ia}R_{mi}}, \theta_3 = \frac{1}{C_mR_{mi}}, \theta_4 = \frac{1}{C_{ia}},$$

and $\theta_5 = Q_{other,scale}$ of the above system using simulation PEM. In some embodiments, step 1112 is performed by intensive online SI controller 818.

Process 1100 is shown to include augmenting the system model with a stochastic heat disturbance model, converting the augmented system into a discrete time model, and adding a Kalman gain (step 1114). Regardless of whether step 1110 or step 1112 is performed in process 1100, the system model can include identified parameters $$\theta_1 = \frac{1}{C_{ia}R_{oi}}, \theta_2 = \frac{1}{C_{ia}R_{mi}}, \theta_3 = \frac{1}{C_mR_{mi}}, \theta_4 = \frac{1}{C_{ia}},$$

and $\theta_5 = Q_{other,scale}$. By augmenting the system model, converting the augmented system into the discrete time model, and adding the Kalman gain, the augmented discrete time system can be given by:

$$\begin{bmatrix} \widehat{T_{ta}}(k+1) \\ \widehat{T_m}(k+1) \\ \widehat{d_e}(k+1) \end{bmatrix} = \begin{bmatrix} A_{d_{1,1}} & A_{d_{1,2}} & B_{dis_{1,1}} \\ A_{d_{2,1}} & A_{d_{2,2}} & A_{dis_{2,1}} \\ 0 & 0 & A_{dis} \end{bmatrix} \begin{bmatrix} \widehat{T_{ta}}(k) \\ \widehat{T_m}(k) \\ \widehat{d_e}(k) \end{bmatrix} + \begin{bmatrix} B_{d_{1,1}} & B_{d_{1,2}} & B_{d_{1,3}} \\ B_{d_{2,1}} & B_{d_{2,2}} & B_{d_{2,3}} \\ 0 & 0 & 0 \end{bmatrix}$$

$$\begin{bmatrix} \dot{Q}_{HVAC}(k) \\ T_{oa}(k) \\ \hat{Q}_{Other,deterministic}(k) \end{bmatrix} + \begin{bmatrix} K_{1,1} \\ K_{1,2} \\ K_{1,3} \end{bmatrix} (T_{ia}(k) - \widehat{T_{ta}}(k))$$

$$\widehat{T_{ta}}(k) = [1\ 0\ 0] \begin{bmatrix} \widehat{T_{ta}}(k) \\ \widehat{T_m}(k) \\ \widehat{d_e}(k) \end{bmatrix} + [0\ 0\ 0] \begin{bmatrix} \dot{Q}_{HVAC}(k) \\ T_{oa}(k) \\ \hat{Q}_{Other,deterministic}(k) \end{bmatrix}$$

In some embodiments, step 1114 is performed by light online SI controller 816 and/or intensive online SI controller 818.

Process 1100 is shown to include identifying the stochastic heat disturbance model and the Kalman gain using multi-step PEM (step 1116). By identifying the stochastic heat disturbance model and the Kalman gain, the augmented discrete time system (i.e., the new predictive model) can be fully identified and can be used in MPC. In particular, step 1116 can include identifying the Kalman gain parameters ($K_{1,1}$, $K_{1,2}$, and $K_{1,3}$) and the stochastic heat disturbance model $A_{d_e}$ (which in discrete time can correspond to $A_{dis}$). In some embodiments, step 1116 is performed by light online SI controller 816 and/or intensive online SI controller 818.

Figure 12:
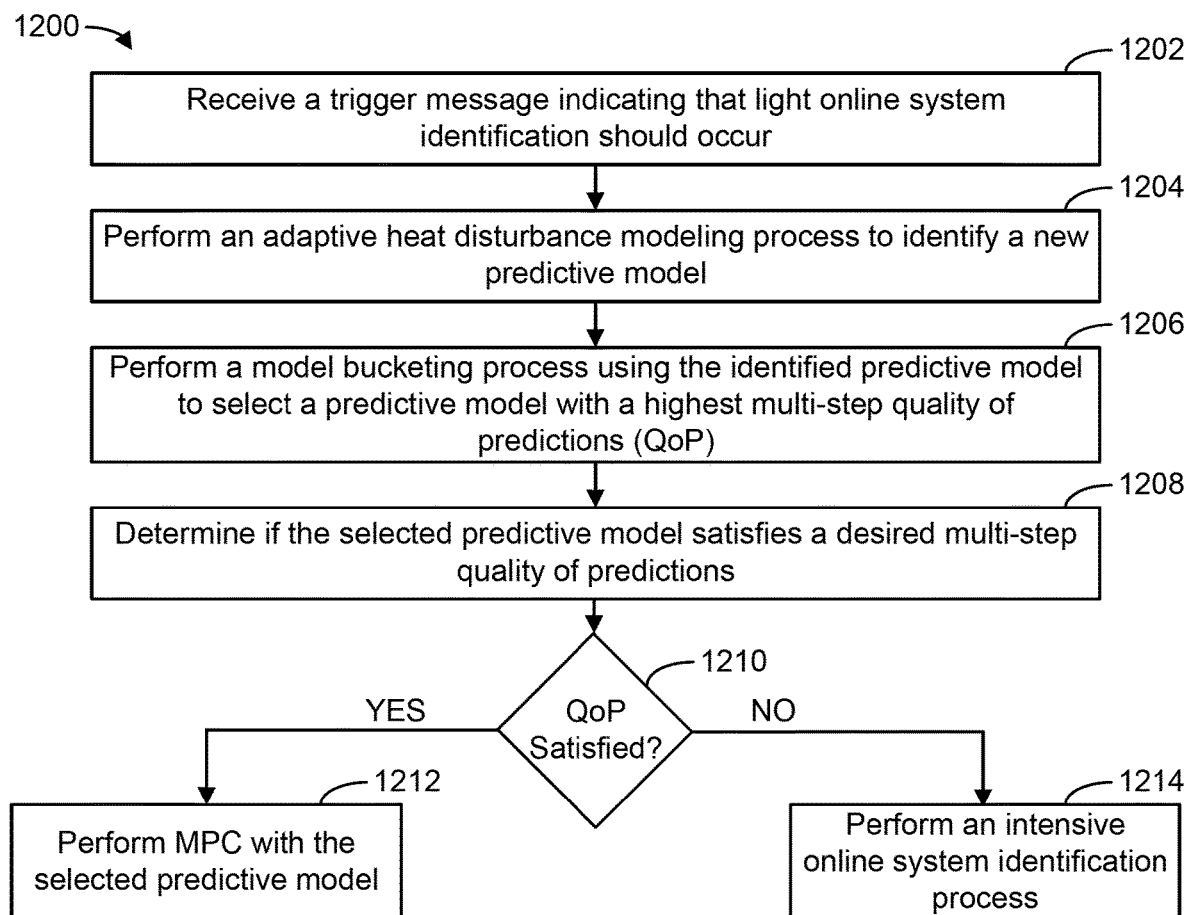
FIG. 12 is a flow diagram of a process for performing light online system identification, according to some embodiments.

Referring now to FIG. 12, a process 1200 for performing light online SI is shown, according to some embodiments. Performing process 1200 can include re-identification of parameters of a predictive model such that changes in heat disturbances are captured. Process 1200 may keep parameters related to physical properties constant from a previous predictive model as physical properties of a building are assumed not to change significantly from the previous predictive model. In other words, the previous predictive model can be used as a basis for the physical properties of the buildings and parameters relating to heat disturbances can be re-identified. In some embodiments, process 1200 is performed by light online SI controller 816 and/or other components of adaptive online SI controller 800 as described above with reference to FIG. 8.

Process 1200 is shown to include receiving a trigger message indicating that light online system identification should occur (step 1202). The trigger message can be received as a result of various determinations. For example, the trigger message may be received based on a determination that one or more default models exist in a default models bucket and that a moving horizon error exceeding some threshold value. As another example, the trigger message may be received based on a determination that a predictive model selected in a batch SI process (e.g., process 1000 described above with reference to FIG. 10) does not meet a desired multi-step quality of predictions. In some embodiments, step 1202 is performed by light online SI controller 816.

Process 1200 is shown to include performing an adaptive heat disturbance modeling process to identify a new predictive model (step 1204). In some embodiments, step 1204 includes performing process 1100 as described above with reference to FIG. 11. Of course, as process 1200 involves performing light online SI, step 1110 of process 1100 should be performed as opposed to step 1112. In this way, only a new scale factor of deterministic heat disturbance is identified as compared to all parameters of a system model. Based on performing process 1100, the new predictive model can be identified. In some embodiments, step 1204 is performed by light online SI controller 816.

Process 1200 is shown to include performing a model bucketing process using the identified predictive model to select a predictive model with a highest multi-step quality of predictions (step 1206). In some embodiments, step 1206 includes performing process 900 as described above with reference to FIG. 9. As a result of performing process 900, the predictive model with the highest multi-step quality of predictions of all available models can be determined and selected. In some embodiments, step 1206 is performed by light online SI controller 816, model bucket controller 814, and/or database 820.

Process 1200 is shown to include determining if the selected predictive model satisfies a desired multi-step quality of predictions (step 1208). Even though the predictive model selected based on the model bucketing process performed in step 1206 has a highest multi-step quality of predictions of all available predictive models, the selected predictive model may not satisfy the desired multi-step quality of predictions. The desired multi-step quality of predictions can be set by a user, a controller, an external system, etc. In some embodiments, step 1208 is performed by light online SI controller 816.

Process 1200 is shown to include a determination of whether the desired multi-step quality of predictions is satisfied (step 1210). If the desired multi-step quality of predictions is satisfied (step 1210, "YES"), process 1200 can continue to step 1212. If the desired multi-step quality of predictions is not satisfied (step 1210, "NO"), process 1200 can continue to step 1214. In some embodiments, step 1210 is performed by light online SI controller 816.

Process 1200 is shown to include performing MPC with the selected predictive model (step 1212). If step 1212 is performed, the selected predictive model may satisfy the desired multi-step quality of predictions. As such, the selected predictive model can be used to perform MPC to generate control decisions for HVAC and/or other building equipment. Specifically, step 1212 can include updating MPC model coefficients. In some embodiments, step 1212 is performed by light online SI controller 816.

Process 1200 is shown to include performing an intensive online system identification process (step 1214). If step 1214 is performed, the selected predictive model may not satisfy the desired multi-step quality of predictions. If the selected predictive model does not satisfy the desired multi-step quality of predictions, physical properties of the system may have changed rather than only heat disturbances. As such, intensive online SI can be performed to generate a new predictive model accounting for changes in physical properties of the system. In some embodiments, step 1214 includes performing process 1300 as described below with reference to FIG. 13. In some embodiments, step 1214 is performed by light online SI controller 816 and/or intensive online SI controller 818.

Figure 13:
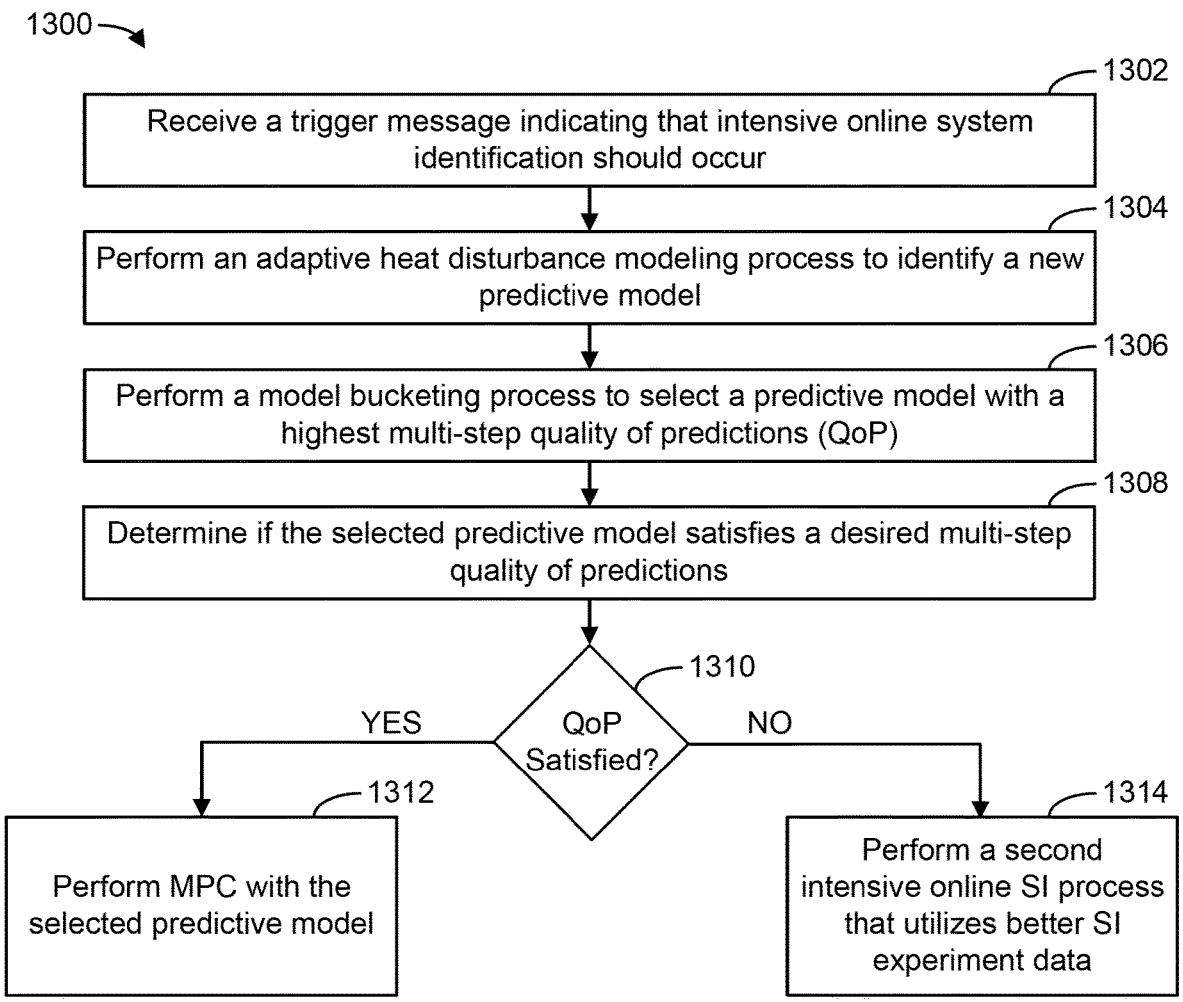
FIG. 13 is a flow diagram of a process for performing intensive online system identification, according to some embodiments.

Referring now to FIG. 13, a process 1300 for performing intensive online SI is shown, according to some embodiments. In some embodiments, some steps of process 1300 are similar to and/or the same as certain steps of process 1200 as described above with reference to FIG. 12. In some embodiments, process 1300 illustrates a first intensive online SI process that can be performed that does not involve performing a new SI experiment and/or a data selection process. Process 1300 can be utilized in an attempt to generate a new predictive model without performing additional computationally expensive processes. Process 1400 as described below with reference to FIG. 14 can illustrate a second intensive online SI process that can be performed if process 1300 does not generate an adequate predictive model. In some embodiments, process 1400 is immediately performed to avoid a possibility of performing intensive online SI twice. If process 1400 is performed immediately, process 1300 may be skipped partially and/or entirely. In some embodiments, process 1300 is performed by intensive online SI controller 818 and/or other components of adaptive online SI controller 800 as described above with reference to FIG. 8.

Process 1300 is shown to include receiving a trigger message indicating that intensive online SI should occur (step 1302). The trigger message can be generated based on various determinations. For example, the trigger message may be generated if a light online SI process (e.g., process 1200 as described with reference to FIG. 12) fails to generate a predictive model that satisfies a desired multi-step quality of predictions. As another example, if intensive online SI is performed periodically (e.g., monthly, seasonally, etc.), the trigger message may be generated based on a determination that a new period has begun and/or that a previous period has ended. In some embodiments, step 1302 is performed by intensive online SI controller 818.

Process 1300 is shown to include performing an adaptive heat disturbance modeling process to identify a new predictive model (step 1304). In some embodiments, step 1304 includes performing process 1100 as described above with reference to FIG. 11. Of course, as process 1300 relates to intensive online SI, step 1112 of process 1100 can be performed as opposed to step 1110. By performing step 1112 of process 1100, parameters of a system model and a scale factor of deterministic heat disturbance can be identified. In particular, the parameters $$\theta_1 = \frac{1}{C_{ia}R_{oi}}, \theta_2 = \frac{1}{C_{ia}R_{mi}}, \theta_3 = \frac{1}{C_m R_{mi}}, \theta_4 = \frac{1}{C_{ia}}, \text{ and } \theta_5 = Q_{other,scale}$$

can all be identified. By performing process 1100, the new predictive model can be identified. In some embodiments, step 1304 is performed by intensive online SI controller 818.

Process 1300 is shown to include performing a model bucketing process to select a predictive model with a highest multi-step quality of predictions (step 1306). In some embodiments, step 1306 includes performing process 900 as described above with reference to FIG. 9. By performing process 900, the new predictive model can be (at least temporarily) stored in a default models bucket and the predictive model with the highest multi-step quality of predictions of all available models can be selected. In some embodiments, step 1306 is performed by intensive online SI controller 818, model bucket controller 814, and/or database 820.

Process 1300 is shown to include determining if the selected predictive model satisfies a desired multi-step quality of predictions (step 1308). In some embodiments, step 1308 is similar to and/or the same as step 1208 as described with reference to FIG. 12. Even though the predictive model selected based on the model bucketing process performed in step 1306 has a highest multi-step quality of predictions of available predictive models, the selected predictive model may not satisfy the desired multi-step quality of predictions. The desired multi-step quality of predictions can be set by a user, a controller, an external system, etc. In some embodiments, step 1308 is performed by intensive online SI controller 818.

Process 1300 is shown to include a determination of whether the desired multi-step quality of predictions is satisfied (step 1310). In some embodiments, step 1310 is similar to and/or the same as step 1210 of process 1200. If the desired multi-step quality of predictions is satisfied (step 1310, "YES"), process 1300 can continue to step 1312. If the desired multi-step quality of predictions is not satisfied (step 1310, "NO"), process 1300 can continue to step 1314. In some embodiments, step 1310 is performed by intensive online SI controller 818.

Process 1300 is shown to include performing MPC with the selected predictive model (step 1312). If step 1312 is performed, the selected predictive model may satisfy the desired multi-step quality of predictions. As such, the selected predictive model can be used to perform MPC to generate control decisions for HVAC equipment and/or other building equipment. Specifically, step 1312 can include updating MPC model coefficients based on the selected predictive model. In some embodiments, step 1312 is performed by intensive online SI controller 818 and/or equipment controller 824.

Process 1300 is shown to include performing a second intensive online SI process that utilizes better SI experiment data (step 1314). In some embodiments, step 1314 includes performing process 1400 as described below with reference to FIG. 14. If the existing system data utilized in process 1300 does not generate a predictive model that satisfies the desired multi-step quality of predictions, new/specific system data should be utilized. Utilizing better SI experiment data can increase a probability that changes in physical properties of the system are properly captured in an identified model. In some embodiments, step 1314 is performed by intensive online SI controller 818.

Figure 14:
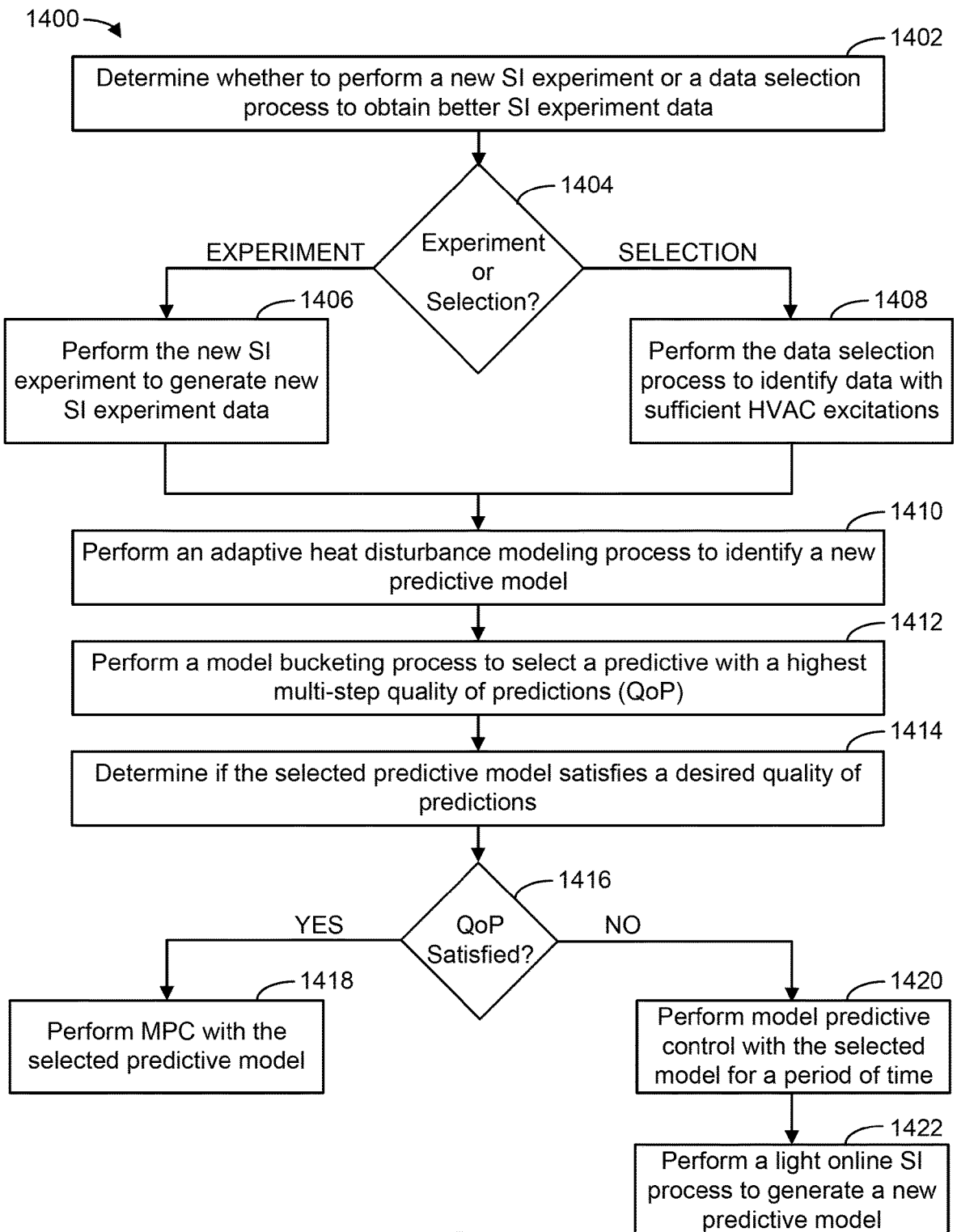
FIG. 14 is a flow diagram of a process for performing intensive online SI with better SI experiment data, according to some embodiments.

Referring now to FIG. 14, a process 1400 for performing intensive online SI with better SI experiment data is shown, according to some embodiments. In some embodiments, certain steps of process 1400 are similar to and/or the same as steps of process 1300 as described with reference to FIG. 13. In some embodiments, process 1400 is performed as a result of process 1300 not identifying a predictive model that meets a desired multi-step quality of predictions. In some embodiments, process 1400 is performed as a result of a light online SI process (e.g., process 1200 as described above with reference to FIG. 12) not identifying a predictive model that meets a desired multi-step quality of predictions. In some embodiments, process 1400 is triggered by some other determination or event occurring (e.g., a time-based determination). In some embodiments, steps of process 1400 are performed by intensive online SI controller 818 and/or other components of adaptive online SI controller 800.

Process 1400 is shown to include determining whether to perform a new SI experiment or a data selection process to obtain better SI experiment data (step 1402). The new SI experiment and the data selection process have different benefits and may be useful in different cases. For example, the SI experiment can ensure gather entirely new SI experiment data that may have sufficient HVAC excitations to use in generation of a predictive model. However, the data selection process may be preferred as it may be less computationally expensive that the new SI experiment and may take less time overall. In some embodiments, both the new SI experiment and the data selection process are performed. In some embodiments, only one of the new SI experiment or the data selection process are ever performed. If only one is ever performed, steps 1402 and 1404 are not performed and process 1400 can instead begin with performing either step 1406 or step 1408 depending on which step is always performed. In some embodiments, step 1402 is performed by intensive online SI controller 818.

Process 1400 is shown to include a determination of whether the new SI experiment or the data selection process is to be performed (step 1404). If the new SI experiment is to be performed (step 1404, "EXPERIMENT"), process 1400 can proceed to step 1406. If the data selection process is to be performed (step 1404, "SELECTION"), process 1400 can proceed to step 1408. In some embodiments, both the new SI experiment and the data selection are to be performed in which case process 1400 include performing both of steps 1406 and 1408. If both steps 1406 and 1408 are performed, it may be beneficial to ensure step 1406 occurs before step 1408 so that step 1408 can include identifying excited data of the new SI experiment data gathered in step 1406. In some embodiments, step 1404 is performed by intensive online SI controller 818.

Process 1400 is shown to include performing the new SI experiment to generate new SI experiment data (step 1406). To perform the new SI experiment, step 1406 can include executing a new PRBS signal on HVAC equipment. In this way, new SI experiment data can be gathered over a time period. By executing the new PRBS signal, new SI experiment data that may include a sufficient amount of HVAC excitations to identify a predictive model that satisfies a desired multi-step quality of predictions can be generated. In some embodiments, step 1406 is performed by intensive online SI controller 818 and/or equipment controller 824.

Process 1400 is shown to include performing the data selection process to identify data with sufficient HVAC excitations (step 1408). In some embodiments, the data selection process performed in step 1408 takes less time to perform as compared to the new SI experiment performed in step 1406. In some embodiments, step 1408 includes performing process 1500 as described below with reference to FIG. 15. As such, step 1408 can identify data within available system data that includes excited data. In some embodiments, step 1408 is performed by intensive online SI controller 818.

Process 1400 is shown to include performing an adaptive heat disturbance modeling process to identify a new predictive model (step 1410). In some embodiments, step 1410 is similar to and/or the same as step 1304 of process 1300. As such, step 1410 can include performing process 1100 as described with reference to FIG. 11. However, as a result of performing steps 1406 and/or 1408, process 1100 can utilize the newly generated SI experiment data of step 1406 and/or the excited data identified in step 1408. In particular, a deterministic heat disturbance profile can be generated in process 1100 that is associated with the data. As a result of performing process 1100, the new predictive model can be identified that is associated with the new SI experiment data and/or the identified excited data. In some embodiments, step 1410 is performed by intensive online SI controller 818.

Process 1400 is shown to include performing a model bucketing process to select a predictive model with a highest multi-step quality of predictions (step 1412). In some embodiments, step 1412 is similar to and/or the same as step 1306 of process 1300. In some embodiments, step 1412 includes performing process 900 as described with reference to FIG. 9. By performing process 900, the new predictive model can be at least temporarily stored in a default models bucket and the predictive model with the highest multi-step quality of predictions of all available models can be selected. In some embodiments, step 1306 is performed by intensive online SI controller 818, model bucket controller 814, and/or database 820.

Process 1400 is shown to include determining if the selected predictive model satisfies a desired quality of predictions (step 1414). In some embodiments, step 1414 is similar to and/or the same as step 1308 of process 1300. Even though the predictive model selected based on the model bucketing process performed in step 1412 has a highest multi-step quality of predictions of available predictive models, the selected predictive model may not satisfy the desired multi-step quality of predictions. The desired multi-step quality of predictions can be set by a user, a controller, an external system, etc. In some embodiments, step 1414 is performed by intensive online SI controller 818.

Process 1400 is shown to include a determination of whether the desired multi-step quality of predictions is satisfied (step 1416). In some embodiments, step 1416 is similar to and/or the same as step 1310 of process 1300. If the desired multi-step quality of predictions is satisfied (step 1416, "YES"), process 1400 can continue to step 1418. If the desired multi-step quality of predictions is not satisfied (step 1416, "NO"), process 1400 can continue to step 1420. In some embodiments, step 1416 is performed by intensive online SI controller 818.

Process 1400 is shown to include performing MPC with the selected predictive model (step 1418). In some embodiments, step 1418 is similar to and/or the same as step 1312 of process 1300. If step 1418 is performed, the selected predictive model may satisfy the desired multi-step quality of predictions. As such, the selected predictive model can be used to perform MPC to generate control decisions for HVAC and/or other building equipment. Specifically, step 1418 can include updating MPC model coefficients. In some embodiments, step 1418 is performed by intensive online SI controller 818.

Process 1400 is shown to include performing model predictive control with the selected model for a period of time (step 1420). At this point, even if the selected predictive model does not satisfy the desired multi-step quality of predictions, the selected predictive model can nonetheless be used in MPC for the period of time before re-executing the online identification process starting with the light online SI followed by the intensive online SI. Performing MPC for the period of time can ensure that online SI processes are not always running in the case that no predictive models are generated that satisfy the desired multi-step quality of predictions. In this way, step 1420 can act as a failsafe to ensure that online SI processes cannot run indefinitely without MPC ever being performed. The period of time can be a predefined amount of time and can be defined by a user, a controller, the system, etc. In some embodiments, step 1420 is performed by intensive online SI controller 818 and/or equipment controller 824.

Process 1400 is shown to include performing a light online SI process to generate a new predictive model (step 1422). After performing MPC for the period of time in step 1420, a new online SI process can be performed such that the new predictive model can be generated. In some embodiments, step 1422 includes performing process 1200 as described with reference to FIG. 12. In some embodiments, an intensive online SI process is performed in step 1422 instead of the light online SI process. If the intensive online SI process is performed in step 1422, step 1422 may include performing process 1300 as described with reference to FIG. 13 and/or repeating process 1400. In some embodiments, step 1422 is performed by intensive online SI controller 818 and/or light online SI controller 816.

Figure 15:
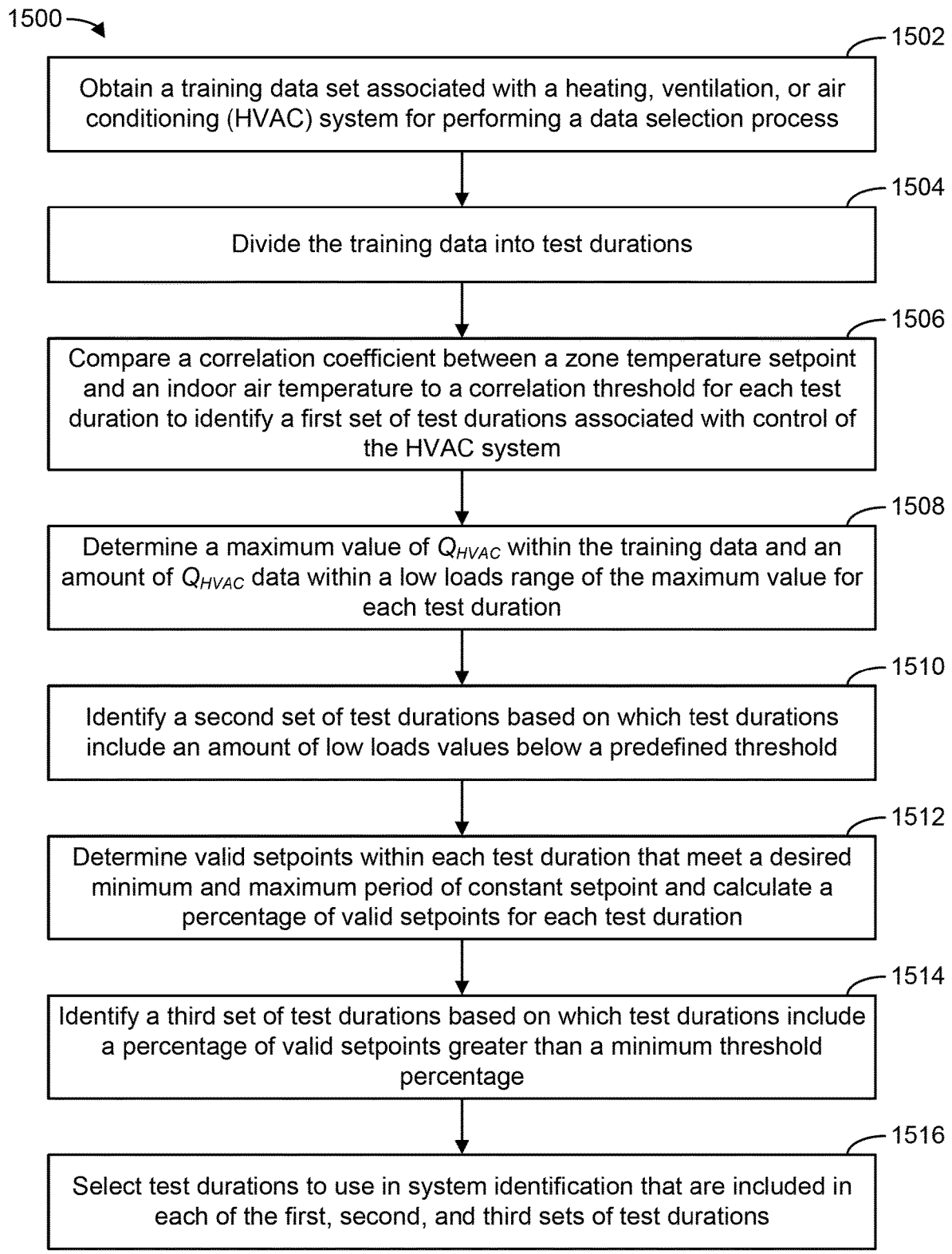
FIG. 15 is a flow diagram of a process for selecting data to use in system identification (SI), according to some embodiments.

Referring now to FIG. 15, a process 1500 for selecting data to use in system identification is shown, according to some embodiments. In some embodiments, process 1500 is performed during the intensive online SI process described above with reference to FIG. 14. The goal of process 1500 may be, given multiple days' data, to detect and select sections of the data that contains sufficient amounts of HVAC excitations necessary for system identification. More particularly, process 1500 may include selecting data that satisfies various confidence thresholds related to including data useful for identifying predictive models. In this case, a confidence threshold can describe a probability that data includes information associated with some desired trait. For example and as described in detail below, process 1500 may include selecting data that satisfies confidence thresholds related to probabilities that the data describes actual operation of HVAC equipment, is associated with higher loads, includes a proper amount of HVAC excitations, etc. In some embodiments, process 1500 is performed by intensive online SI controller 818.

Process 1500 is shown to include obtaining a training data set associated with an HVAC system for performing a data selection process (step 1502). The training data set can be obtained from a variety of sources such as, for example, a user, a database (e.g., a cloud database), a manufacturer of HVAC devices, sensors, etc. The training data obtained in step 1502 can be used in performing SI to generate a predictive model. However, as the training data may include data that is not useful in performing SI and thereby may lower accuracy of the predictive model, the training data can undergo the data selection process to determine/select what data is relevant for SI. In some embodiments, step 1502 is performed by intensive online SI controller 818.

Process 1500 is shown to include dividing the training data into test durations (step 1504). The test durations may be required to be of equal length and of at least a minimum duration (e.g., half a day, a full day, etc.). In other words, as the training data may be of a time-series nature, the test durations can be obtained by dividing the training data into periods of equal length. The minimum duration can define a minimum amount of data that SI needs to properly identify a model. Accordingly, the test durations should be at least of the minimum duration to ensure that SI can identify suitable models. In some embodiments, step 1504 is performed by intensive online SI controller 818.

Process 1500 is shown to include comparing a correlation coefficient between a zone temperature setpoint and an indoor air temperature to a correlation threshold for each test duration to identify a first set of test durations associated with control of the HVAC system (step 1506). In some embodiments, the correlation coefficient for a particular test duration can be calculated based on the following equation:

$$\rho(T_{sp}, T_{ia}) = \frac{cov(T_{sp}, T_{ia})}{\sigma_{T_{sp}}\sigma_{T_{ia}}}$$

where $\rho(T_{sp}, T_{ia})$ is the correlation coefficient, $cov(T_{sp}, T_{ia})$ is a covariance of setpoint $T_{sp}$ and indoor air temperature $T_{ia}$, and $\sigma_{T_{sp}}$ and $\sigma_{T_{ia}}$ are the standard deviation of $T_{sp}$ and $T_{ia}$, respectively. In effect, the correlation coefficient for a test duration can indicate a probability that the test duration is associated with operation of the HVAC system as similar values of $T_{sp}$ and $T_{ia}$ are more likely to indicate that the HVAC system is being operated as compared to dissimilar values of $T_{sp}$ and $T_{ia}$. The correlation threshold can be determined based a minimum desired confidence of how likely a test duration is to include data describing actual operation of the HVAC system. For example, the correlation threshold may be set at 0.7 (i.e., 70%) thereby indicating that, for a particular test duration to be included in the first set of test durations, there must be at least a 70% confidence that the particular test duration includes data associated with actual operation of the HVAC system to control the indoor air temperature. To this end, the first set of test durations can include test durations likely to be associated with operation of the HVAC system. In some embodiments, step 1506 is performed by intensive online SI controller 818.

Process 1500 is shown to include determining a maximum value of $Q_{HVAC}$ within the training data and an amount of $Q_{HVAC}$ data within a low loads range of the maximum value for each test duration (step 1508). Step 1508 can ensure that selected data includes data that is rich in content and associated with higher loads on the HVAC system. The low loads range can be defined as a percent value (e.g., 10%) of the maximum value of $Q_{HVAC}$ that is considered to be associated with a low load. To determine the amount of $Q_{HVAC}$ data within the low loads range for a particular test duration, step 1508 can include counting a number of $Q_{HVAC}$ data points within the low loads range. In other words, step 1508 can include determining a percentage of the particular test duration that includes $Q_{HVAC}$ data points within the low loads range. In some embodiments, step 1508 is performed by intensive online SI controller 818.

Process 1500 is shown to include identifying a second set of test durations based on which test durations include an amount of low loads values below a predefined threshold (step 1510). For a particular test duration, step 1510 may include comparing a percentage of the particular test duration including low loads values to a predefined threshold percentage. For example, if the predefined threshold percentage is 50%, the particular test duration may be included in the second set of test durations if a duration of the particular test duration including low loads values is below 50% of a length of the particular test duration. By performing step 1510, the second set of test durations can include test durations that are associated with generally higher loads and thereby may provide better data for system identification. In some embodiments, step 1510 is performed by intensive online SI controller 818.

Process 1500 is shown to include determining valid setpoints within each test duration that meet a desired minimum and maximum period of constant setpoint and calculating a percentage of valid setpoints for each test duration (step 1512). In step 1512, a valid setpoint is effectively identified as a setpoint that is maintained for a period of time that is not too short and not too long. Very short periods of time and very long periods of time between setpoint changes may be associated with data that is too irregular, inaccurate, low in rich content, and/or otherwise not useful in SI. In step 1512, a constant setpoint can be defined as a range of setpoints that are sufficiently close to be considered constant. For example, for a setpoint of 25° C., the range of setpoints considered constant may be between 24.5° C. to 25.5° C. (i.e., 25° C.±0.5° C.). Based on the determined valid setpoints for each test duration, a percentage of each test duration including valid setpoints can be calculated. In this case, higher percentages can indicate test durations with more valuable data for SI. In some embodiments, step 1512 is performed by intensive online SI controller 818.

Process 1500 is shown to include identifying a third set of test durations based on which test durations include a percentage of valid setpoints greater than a minimum threshold percentage (step 1514). Using the percentages calculated in step 1512, the third set of test durations can be constructed to include only those test durations that include a sufficient amount of HVAC excitations. The minimum threshold percentage may be any percentage between 0% and 100% (e.g., 25%). In some embodiments, step 1514 is performed by intensive online SI controller 818.

Process 1500 is shown to include selecting test durations to use in system identification that are included in each of the first, second, and third sets of test durations (step 1516). In effect, step 1516 includes selecting test durations including data that satisfies the three preferred criteria of being associated with HVAC system control, associated with generally higher loads, and associated with a sufficient amount of HVAC excitations. In some embodiments, different criteria than as given in process 1500 are defined for selecting what data to use in SI. If additional and/or different criteria are considered, process 1500 may include fewer, more, and/or different steps than as shown in FIG. 15. In any case, the final selection of test durations can include data that is overall rich in content and/or otherwise useful for identifying models through SI. In some embodiments, step 1516 is performed by intensive online SI controller 818.

Experimental Results

Referring now to FIG. 16, a graph 1600 illustrating an example of multi-step predictions for a prediction horizon looking four samples into the future is shown, according to some embodiments. These multi-step predictions can be used to compute the multi-step NRMSPE. Graph 1600 is shown to include a series 1602, a series 1604, and a series 1606. Series 1602 illustrates actual measurements of an environmental conditions (e.g., temperature) over time. Series 1604 illustrates multi-step predictions of the output performed for a prediction horizon H looking four samples into the future (i.e., H=4) starting at a time step k. Series 1604 illustrates multi-step predictions of the output performed for a prediction horizon H looking four samples into the future (i.e., H=4) starting at a time step k+1. A difference between series 1602 and series 1604 and/or a difference between series 1602 and series 1606 can be tracked to compute the multi-step NRMSPE as described in detail above with reference to FIG. 8 and according to the following equations:

$$NRMSPE_{i,1} = \frac{\|y_{i_p} - y_{i_m}\|_2}{\|y_{i_m} - \text{mean}(y_{i_m})\|_2}$$

$$NRMSPE_{i,j} = \frac{\|y_{i,j_p} - y_{i,j_m}\|_2}{\|y_{i,j_m} - \text{mean}(y_{i,j_m})\|_2}$$

$$\text{Multi-Step } NRMSPE \text{ for output } i = \sum_{j=1}^{H} w_j NRMSPE_{i,j}$$

$$N \text{ output Multi-Step } NRMSPE = \sum_{i=1}^{N} \sum_{j=1}^{H} v_i w_j NRMSPE_{i,j}$$

If multi-step NRMSPE exceeds some threshold value, system identification can be triggered to identify a new predictive model.

Referring generally to FIGS. 17-24B, results of performing adaptive online SI in an example experiment are shown, according to some embodiments. In particular, FIGS. 17-24B presents an application of adaptive online SI on data collected from a real building where an HVAC system supplies cooling to zones of the building. In the example experiment, data collection was conducted for 2 weeks in a building zone in order to train an initial deterministic heat disturbance prediction model (i.e. via batch heat disturbance modeling). Based on the data collection, batch system identification was performed by sending a PRBS zone temperature setpoint that varied the setpoint between 21° C. and 24° C. (i.e., 294.15 Kelvin and 297.15 Kelvin respectively). It should be appreciated that the example experiment described in FIGS. 17-24B is given purely for sake of example of an adaptive online SI process. The example experiment is not meant to be limiting on the present disclosure in any way.

Figure 17:
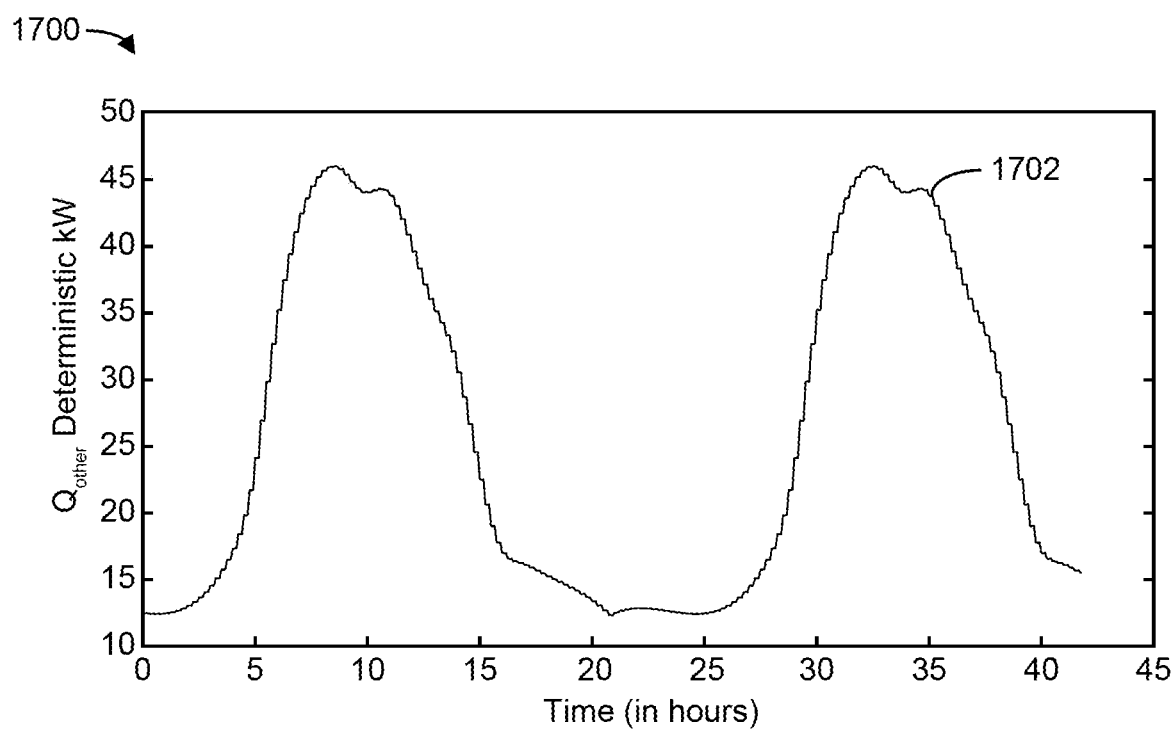
FIG. 17 is a graph illustrating values of a deterministic heat disturbance profile corresponding to system identification training data of an example experiment, according to some embodiments.

Referring now to FIG. 17, a graph 1700 illustrating values of a deterministic heat disturbance profile corresponding to system identification training data of an example experiment is shown, according to some embodiments. Graph 1700 is shown to include a series 1702 illustrating deterministic heat disturbance predictions associated with the deterministic heat disturbance profile. Based on series 1702 and the training data, a system model can be identified using simulation PEM. The system model can be augmented with a stochastic heat disturbance model, converted to discrete time, and a Kalman gain can be added. In the example experiment, the stochastic heat disturbance model and the Kalman gain were identified using multi-step PEM with a prediction horizon of 288 samples which can correspond to one day as a sampling rate was set to five minutes. Based on the identification, the following parameters can be identified:

$$\theta_1 = \frac{1}{C_{ia}R_{oi}} = 0.8633 \left[\frac{1}{\text{hours}}\right]$$

$$\theta_2 = \frac{1}{C_{ia}R_{mi}} = 1.983 \left[\frac{1}{\text{hours}}\right]$$

$$\theta_3 = \frac{1}{C_m R_{mi}} = 0.2 \left[\frac{1}{\text{hours}}\right]$$

$$\theta_4 = \frac{1}{C_{ia}} = 0.2173 \left[\frac{\text{Kelvin}}{\text{kiloWatts} * \text{hours}}\right]$$

$$\theta_5 = Q_{other,scale} = 0.778 \text{ [none]}$$

$$\theta_6 = A_{d_e} = 0.981 \text{ [none]}$$

$$K_{1,1} = 1.5887 \text{ [none]}$$

$$K_{1,2} = 0 \text{ [none]}$$

$$K_{1,3} = 0.201 \left[\frac{\text{kiloWatts}}{\text{Kelvin}}\right]$$

Figure 18A:
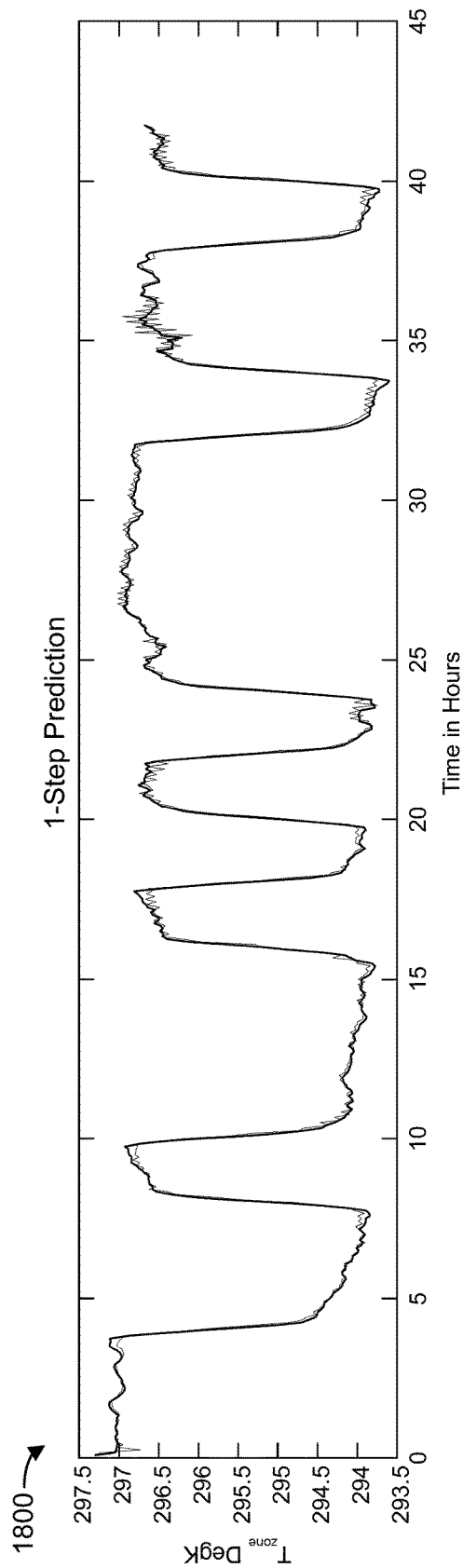
FIG. 18A is a graph illustrating one-step predictions of a predictive model identified in the example experiment of FIG. 17, according to some embodiments.
Figure 18B:
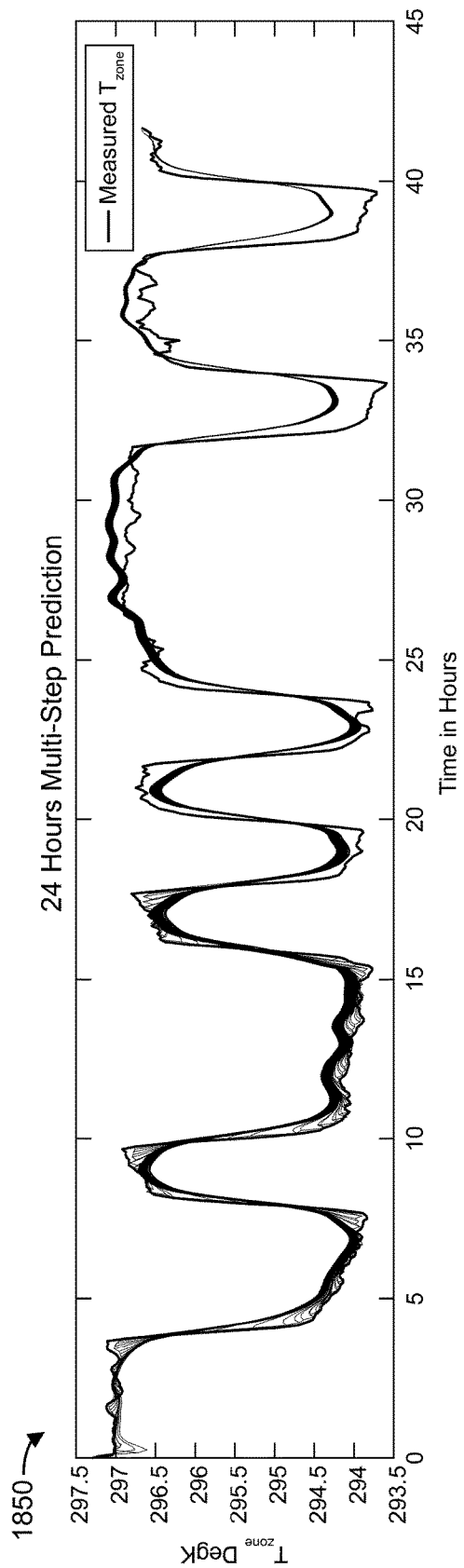
FIG. 18B is a graph illustrating multi-step predictions of the predictive model identified in the example experiment of FIG. 17, according to some embodiments.

Referring now to FIGS. 18A and 18B, a graph 1800 and a graph 1850 illustrating one-step predictions and multi-step predictions of the predictive model generated based on the parameters and heat disturbance predictions described with reference to FIG. 17, respectively, are shown, according to some embodiments. Graphs 1800 and 1850 can indicate that the predictive model has an acceptable quality of predictions for both one-step and multi-step predictions. In the example experiment, for a model to be suitable for MPC application, the minimum multi-step NRMSPE should be 30% for a one-day prediction horizon. The prediction model identified based on the heat disturbance predictions of FIG. 17 and the identified parameters was determined to have a one-step NRMSPE of 94.55% and a multi-step NRMSPE of 55.45% for a one-day prediction horizon (i.e., 288 samples). In computing the multi-step NRMSPE throughout this example, multi-step prediction errors were weighted with exponentially decaying weights in order to emphasize the weights of predictions that are nearest to actual measurements. In particular, graph 1800 can illustrate a comparison of zone temperature one-step predictions obtained from the model versus the true measured zone temperature. Graph 1850 can illustrate multi-step predictions with a one-day horizon as compared to the true measured zone temperature. As can be seen by graph 1850, the predictive model has a suitable quality of predictions for multi-step prediction and can be used for MPC application.

Figure 19A:
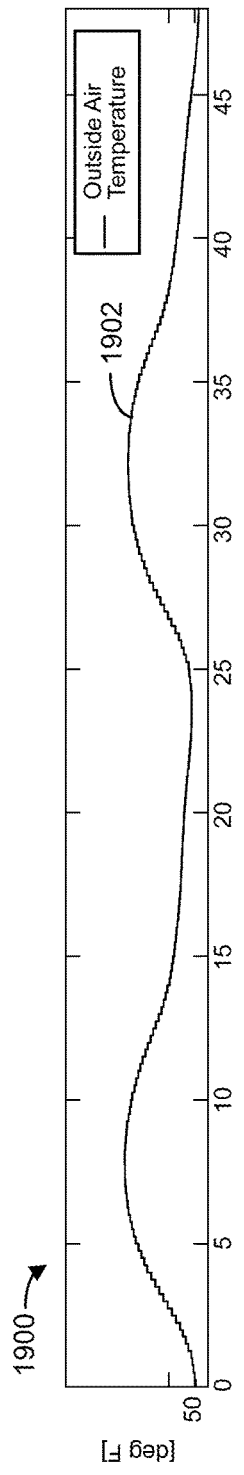
FIG. 19A is a graph illustrating outside air temperature measurements of the example experiment of FIG. 17 over time, according to some embodiments.
Figure 19B:
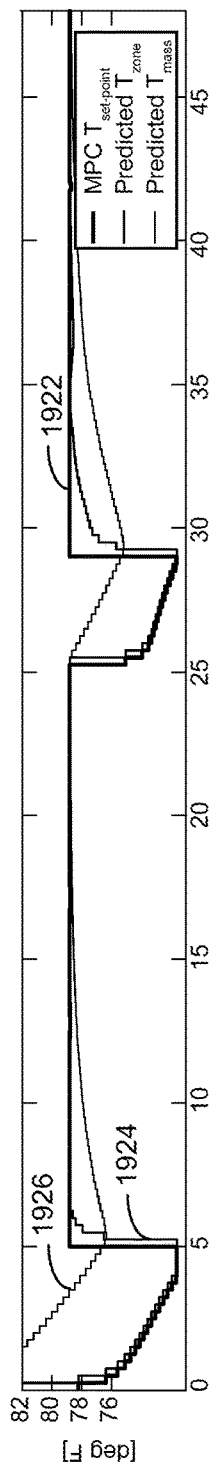
FIG. 19B is a graph illustrating predicted temperature values and a temperature setpoint of the example experiment of FIG. 17 over time, according to some embodiments.
Figure 19C:
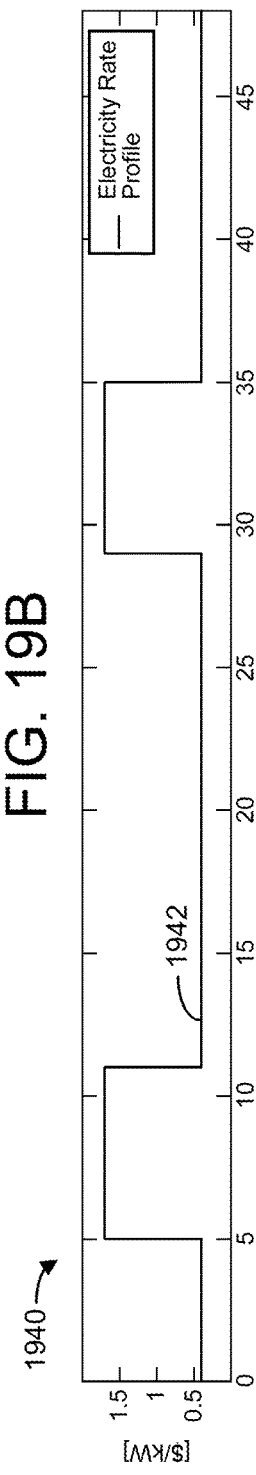
FIG. 19C is a graph illustrating an electricity rate profile of the example experiment of FIG. 17 over time, according to some embodiments.

Referring generally to FIGS. 19A-19C, graphs illustrating a cooling profile generated based on utilizing the identified predictive model, as described above with reference to FIGS. 17-18B, in MPC are shown, according to some embodiments. In particular, FIGS. 19A-19C illustrate a utilization of the predictive model in an MPC formulation that attempts to decide the optimal cooling profile that maximizes cost saving while maintaining temperatures within a predetermined comfort range between 74° F. and 79° F.

Referring now to FIG. 19A, a graph 1900 illustrating outside air temperature measurements predicted using the predictive model, as described above with reference to FIGS. 17-18B, over time is shown, according to some embodiments. Graph 1900 is shown to include a series 1902. Series 1902 can illustrate measured values of the outside air temperature over time. In the example experiment, values of series 1902 were measured by various environmental sensor (e.g., similar to environmental sensor(s) 822 as described with reference to FIG. 8).

Referring now to FIG. 19B, a graph 1920 illustrating temperature values and a temperature setpoint predicted using the predictive model, as described above with reference to FIGS. 17-19A, over time is shown, according to some embodiments. Graph 1920 is shown to include a series 1922 illustrating values of a temperature setpoint generated by performing MPC using the predictive model. Graph 1920 is also shown to include a series 1924 illustrating predicted temperatures of a zone determined based on the predictive model. Graph 1920 is also shown to include a series 1926 illustrating predicted values of a temperature mass of a building determined based on the predictive model.

Referring now to FIG. 19C, a graph 1930 illustrating an electricity rate profile predicted using the predictive model, as described above with reference to FIGS. 17-19B, over time is shown, according to some embodiments. Graph 1930 is shown to include a series 1942. Series 1942 can illustrate values of the electricity rate profile over time. In particular, series 1942 can illustrate how electricity prices changed over time during the example experiment.

Figure 19D:
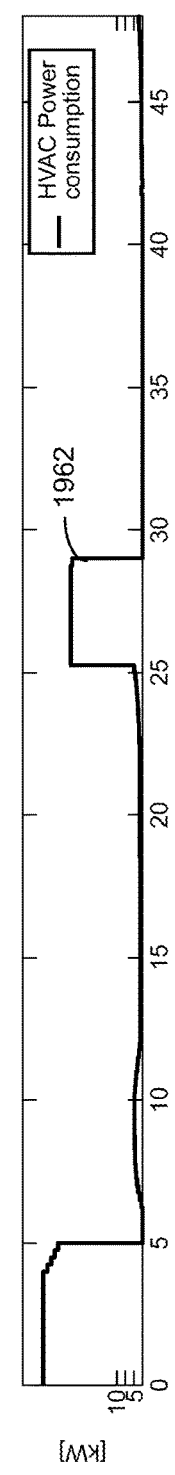
FIG. 19D is a graph illustrating power consumption of HVAC equipment of the example experiment of FIG. 17 over time, according to some embodiments.

Referring now to FIG. 19D, a graph 1940 illustrating power consumption of HVAC equipment predicted using the predictive model, as described above with reference to FIGS. 17-19C, over time is shown, according to some embodiments. Graph 1940 is shown to include a series 1962. Series 1962 can illustrate values of HVAC power consumption over time during the example experiment. In particular, if compared against series 1942 of FIG. 19C, it can be seen that values of series 1962 are higher during times when values of series 1942 are lower as it may be less expensive to operate HVAC equipment if electricity costs are lower.

Figure 20A:
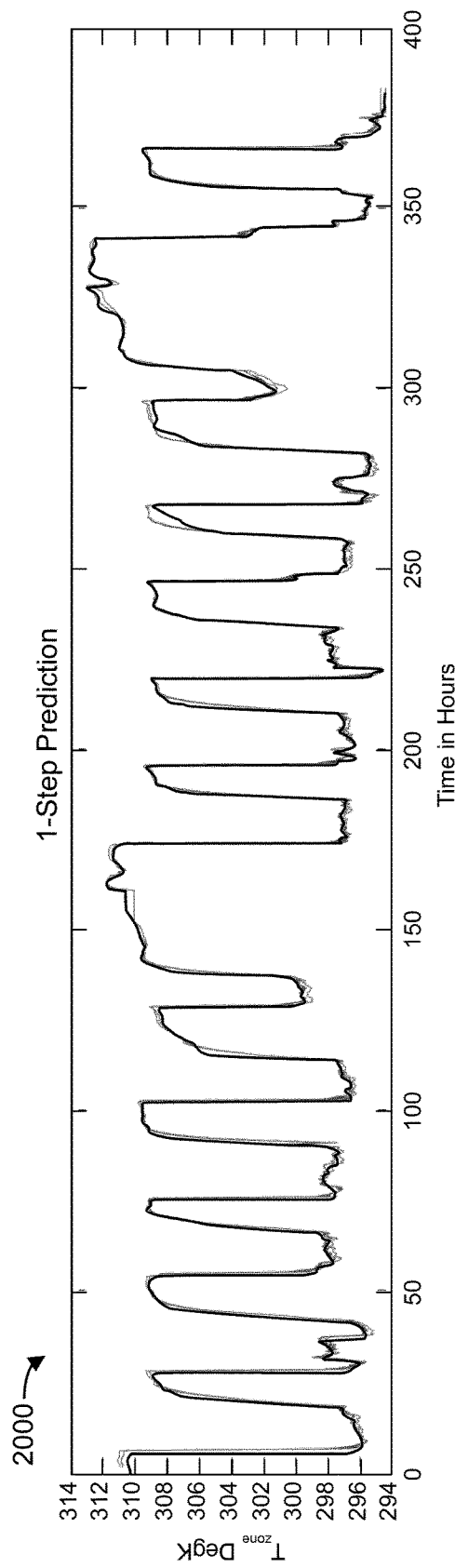
FIG. 20A is a graph illustrating one-step predictions of the predictive model of the example experiment FIG. 17 after two months, according to some embodiments.
Figure 20B:
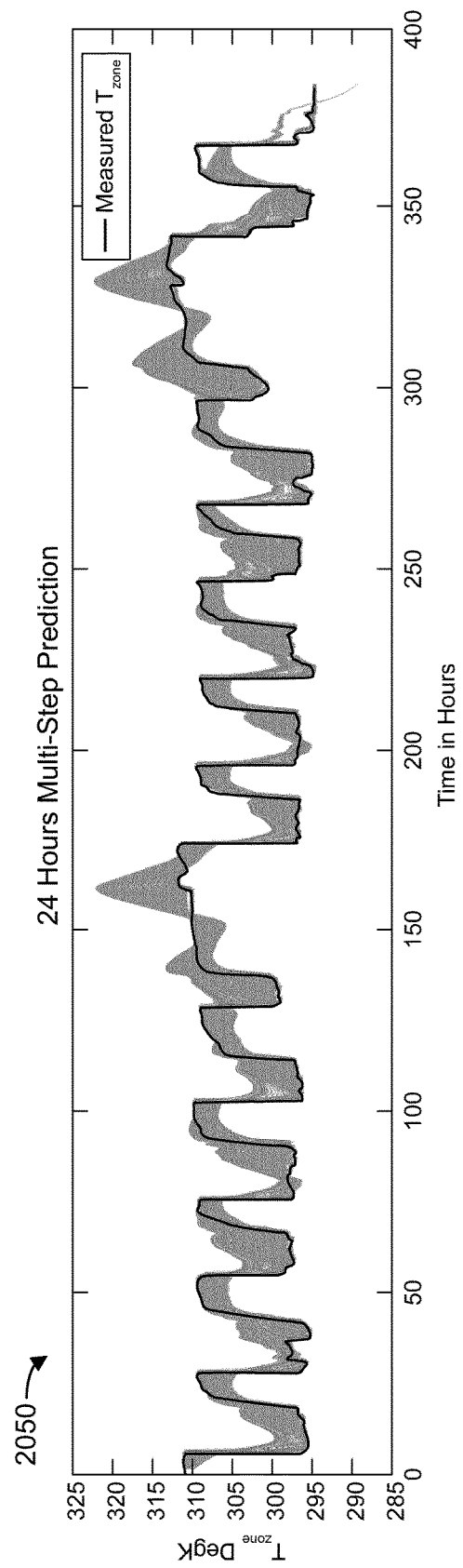
FIG. 20B is a graph illustrating multi-step predictions of the predictive model of the example experiment FIG. 17 after two months, according to some embodiments.

Referring now to FIGS. 20A and 20B, a graph 2000 and a graph 2050 illustrating one-step predictions and multi-step predictions of the predictive model described above with reference to FIGS. 17-19D, respectively, after two months are shown, according to some embodiments. After two months of the example experiment, it was determined that the multi-step predictions were below the acceptable multi-step NRMSPE threshold of 30%. In particular, the multi-step NRMSPE decreased to 21.43% and the one-step NRMSPE decreased to 89.57% after two months. Graphs 2000 and 2050 illustrate one-step and the multi-step predictions obtained from the predictive model for two weeks' worth of data. The inaccurate multi-step predictions illustrated by graph 2050 may drive MPC to make non-optimal decisions that can result in reduced energy savings and cost savings. As such, the adaptive heat disturbance modeling method can be applied using the two weeks' worth of data for online heat disturbance calculations.

Figure 21:
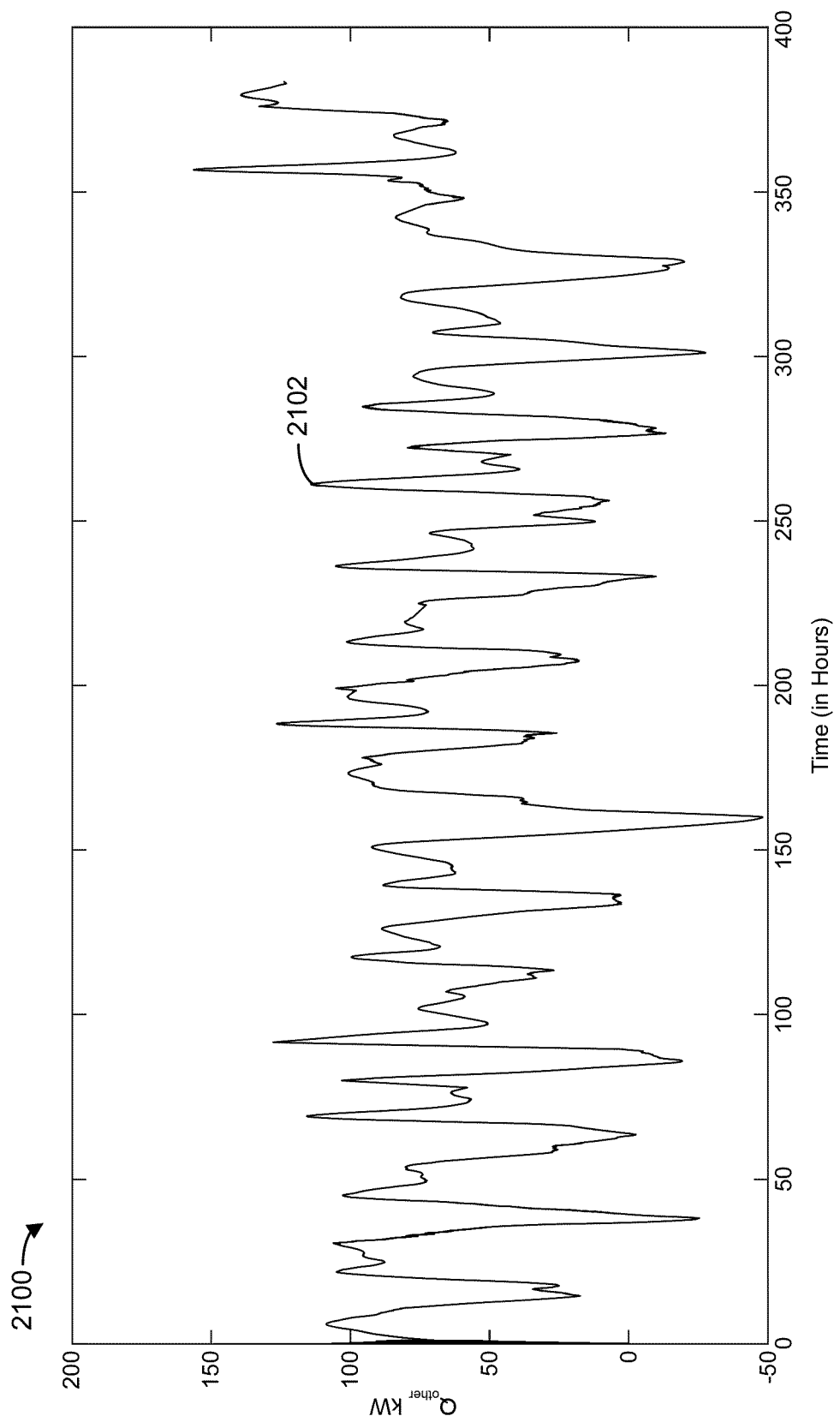
FIG. 21 is a graph illustrating heat disturbance values calculated using an adaptive heat disturbance modeling method of the example experiment FIG. 17, according to some embodiments.

Referring now to FIG. 21, a graph 2100 illustrating heat disturbance values calculated using the adaptive heat disturbance modeling method, as described above with reference to FIGS. 20A-20B, is shown, according to some embodiments. Graph 2100 is shown to include a series 2102.

Series 2102 can illustrate values of the online heat disturbance $Q_{other}(k)$. Based on the calculated values of $Q_{other}(k)$ and weather data (e.g., relative humidity and outdoor air temperature), a deterministic heat disturbance prediction model was trained for the example experiment. The deterministic heat disturbance prediction model was used to generate a deterministic portion of heat disturbance values $Q_{other,deterministic}$ that corresponds to data collected online.

Referring now to FIG. 22, a graph 2200 illustrating the predictions of the deterministic portion of heat disturbance based on the deterministic heat disturbance prediction model described above with reference to FIG. 21 is shown, according to some embodiments. Graph 2200 is shown to include a series 2202. Series 2202 can illustrate values of the deterministic portion of heat disturbance of the example experiment over time. In other words, series 2202 can illustrate $\hat{Q}_{other,deterministic}$.

Values indicated by series 2202 and the data collected online were used as training data in the example experiment to identify a scale factor of deterministic heat disturbance $\theta_5$ as part of the B matrix of the system model. Light online system identification was performed in which only $\theta_5$ was identified using the training data. In the light online SI process performed in the example experiment, the remaining building thermal parameters (i.e., parameters $\theta_1$, $\theta_2$, $\theta_3$, and $\theta_4$) were pre-fixed to their old values (i.e., values obtained from a previous system identification). The identification of the optimal heat disturbance predictions was done through simulation PEM. After simulation PEM was performed, the system was augmented with a stochastic heat disturbance model, converted to discrete time, and a Kalman gain was added. The stochastic disturbance model and Kalman gain was identified using multi-step PEM with a prediction horizon of 288 samples that corresponds to one day as a sampling rate of the example experiment was 5 minutes. The parameters identified in the example experiment can have the following values:

$$\theta_1 = \frac{1}{C_{ia}R_{oi}} = 0.8633 \left[\frac{1}{\text{hours}}\right]$$

$$\theta_2 = \frac{1}{C_{ia}R_{mi}} = 1.983 \left[\frac{1}{\text{hours}}\right]$$

$$\theta_3 = \frac{1}{C_m R_{mi}} = 0.2 \left[\frac{1}{\text{hours}}\right]$$

$$\theta_4 = \frac{1}{C_{ia}} = 0.2173 \left[\frac{\text{Kelvin}}{\text{kiloWatts} * \text{hours}}\right]$$

$$\theta_5 = Q_{other,scale} = 0.961 \text{ [none]}$$

$$\theta_6 = A_{d_e} = 0.505 \text{ [none]}$$

$$K_{1,1} = 1.3743 \text{ [none]}$$

$$K_{1,2} = 0 \text{ [none]}$$

$$K_{1,3} = 2.5 \left[\frac{\text{kiloWatts}}{\text{Kelvin}}\right]$$

If compared to the previous identified building thermal model and Kalman parameters, it can be seen that $\theta_1$, $\theta_2$, $\theta_3$, and $\theta_4$ are kept constant (i.e., the values of $\theta_1$, $\theta_2$, $\theta_3$, and $\theta_4$ do not change) whereas all other parameters can be re-identified.

Referring now to FIGS. 23A and 23B, a graph 2300 and a graph 2350 illustrating one-step predictions and multi-step predictions, respectively, of the predictive model identified by light online SI in the example experiment described throughout FIGS. 17-22 are shown, according to some embodiments. The identified model can have an acceptable quality for fit for both one-step and multi-step predictions. In particular, the identified model has a one-step NRMSPE of 95.13% and a multi-step NRMSPE of 44.62% for a one-day prediction horizon (i.e., 288 samples).

The model identified as described with reference to FIG. 22 has a multi-step NRMSPE of 44.62% which is larger than a minimum acceptable threshold for MPC in the example experiment. Therefore, the identified model can be used to update MWC coefficients with the newly identified parameters identified in the performed light online SI process. Although light online SI is shown to obtain a model with an accuracy that is sufficient for MPC application, intensive online SI can be applied in the example experiment in order to present the extra accuracy benefits and the ability of intensive online SI to obtain more accurate models than light online SI.

The online system identification data selection process can be applied on gathered data in order to extract useful data for intensive online SI. The data selection process performed in the example experiment removed weekend data when the HVAC system was turned off and no set-point changes occurred. Said weekend data may result in invalid data for intensive online SI. Further, the data selection process performed in the example experiment selected the remaining work days' data (i.e., Monday through Friday) as valuable data that contained sufficient HVAC excitations which is suitable for intensive online SI.

The selected data sections from the data collected online along with the deterministic heat disturbance predictions was used as training data to identify the system parameters (i.e., parameters $\theta_1$, $\theta_2$, $\theta_5$, $\theta_4$) as well as the scale factor of deterministic heat disturbance $\theta_5$ as part of the B matrix in the system model. Said identification was performed through simulation PEM. The system was augmented with a stochastic heat disturbance model, converted to discrete time, and a Kalman gain was added. The stochastic disturbance model and Kalman gain were identified using multi-step prediction error method with a prediction horizon of 288 samples that corresponds to one day as the sampling rate of the example experiment was 5 minutes. The parameters identified based on intensive online SI performed in the example experiment were determined to have the following values:

$$\theta_1 = \frac{1}{C_{ia}R_{oi}} = 0.8108 \left[\frac{1}{\text{hours}}\right]$$

$$\theta_2 = \frac{1}{C_{ia}R_{mi}} = 1.023 \left[\frac{1}{\text{hours}}\right]$$

$$\theta_3 = \frac{1}{C_m R_{mi}} = 0.2 \left[\frac{1}{\text{hours}}\right]$$

$$\theta_4 = \frac{1}{C_{ia}} = 0.2218 \left[\frac{\text{Kelvin}}{\text{kiloWatts} * \text{hours}}\right]$$

$$\theta_5 = Q_{other,scale} = 0.3505 \text{ [none]}$$

$$\theta_6 = A_{d_e} = 0.4427 \text{ [none]}$$

$$K_{1,1} = 0.4622 \text{ [none]}$$

$$K_{1,2} = 0 \text{ [none]}$$

$$K_{1,3} = 2.5 \left[\frac{\text{kiloWatts}}{\text{Kelvin}}\right]$$

It should be appreciated that, as compared to the light online SI described above with reference to FIG. 22, the intensive online SI process results in re-identification of all parameters.

Referring now to FIGS. 24A and 24B, a graph 2400 and a graph 2450 illustrating one-step predictions and multi-step predictions, respectively, of the predictive model identified by intensive online SI in the example experiment described throughout FIGS. 17-23B are shown, according to some embodiments. The identified model has an acceptable quality for fit for both one-step and multi-step predictions that is more accurate than the model identified by light online SI in the example experiment. In particular, the predictive model identified by intensive online SI has a one-step NRMSPE of 96.31% and a multi-step NRMSPE of 70.59% for a one-day prediction horizon (i.e., 288 samples). As can be seen in graphs 2400 and 2450, intensive online SI can obtain a predictive model with superior multi-step prediction accuracy. In this way, intensive online SI can obtain improved models if light online SI fails to satisfy a desired multi-step quality of predictions.

Configuration of Exemplary Embodiments

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, calculation steps, processing steps, comparison steps, and decision steps.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicably coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations. The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

What is claimed is:

1. A controller for HVAC equipment, the controller comprising:
one or more processors; and
one or more non-transitory computer-readable media storing instructions that, when executed by the one or more processors, cause the one or more processors to perform operations comprising:
obtaining a predictive model comprising a first set of parameters and a second set of parameters, the first set of parameters and the second set of parameters distinct from inputs to the predictive model and outputs from the predictive model;
performing a first update of the predictive model comprising updating the first set of parameters without updating the second set of parameters;
determining whether a quality of predictions calculated from predictions of the predictive model satisfies a quality of predictions threshold after performing the first update;
in response to a determination that the quality of predictions does not satisfy the quality of predictions threshold, performing a second update of the predictive model comprising updating both the first set of parameters and the second set of parameters; and
controlling the HVAC equipment using the updated predictive model.

2. The controller of claim 1, the operations further comprising performing a system identification process to generate values for one or more parameters of the predictive model based on training data associated with system dynamics of a building.

3. The controller of claim 1, wherein controlling the HVAC equipment using the updated predictive model comprises using the predictive model that results from updating only the first set of parameters in response to a determination that the quality of predictions calculated from the predictions of the predictive model satisfies the quality of predictions threshold.

4. The controller of claim 1, the operations further comprising:
in response to updating the first set of parameters and the second set of parameters, determining whether a new quality of predictions calculated from new predictions of the predictive model satisfies the quality of predictions threshold;
in response to a determination that the new quality of predictions does not satisfy the quality of predictions threshold, executing a data selection process to select data comprising HVAC excitations from existing system data; and
identifying a new predictive model based on the data comprising the HVAC excitations.

5. The controller of claim 1, the operations further comprising:
in response to updating the first set of parameters and the second set of parameters, determining whether a new quality of predictions calculated from new predictions of the predictive model satisfies the quality of predictions threshold;
in response to a determination that the new quality of predictions does not satisfy the quality of predictions threshold, performing a system identification experiment to generate new system data describing system dynamics; and
identifying a new predictive model based on the new system data.

6. The controller of claim 5, the operations further comprising selecting one or more durations in the new system data that satisfy a set of criteria and identifying the new predictive model based on data included in the one or more durations.

7. The controller of claim 1, wherein obtaining the predictive model comprises:
evaluating a quality of predictions of predictions of a plurality of predictive models stored by a database; and
selecting one of the plurality of predictive models stored by the database with predictions associated with a highest quality of predictions as the predictive model.

8. A method for operating heating, ventilation, or air conditioning (HVAC) equipment, the method comprising:
obtaining a first predictive model that models system dynamics of a building, the first predictive model comprising heat disturbance parameters;
training a second predictive model that predicts heat disturbances affecting the building and outputs heat disturbance predictions;
updating the heat disturbance parameters of the first predictive model based on the heat disturbance predictions output by the second predictive model; and
controlling the HVAC equipment using the first predictive model comprising the updated heat disturbance parameters and using the second predictive model.

9. The method of claim 8, further comprising training the first predictive model based on calculated heat disturbance values and weather data.

10. The method of claim 8, further comprising performing a system identification process comprising identifying additional system parameters of the first predictive model in response to a determination that a quality of predictions calculated from predictions of the first predictive model does not satisfy a quality of predictions threshold.

11. The method of claim 8, wherein:
identifying the heat disturbance parameters comprises maintaining a constant value of one or more system parameters during identification of the heat disturbance parameters;
the system dynamics comprise system thermal dynamics; and
the heat disturbance parameters comprise parameters of a stochastic heat disturbance prediction model and parameters of a Kalman gain.

12. The method of claim 8, further comprising:
selecting a most accurate predictive model of one or more available predictive models comprising the first predictive model; and
operating the HVAC equipment using the most accurate predictive model in response to a determination that a quality of predictions calculated from predictions of the most accurate predictive model satisfies a quality of predictions threshold.

13. A method for operating heating, ventilation, or air conditioning (HVAC) equipment, the method comprising:
obtaining a predictive model comprising a first set of parameters and a second set of parameters, wherein the first set of parameters and the second set of parameters are internal parameters of the predictive model and distinct from both inputs to the predictive model and outputs from the predictive model;
performing a first update of the predictive model comprising updating the first set of parameters without updating the second set of parameters;

determining whether a quality of predictions calculated from predictions of the predictive model satisfies a quality of predictions threshold after performing the first update;

in response to a determination that the quality of predictions does not satisfy the quality of predictions threshold, performing a second update of the predictive model comprising updating both the first set of parameters and the second set of parameters; and controlling the HVAC equipment using the updated predictive model.

14. The method of claim 13, further comprising performing a system identification process to generate values for one or more parameters of the predictive model based on training data associated with system dynamics of a building.

15. The method of claim 13, wherein:

the first set of parameters comprises heat disturbance parameters describing heat disturbances affecting a building; and the second set of parameters comprises system parameters describing thermal dynamics of the building.

16. The method of claim 13, wherein controlling the HVAC equipment using the updated predictive model comprises using the predictive model that results from updating only the first set of parameters in response to a determination that the quality of predictions calculated from the predictions of the predictive model satisfies the quality of predictions threshold.

17. The method of claim 13, further comprising:

in response to updating the first set of parameters and the second set of parameters, determining whether a new quality of predictions calculated from new predictions of the predictive model satisfies the quality of predictions threshold;

in response to a determination that the new quality of predictions does not satisfy the quality of predictions threshold, executing a data selection process to select data comprising HVAC excitations from existing system data; and identifying a new predictive model based on the data comprising the HVAC excitations.

18. The method of claim 13, further comprising:

in response to updating the first set of parameters and the second set of parameters, determining whether a new quality of predictions calculated from new predictions of the predictive model satisfies the quality of predictions threshold;

in response to a determination that the new quality of predictions does not satisfy the quality of predictions threshold, performing a system identification experiment to generate new system data describing system dynamics; and identifying a new predictive model based on the new system data.

19. The method of claim 18, further comprising:

selecting one or more durations in the new system data that satisfy a set of criteria; and identifying the new predictive model based on data included in the one or more durations.

20. The method of claim 13, wherein obtaining the predictive model comprises:

evaluating a quality of predictions of predictions of a plurality of predictive models stored by a database;

selecting one of the plurality of predictive models stored by the database with predictions associated with a highest quality of predictions as the predictive model.

* * * * *